(12) United States Patent
Vos et al.

(10) Patent No.: US 8,366,057 B2
(45) Date of Patent: Feb. 5, 2013

(54) METHOD AND APPARATUS FOR PRESSURE ADAPTIVE MORPHING STRUCTURE

(75) Inventors: Roelof Vos, Breda (NL); Ronald M. Barrett, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 233 days.

(21) Appl. No.: 12/843,255

(22) Filed: Jul. 26, 2010

(65) Prior Publication Data

US 2011/0038727 A1 Feb. 17, 2011

Related U.S. Application Data

(60) Provisional application No. 61/229,175, filed on Jul. 28, 2009.

(51) Int. Cl.
*B64C 3/46* (2006.01)
*B64C 3/44* (2006.01)
*B64C 3/52* (2006.01)
*F01B 19/00* (2006.01)

(52) U.S. Cl. .................. 244/219; 244/99.8; 244/123.11; 244/126.6; 244/201; 244/214; 244/215

(58) Field of Classification Search ................ 244/53 B, 244/99.8, 75.1, 99.2, 123.11, 37, 38, 39; 416/1, 84, DIG. 5; 92/37, 38, 39
See application file for complete search history.

(56) References Cited

U.S. PATENT DOCUMENTS

| | | | |
|---|---|---|---|
| 2,886,265 A | 5/1959 | Ritter et al. | |
| 3,106,373 A | 10/1963 | Bain et al. | |
| 3,473,761 A | 10/1969 | Chutter | |
| 3,957,232 A * | 5/1976 | Sebrell | 244/123.11 |
| 6,015,115 A * | 1/2000 | Dorsett et al. | 244/219 |
| 6,199,796 B1 * | 3/2001 | Reinhard et al. | 244/35 R |
| 6,347,769 B1 * | 2/2002 | To et al. | 244/219 |
| 6,487,959 B2 * | 12/2002 | Perez et al. | 92/92 |
| 7,055,782 B2 * | 6/2006 | Dittrich | 244/219 |

(Continued)

FOREIGN PATENT DOCUMENTS

JP 2006-248456 A 9/2006

OTHER PUBLICATIONS

Atli, et al, Energy Absorption of Cellular Honeycombs with Various Cell Angles under In-Plane Compressive Loading, 49th AIAA/ASME/ASCE/AHS/ASC Structures, Structural Dynamics and Materials, Apr. 7-10, 2008.

(Continued)

*Primary Examiner* — Peter M. Poon
*Assistant Examiner* — Marc Burgess
(74) *Attorney, Agent, or Firm* — Mark E. Stallion, Esq.; Husch Blackwell LLP

(57) ABSTRACT

A method and apparatus for an adaptive aerostructure is presented that relies on certified aerospace materials and can therefore be applied in conventional passenger aircraft. This structure consists of a honeycomb material which cells extend over a significant length perpendicular to the plane of the cells. Each of the cells contains an inelastic pouch (or bladder) that forms a circular tube when the cell forms a perfect hexagon. By changing the cell differential pressure (CDP) the stiffness of the honeycomb can be altered. Using an external force or the elastic force within the honeycomb material, the honeycomb can be deformed such that the cells deviate from their perfect-hexagonal shape. It can be shown that by increasing the CDP, the structure eventually returns to a perfect hexagon. By doing so, a fully embedded pneumatic actuator is created that can perform work and substitute conventional low-bandwidth flight control actuators. It is shown that two approaches can be taken to regulate the stiffness of this embedded actuator.

20 Claims, 76 Drawing Sheets

U.S. PATENT DOCUMENTS

| | | | |
|---|---|---|---|
| 7,725,021 | B2 | 5/2010 | Sugiyama |
| 7,802,759 | B2 * | 9/2010 | Ishikawa et al. ......... 244/123.12 |
| 2004/0069907 | A1 | 4/2004 | Dockter et al. |
| 2005/0081711 | A1 * | 4/2005 | Kerekes et al. .................. 92/48 |
| 2006/0202492 | A1 | 9/2006 | Barvosa-Carter et al. |
| 2008/0035788 | A1 | 2/2008 | Kothera et al. |

OTHER PUBLICATIONS

Olympio, et al., Zero-v Cellular Honeycomb Flexible Skins for One-Dimensional Wing Morphing, 48th AIAA/ASME/ASCE/AHS/ASC Structures, Structural Dynamics and Materials, Apr. 23-26, 2007, AIAA 2007-1735.

Olympio, et al., "Zero Poissons Ratio Cellular Honeycombs for Flex Skins Undergoing One-Dimensional Morphing," Journal of Intelligent Material Systems and Structures, vol. 21, No. 17, Nov. 2010, pp. 1719-1735.

Woods, et al., Design and Testing of a Biologically Inspired Pneumatic Trailing Edge Flap System, 49th AIAA/ASME/ASCE/AHS/ASC Structures, Structural Dynamics and Materials, Apr. 7-10, 2008, AIAA 2008-2046.

Khire, et al., Study of A Honeycomb-Type Rigidified Inflatable Structure for Housing, Journal of Structural Engineering, vol. 132, No. 10, 2006, pp. 1664-1672.

Bubert, et al., "Design and Fabrication of a Passive 1DMorphing Aircraft Skin," JJournal of Intelligent Materials Systems and Structures, vol. 21, No. 17, Nov. 2010, pp. 1699-1717.

Cadogan, et al., Morphing Inflatable Wing Development for Compact Package Unmanned Aerial Vehicles, 45th AIAA/ASME/ASCE/AHS/ASC Structures, Structural Dynamics and Materials, Apr. 19-22, 2004, AIAA 2004-1807.

Shaw, et al., Shape Memory Alloy Honeycombs: Experiments & Simulation, 48th AIAA/ASME/ASCE/AHS/ASC Structures, Structural Dynamics and Materials, Apr. 23-26, 2007, AIAA 2007-1739.

* cited by examiner

Maximum L/D

Current/conventional approach

Proposed/morphing approach

Maximum Lift Coefficient

| Description: | Aircraft: | Airfoil: | | $c^*_{l_{max}}$ | $L/D^*$ | $c^*_{d0}$ |
|---|---|---|---|---|---|---|
| Transonic Airfoil | Boeing 737 | BAC 442 | | 1.3 | 90 | .0082 |
| Subsonic Airfoil | Saab 2000, Let 610 | MS(1)-0313 | | 1.6 | 80 | .0089 |
| High Lift Airfoil | Sailplanes | FX74-CL5-140 | | 2.4 | 130 | n/a |

* All values based on Xfoil calculations for $M = 0.3$, $Re = 1 \cdot 10^6$, and $\tilde{n} = 9$

FIG. 2  PRIOR ART

FIG. 4A Basic transonic airfoil, $C_{L_{max}} = 1.6$
FIG. 4B Plain flap, $C_{L_{max}} = 2.0$
FIG. 4C Split flap, $C_{L_{max}} = 2.4$
FIG. 4D 30% Fowler Flap, $C_{L_{max}} = 3.2$
FIG. 4E Double Slotted, $C_{L_{max}} = 2.8$
FIG. 4F Single Slotted, $C_{L_{max}} = 2.5$
FIG. 4G Leading edge flap, $C_{L_{max}} = 1.8$
FIG. 4H Slat, $C_{L_{max}} = 1.8$
FIG. 4I $C_{L_{max}} = 3.4$
FIG. 4J $C_{L_{max}} = 3.0$
FIG. 4K $C_{L_{max}} = 2.5$

PRIOR ART

Hybrid Honeycomb

Auxetic Honeycomb

Standard Honeycomb

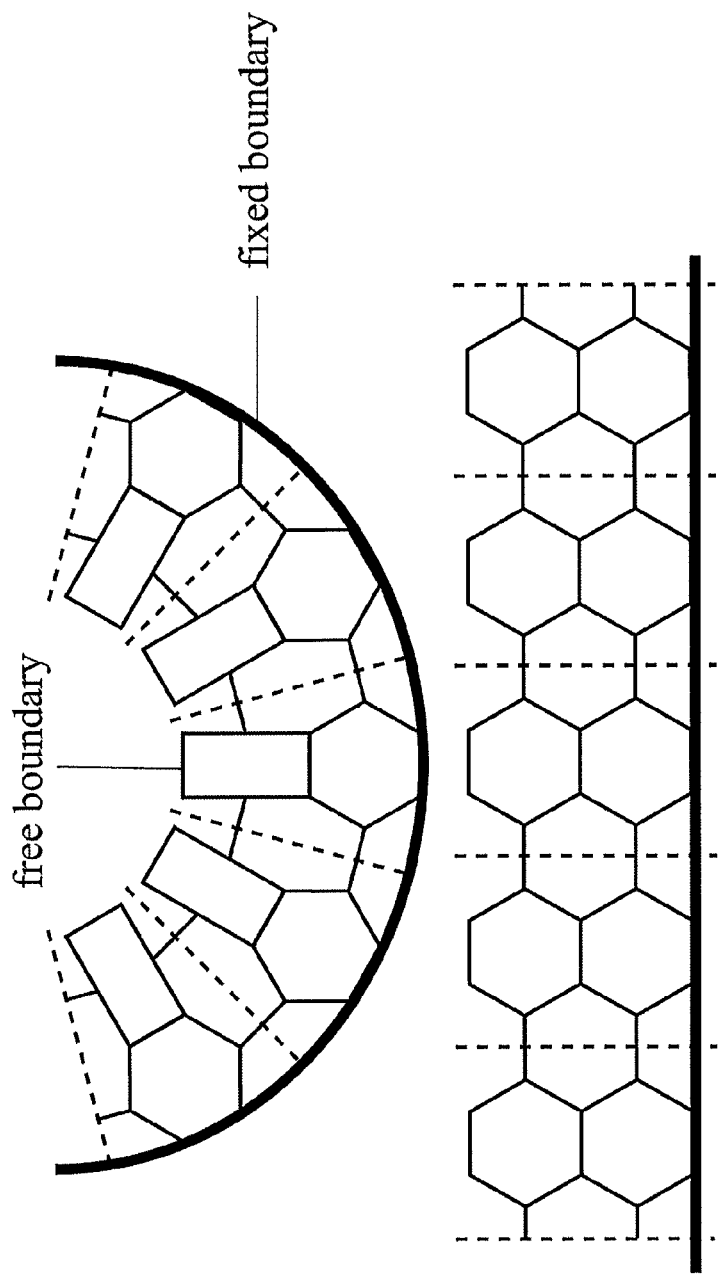

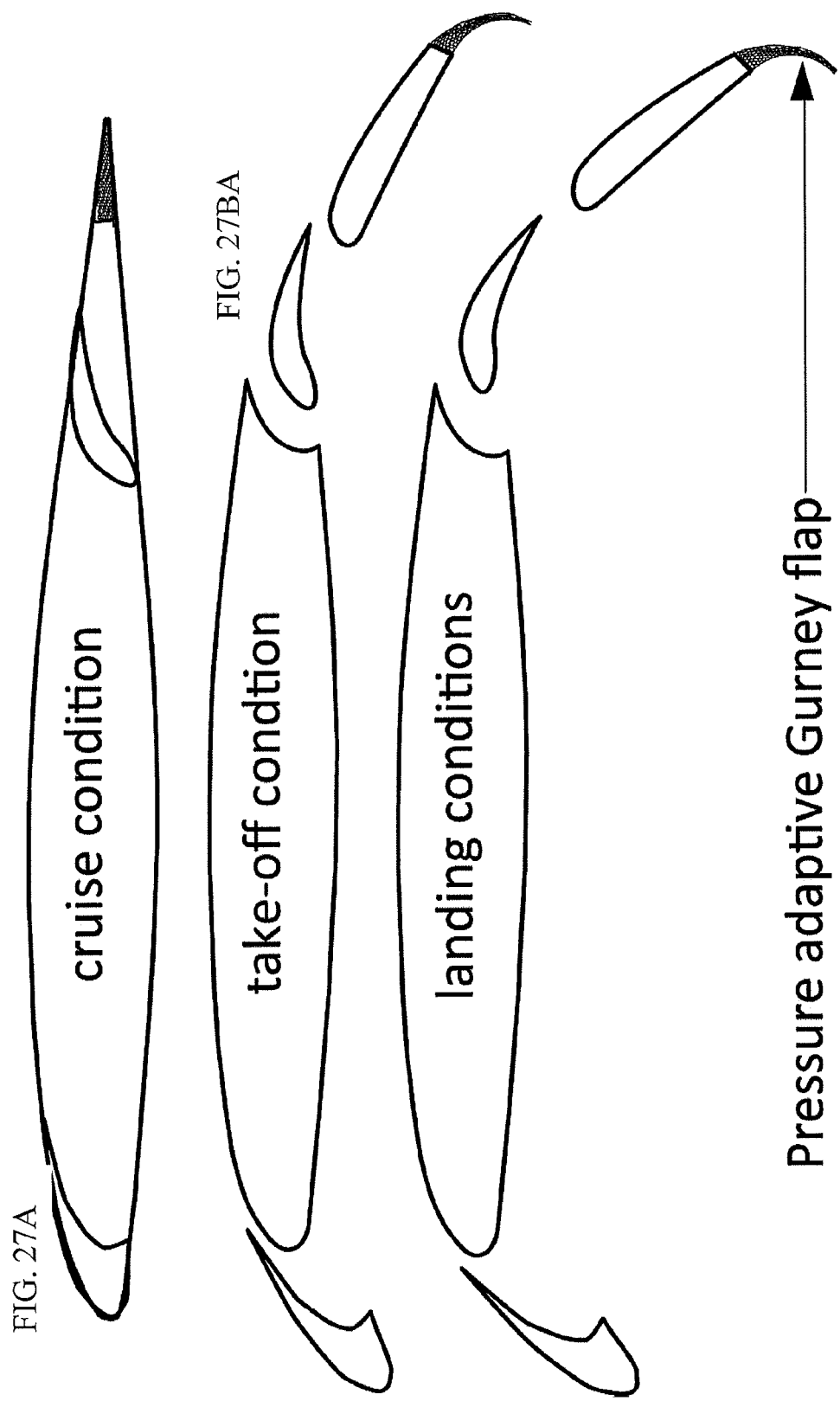

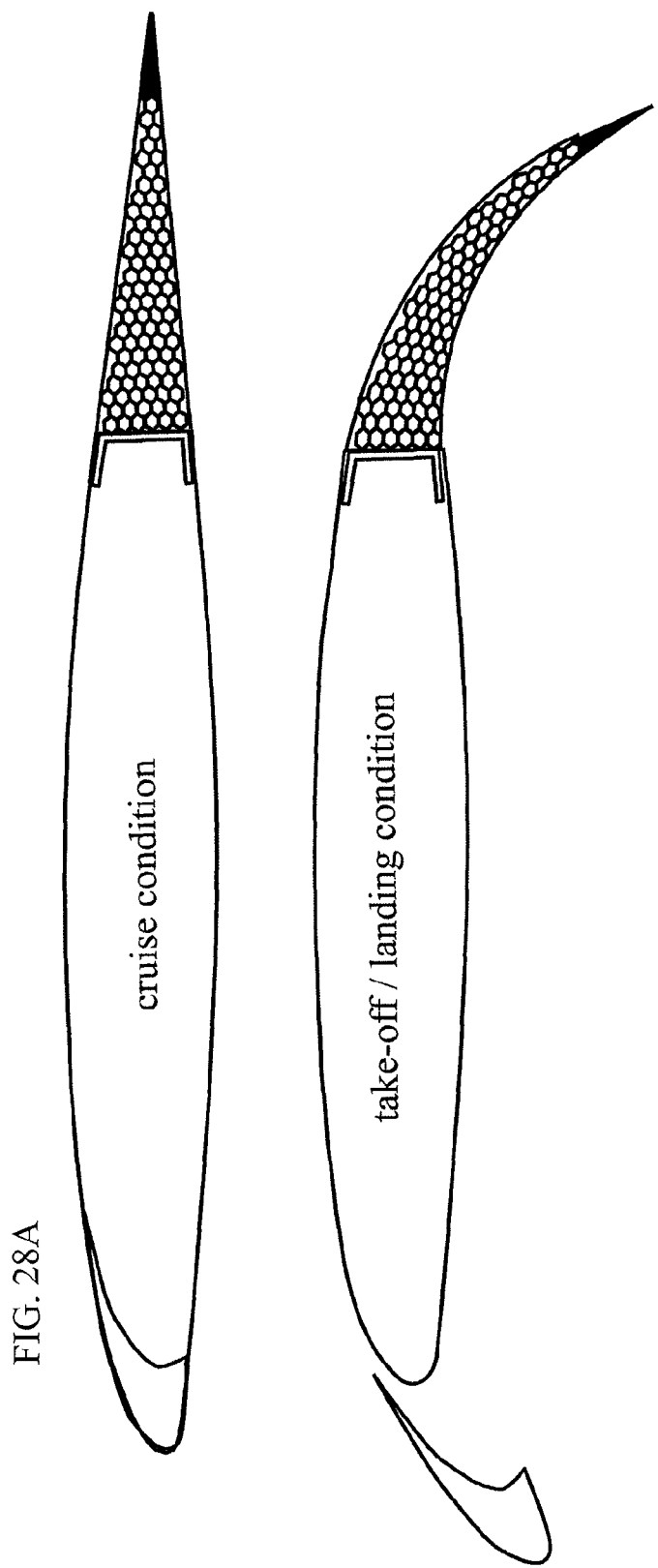
FIG. 28A  cruise condition
FIG. 28B  take-off / landing condition

Deployed Configuration

Cruise Configuration (a) Full honeycomb grid (c) Section with hinged members (b) Rectangular section with symmetry lines (d) Incremental section; basis for model (a) Honeycomb Grid Loaded by Normal Stresses   (b) Forces on Incremental Section Stemming from Normal Stresses (a) Honeycomb Grid Loaded by Shear Stresses (b) Forces on Incremental Section Stemming from Shear Stresses

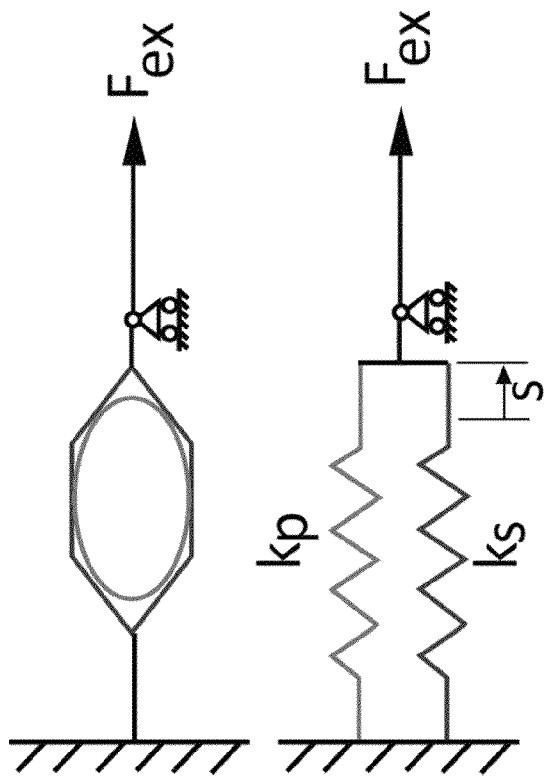
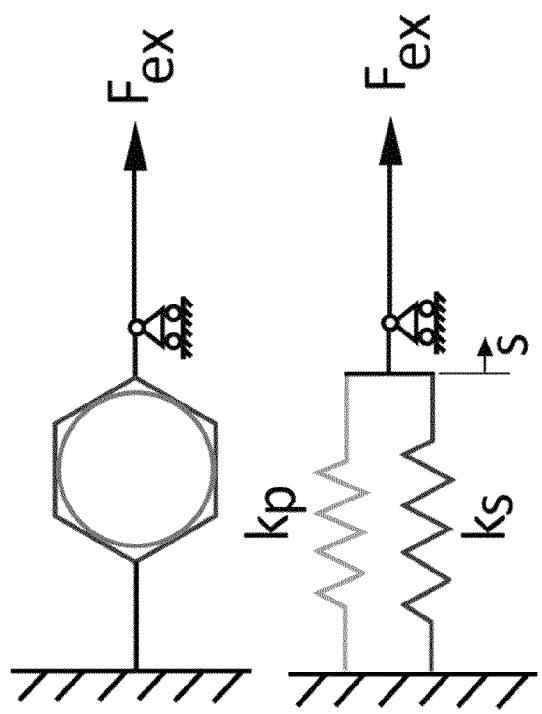
FIG. 53

METHOD AND APPARATUS FOR PRESSURE ADAPTIVE MORPHING STRUCTURE

CROSS-REFERENCE TO RELATED APPLICATION

This application claims the benefit of and priority to U.S. Provisional Patent Application Ser. No. 61/229,175, filed Jul. 28, 2009, entitled METHOD AND APPARATUS FOR PRESSURE ADAPTIVE MORPHING STRUCTURE, which application is hereby incorporated by reference in its entirety herein.

BACKGROUND OF INVENTION

1. Field of Invention

This invention relates generally to morphing structures, for example aero-structures and, more particularly, to adaptive morphing of aero-structures and other structures.

2. Background Art

This background will utilize by way of example, aero-structures to illustrate a representative need for adaptive deformation or morphing of a structure. However, these background examples are in no way intended to narrow the scope of the present invention.

As an example, during its flight regime, an aircraft's wing needs to accommodate two extreme conditions. During cruise its lift-to-drag ratio should be maximized in order to allow for the longest range.

At landing a significantly lower speed is required to bring the aircraft to a standstill within the length of the runway.

Adaptive structures can be used to enhance flight performance of aircraft. Nature can be an inspiration for engineers that need to design wings that perform equally well in the cruise and in the landing regime. Sweep, twist, dihedral and aspect ratio, a bird can change each of them in a split second to change its flight path, and what is more impressive, it hardly takes any effort and the mechanism is low in complexity. The reader can observe how the individual birds change their wing geometry to soar, hover, or maneuver.

Matching the performance of bird morphing in combination with a low weight/energy/complexity penalty has proven to be very challenging. An important reason for this is that changes in the wing architecture do not only impact aerodynamics but also have an effect on the weight, structural integrity, and manufacturability of the aircraft. By way of illustration, For the same set of requirements, the individual categories that form the entire design concept all have different takes on which aircraft geometry satisfies these requirements best. These individual outlooks are synthesized into a complete aircraft design. Morphing wing design is especially challenging because its multidisciplinary nature impacts each of the individual groups or categories directly. For example, a swing wing can be beneficial from an aerodynamic standpoint; however, it also comes with a weight penalty and requires a completely different structural arrangement, which impacts the production and stress engineering groups.

Most efforts to mimic wing morphing have concentrated on unmanned airvehicles (UAVs) as will be detailed herein. However, few of the morphing technologies have transferred to the civil realm of aviation. One of the prohibiting factors is the fact that the adaptive materials that are often employed in morphing structures are not FAR 23, 25, 27 or 29 certified.

There is a need for an adaptive structure that can be developed that relies on conventional aerospace materials, has low power consumption, has low complexity and can be easily integrated into aircraft structures to enable optimal performance in both the cruise and landing regime by changing the outer geometry of the wing.

When adaptivity is addressed in terms of aircraft structural deformation, it should be apparent what condition the wing adapts to and what stimulus is required to achieve good adaptation. For commercial aircraft there are two extreme circumstances that the wing needs to adapt to: (1) maximum lift coefficient during landing and (2) maximum lift-to-drag ratio during cruise. Extensive research has been targeted towards making wings that perform well in both realms resulting in particular geometric characteristics An adaptive structure is defined as: A structure which uses highly integrated, normally load-bearing, adaptive materials to undergo a change in mechanical, thermal, optical, chemical, electrical, or magnetic properties as a function of a given stimulus. With respect to aircraft structures, a change in mechanical properties is often most desirable since it allows for the ability to deform wing or empennage structure, influencing aircraft performance. The given definition incorporates the use of adaptive materials (materials that change their physical state as a function of a given stimulus). The most commonly used adaptive materials that change their mechanical state (strain) are shape memory alloy (SMA) and piezoelectric materials. The characteristics of these two adaptive materials, have been incorporated in aerospace applications, and their are advantages with respect to conventional alternatives Shape memory materials have the ability to return to their shape after being plastically deformed. The most commonly used shape memory materials are shape memory alloys (SMAs). The Nickel-Titanium based SMAs can be fabricated to almost any shape or form. Plastic deformation in shape memory alloys induces the martensitic atomic structure to deform significantly. By increasing the temperature of the material, the atomic structure changes to austenitic, thereby returning the material to its original shape. When the material is subsequently cooled, the geometry is maintained and the atomic structure becomes martensitic again. If the material is in a particular form (e.g. rod, wire, bar) and loaded by a force, work can be performed.

SMAs have the highest single-stroke work density of the adaptive structures. They can exhibit great strains and apply considerable force. However, they generally exhibit a large power draw due to energy dissipation and their hysteresis can amount to 38%. Moreover, their bandwidth is generally poor because of thermal saturation issues [5].

Examples of the use of SMA in an aircraft application can be found as substitutes for conventional actuators in subscale uninhabited aerial vehicles (UAVs). An investigation into the use of adaptive materials in morphing structures demonstrated the effective use of highly integrated SMA materials for leading and trailing edge deformation on a wind-tunnel model of a contemporary fighter. Several morphing wing concepts based on SMA tendon (wire) actuators were conceived. Although these designs accomplish large deformations the structure of multiple parts, hinges, and actuators is complex and occupies most of the internal wing volume.

Other adaptive materials are piezoelectric materials, which generate an electric potential in response to applied mechanical stress, called the direct piezoelectric effect. Because this effect is reversible, piezoelectric actuators can be used in both sensor and actuator applications. A common piezoelectric material is Lead Zirconate Titanate (PZT). This material has randomly distributed dipoles within a polycrystalline structure. Poling the material is done by creating a large through-the-thickness electric field, which orients all dipoles in that direction.

Piezoelectric materials have been used for many years in applications such as pressure transducers and smoke detectors. Actuator applications include fuel injectors and valve lifters. The first applications of piezoelectric actuators in flight control systems appeared in the early 1990s relying on directionally attached piezoelectric torque plates. These torque plates were demonstrated in missile fins, subsonic and supersonic twist-active wings, and twist-active rotor blades.

Over the past two decades piezoelectric actuator elements have been demonstrated to reduce overall flight-control-system weight on miniature UAVs. By integrating piezoelectric bender elements into the control surfaces themselves, power consumption and complexity could be greatly reduced while a much higher actuation bandwidth could be achieved.

Piezoelectric materials have a lower single-stroke work density than SMAs and generally a limited stroke and force capability. However, recent advances in actuator design have led to a more robust and competitive actuator which has successfully been used in uninhabited aerospace applications ranging from subsonic through supersonic. This new class of actuators relied on an additional axial load to decrease the effective inherent stiffness of the actuator element.

Comparing adaptive materials can be done based on their mechanical, electrical, and/or chemical properties. One of the most important properties for aircraft applications is the specific energy density, or the amount of mechanical work that can be performed by a single gram of adaptive material. The coupling efficiency, $k^2$, at which input energy is converted into mechanical work is another important parameter because it relates to the amount of energy that is required to induce mechanical work. Practical values of energy density might be 10 to 100 times lower than presented.

It can be observed that the conducting polymer has the highest mass-specific energy density (23 J/g), closely followed by SMA (15 J/g). Although their energy densities are high, their low transfer efficiency requires a relatively large amount of energy to actuate these materials. In addition, the actuators are relatively slow. Piezoelectric materials can have much higher transfer efficiencies. The ceramics (which are often considered for aircraft application) have a transfer efficiency of $\eta=52\%$ and are relatively fast. However, their energy density is three orders of magnitude lower than that of SMA. Other well-performing adaptive materials are the electroactive polymers. The acrylic artificial muscle, for example, has mass-specific energy density of 3.4 J/g, a transfer efficiency around 60%, and is relatively fast.

During the last decades, the ratio between cruise speed and landing speed has increased for commercial passenger aircraft. Sweeping the wing backwards to increase the drag divergence Mach number has had an adverse effect on the low-speed lifting capability of the wing. To account for the high $C_L$ conditions during take-off and landing, wings are generally equipped with high lift devices (flaps and/or slats). FIG. 4 demonstrates how the wing lift coefficient is influenced by high-lift devices. The more exotic flap systems that also have fully aft-translating capability are generally only found on high subsonic aircraft with swept wings. Low-subsonic aircraft such as light sport aircraft (LSA) do not require such a complicated high-lift system because the cruise-to-landing speed ratio is lower and the wings are generally unswept. In addition, LSAs are highly cost sensitive, which makes the addition of a complicated high-lift device less attractive. These aircraft therefore employ simple flap systems such as a split or plain flap. Leading-edge high-lift devices are not found on low subsonic aircraft.

Although effective, the aerodynamic advantages of a high-lift system come at a price. At the leading edge, movable flaps or slats are the highest-(aerodynamically) loaded parts of the wing. This requires extremely stiff and strong components within the extend/retract mechanism, which generally results in a significant weight penalty. The flap system complicates the wing's trailing edge structure and introduces electrical systems in relatively thin parts of the wing. For aft translating flaps, flap tracks are required that penetrate the airflow during cruise and increase wing drag. Furthermore, the system adds weight to the wing and increases the cost of manufacturing. However, the performance improvements are historically considered to outweigh these penalties.

The thickness ratio of an airfoil is its maximum thickness (measured perpendicular to the chord line) divided by the chord of the airfoil. The thickness ratio is one of the parameters that determine the maximum lift an airfoil can generate. It also has an influence on the post-stall behavior of the airfoil.

A basic example of the influence of thickness on the pressure distribution is demonstrated in FIGS. 6A and 6B where 6% and 18% thick airfoils of otherwise similar geometry are compared. The pressure peak (in a negative sense) at the leading edge of the thin airfoil is much higher than for the thick airfoil. Consequently, the pressure gradient, dp/dx, for this airfoil is much steeper. The steep slope of the pressure gradient is an indication that the boundary layer will separate at a lower angle of attack than for the thick airfoil, giving rise to an abrupt drop in lift. A simple two-dimensional Euler code predicts a maximum lift coefficient of 1.0 for the NACA 0006 and 1.8 for the NACA 0018. The stall for a NACA 0006 results in an abrupt loss in lift while the NACA 0018 shows a more gradual decay. Furthermore, for the NACA 0018 $C_{l\,max}$ occurs at $\alpha=20$ while for the NACA 0006 this is at $\alpha=9$ FIGS. 7A and 7B shows the maximum lift coefficients for a series of airfoils as a function of their thickness. Note in these graphs how $C_{l\,max}$ is strongly influenced by the Reynolds number. Comparing Figures (a) and (b) shows the difference in maximum lift due to camber. The MS(1) airfoil shows distinctly better high lift characteristics than all the other airfoils but is much more susceptible to a change in Reynolds number (see FIGS. 6A and 6B for geometry).

The combination of airfoil thickness and flap type was shown to be instrumental in the maximum lift capabilities of an airfoil, as can be seen in FIG. 8. This graph displays the change in maximum lift coefficient for a relative flap chord of 25% and standard flap deflection angles. FIG. 8 shows that flap deflection is more effective on thick airfoils than on thin airfoils. Using advanced flap mechanisms (double slotted) in combination with a 19% thick airfoil can change the maximum lift coefficient as much as 1.9.

A second characteristic of the wing section geometry that is important in determining its maximum lift capability is its camber. As was already clear from FIGS. 7A and 7B, the more positive camber is present, the higher the lift that can be generated. On conventional transonic wings, the deployment of high lift devices increases the effective camber of the airfoil (see FIG. 4).

In the 1920s a morphing wing concept for a triplane was conceived. The middle wing relied on the local angle of attack to change its camber and consequently its maximum lift capability. This simple concept of passive wing morphing did not require pilot input but relied on a balance between the external aerodynamic forces and the internal spring force that dictated the shape of the airfoil. Even though the mechanism could work well, the structure lacks an integral torque box that is essential to provide appropriate levels of torsional stiffness.

Over the past three decades a renewed interest in wing morphing has sparked various research programs. Among these programs was the Mission Adaptive Wing (MAW) research program that investigated the effectiveness of variable leading and trailing edge camber on an F-111 aircraft. This wing had an internal mechanism to flex the outer wing skin and produce a symmetrical section for supersonic speeds, a supercritical section for transonic speeds, and a high-camber section for subsonic speeds. Flight tests demonstrated that an improvement in lift-to-drag ratio of 20% could be obtained in large parts of the flight envelope while some parts even showed an increase of 100%. Even though the flight tests demonstrated advantages of the wing morphing, there were significant drawbacks to the way the morphing was achieved. Bulky, heavy hydraulic screw jacks were employed to induce the deformation in the wing. In addition, internal mechanisms employing multiple linkages ensured the desired kinematics of the mechanism. This resulted in a relatively heavy and complex actuation system.

It has been recognized that wing morphing on stiff aircraft structures requires dedicated structural mechanisms and often compliant wing skins (such as in the MAW) that allow for these shape deformations. As a result, compliant mechanisms and compliant materials have been conceived that can be used in morphing wings. Although effective in providing significant wing deformations and smooth transitions, compliant mechanisms are often much more complicated than the control surfaces they are replacing.

The shape of the leading edge is a third parameter that influences the maximum lift capabilities of an airfoil. As was mentioned in the previous section, to achieve a maximum $\Delta C_{l\,max}$ to change in camber, there exists an optimum $\Delta y$. For symmetric airfoils (no camber), FIG. 10 shows how the leading edge shape triggers the type of stall that occurs and its influence on the maximum lift coefficient. It shows that relatively sharp leading edges suffer from leading edge stall and have a low $C_{l\,max}$, while with incrementally more blunt airfoils, stall starts at the trailing edge and leads to higher lift coefficients. The (recirculation) "bubble" that is mentioned in this graph refers to the laminar separation bubble. This bubble occurs when the laminar boundary layer cannot follow the curvature of the airfoil, separates from it, becomes turbulent, and re-attaches to the airfoil again further downstream. At a certain angle of attack, the bubble bursts, no re-attachment occurs, and a sudden drop in lift results.

It was already shown in the 1950s that modification of the nose of a 35° swept wing could result in significant changes in maximum lift coefficient. Demele and Sutton demonstrated that by adding body to the bottom side of a NACA 64A-010 over the first 20% of the chord resulted in an increase in $C_{l\,max}$ of 35% (at a Reynolds number of $11 \times 10^6$).

Closely related to the leading edge shape parameter, $\Delta y$, is the leading edge radius, R. FIG. 11 shows an example of how the radius influences the maximum lift coefficient. A NACA 64A-010 has a maximum lift coefficient of 1.07. Increasing leading edge droop resulted in an increase in maximum lift coefficient of 0.37. Increasing the radius from 1.10% c to 1.50% c yielded an additional increase in $C_{l\,max}$ from 1.44 to 1.65 bringing the total increase to 0.58 or roughly 50% of the original maximum lift [65]. Efforts to increase the maximum lift coefficient on a NACA 63012 airfoil yielded similar results. A larger nose radius (increased from 1.09% c to 3.5% c) was introduced. In addition, keeping the nose radius tangent to the upper surface contour of the basic airfoil resulted in an increase in leading edge droop. These combined measures resulted in a $\Delta C_{l\,max}=0.35$ [66].

Increasing the nose radius reduces the local curvature of the airfoil which in turn lowers the leading edge pressure peak (see FIGS. 6A and 6B for comparison of sharp and blunt airfoils). Accordingly, the boundary layer is less likely to separate, which means a postponement of leading edge stall. All measures that are described above essentially aim to reduce the local over speeds at the leading edge. Apart from increasing the nose radius and adding body on the bottom side of the airfoil, other measures, such as adding body on the top side of the airfoil, also proved to be effective on other airfoils [67]. It depends on the contour of the basic airfoil which measure proves to be most effective in increasing the maximum lift coefficient.

Examples of leading edge morphing are often found in conjunction with thickness and camber adaptivity. This means that by changing the thickness or camber the leading edge geometry is also altered in a favorable manner Research has been done on helicopter blades to ensure attached flow on the retreating blade at high angles of attack (see FIG. 12). It was shown that by using a compliant mechanism inside the blade leading edge, the leading edge geometry could be altered on a 3-ft-span full-scale chord blade at a rate of 6 Hz.

Significant effort has been conducted in the realm of morphing flaps or ailerons. The benefit of continuously deforming flap is that there are no gaps or seams between individual wing components. This is beneficial during cruise operations because it decreases friction drag. Because adaptive flaps are integrally attached to the main wing, they do not benefit from the jet effect that exists when a flap is slotted. In addition, they lack any Fowler motion. Therefore, it is expected that maximum lift capability of an adaptive flap is not as high as that of any of the slotted or Fowler flaps of FIG. 4. However, the smooth transition between main wing and adaptive flap, makes it an excellent candidate for an adaptive control surface such as an adaptive aileron.

Another way of increasing the maximum lift capability of a wing is to apply a Gurney flap at the trailing edge. A Gurney flap is small vertical tab (generally not larger than 5% c) that makes a right angle with the pressure surface at the trailing edge of the wing. It creates a local increase in pressure which gives rise to a higher lift coefficient. It also induces a significant increase in pitching moment because of high aft loading. Different geometries of Gurney flaps have been investigated in terms of lift, drag and pitching moment characteristics. For example, a NACA 23012 airfoil at a Reynolds number of $1.95 \cdot 10^6$ experienced a maximum-lift increase of 49% (from 1.26 to 1.88) due to the application of a 5% c straight Gurney flap. Rather than applying the Gurney flap to the end of the airfoil, it can also be attached to the trailing edge of a flap. Application of a 1% c Gurney flap on 30% c Fowler flap resulted in an increase of 3% in $C_{l_{max}}$ at a flap angle of 39° [80]. A 5% c Gurney flap on a 2-element, single-slotted wing showed an increase in $C_{l_{max}}$ of 20% (from 1.70 to 2.05).

Another way of achieving wing deformation is by utilizing the aerodynamic loads that are already present. This can be beneficial because deformation of a wing structure generally requires considerable amounts of energy. Extracting this energy from the airstream rather than from actuators reduces the size and consequently the weight of the wing-movable. Research into these so-called active aeroelastic wings (AAWs) has resulted in successful flight tests of an F/A-18A that employed a flexible wing that demonstrated span-wise twist as a result of small leading and trailing edge control surface deflection. Although roll rates of the aircraft increased to 400 deg/s, a complex control mechanism was required to deflect the various control surfaces in order to obtain the required wing twist. In addition, the torsional rigidity of the wing was intentionally weakened which must have decreased the flutter and divergence clearance.

Other academic efforts that demonstrated the use of aeroelastic flight control include the use of adaptive internal structures. This concept relied on a change in wing stiffness to have the air loads induce wing twist. Both internal and external mechanisms relied effectively on the twisting of the wing to induce roll control.

Because aeroelastic active wings can be sensitive to adverse aero-elastic effects such as aileron reversal, static divergence, or flutter, research has been conducted to make morphing wings that rely on internal actuators for deformation. Driven by the knowledge that washout-adaptive wings can reduce induced drag as well as control the rolling motion, researchers have implemented a variety of twist active wings on (subscale) UAVs. An example is a UAV, which uses so-called twisterons that can be adjusted to decrease lift-induced drag during cruise. DARPA's smart materials and structures demonstration program explored the use of an SMA torque tube to twist the wing. The main drawback of twist-active wings is that there is should always be a trade-off between torsional stiffness on the one hand and actuator sizing on the other hand. In general, powerful (heavy) actuators are required to torque a structure that is designed to be torsionally stiff. One concept of active wing twist, however, relied on the warping of the skin to induce the torsional change. Because the skin warping was done by using a jack-screw, the torsional rigidity was not compromised and relatively light-weight actuators were required.

For a given airfoil (2D) shape, the thickness ratio (t/c) is often the most important parameter that influences the drag divergence Mach number. FIG. 14 shows how for supercritical and NACA airfoils the thickness ratio influences the drag-divergence Mach number. According to this graph, for supercritical airfoils, the drag-divergence Mach number decreases linearly according to $M_{DD}=0.92-1.16$ ($t/c$). For example, decreasing the thickness of 10% thick airfoil down to 8% increases the drag-divergence Mach number from 0.80 to 0.83.

The drag divergence Mach number of a wing is typically a function of both the sweep of the wing and the thickness of the airfoil. The critical Mach number, $M^*_ᴅ$, is the Mach number at the onset of supersonic flow locally on the wing. The critical Mach number and the drag divergence Mach number can be roughly correlated according to $M_{DD}=M^*+0.1$ [42]. By decreasing the airfoil thickness, the critical Mach number and hence the drag-divergence Mach number is decreased. FIG. 15 shows how the critical Mach number varies with thickness and sweep angle for a wing of aspect ratio larger than 6 and a lift coefficient of 0.4. From this graph it can be seen that in order to decrease the critical Mach number (and hence the drag-divergence Mach number) a trade off needs to be made between airfoil thickness and sweep angle. The influence of the sweep angle on the maximum lift coefficient is evident from Equation 2.3. It is therefore desired to keep the wing sweep as low as possible to maximize low-speed performance. Other disadvantages include (a) the added structural weight that is required to bear the torque load that is introduced by sweeping the wing, (b) reduced flap effectiveness, and (c) a spanwise drift over the wing that increases boundary layer thickness and leads to increased drag and reduced aileron effectiveness. Because of these disadvantages, decreasing airfoil thickness would be a beneficial solution. However, this leads to other inconveniences like added structural weight to bear the bending moment of the wing and less volume for fuel storage.

Since transonic aircraft cruise close to the drag-divergence Mach number ($M_{DD} \cong M_{cr}$) an example of the relation between sweep angle and Mach number for the aircraft is presented in FIG. 16. The direction of the arrow in this graph indicates that most efficient transonic wings both have low sweep angles and still cruise at relatively high Mach numbers. From this graph it becomes apparent that particularly the Fokker 70 employs a very efficient transonic wing design. Its wing is swept backwards over only 17 degrees and still its cruise Mach number is 0.77. Remember that this aircraft does not have any leading-edge high-lift devices to increase its maximum lift coefficient at take-off and landing, which demonstrates that the lack of sweep makes for better low-speed wing performance. An explanation for these performance characteristics is the relatively thin wing which measures only 12.3% at the root and 9.6% at the tip. For comparison, the wing of a B767-400 has a thickness of 15.7% at the root, 28% more than the Fokker 70.

Planform morphing is yet another form of wing shape deformation that allows an aircraft to expand its flight envelope and fly efficiently in both the high speed and low speed realm. An example of planform morphing was successfully demonstrated in 2006 on both a wind-tunnel model and a scaled prototype. Using a scissor-type mechanism this wing was capable of changing its span, planform area, aspect ratio and sweep angle. An elastic skin ensured a smooth wing surface at each stage of wing morphing. Even though the effectiveness of this wing was excellent, penalties in terms of complexity and the impossibility to store fuel become clear. In addition, the complex wing structure in combination with the requirement of powerful actuators led to a very high weight penalty.

Another approach to planform morphing used a hinged segmented wing that could fold partly against its fuselage, thereby decreasing the wing surface area and increasing the effective sweep angle. The design of this folding wing concept incorporated tailored seamless skins around the hinge points such that a smooth surface was ensured in all positions of the wing. By reducing the effective surface area when in folded position the intention was to reduce drag and be able to fly efficiently in the high speed realm. Wind tunnel tests successfully demonstrated the morphing mechanism, but were inconclusive about the expected drag reduction at transonic and supersonic speeds. It might be expected that interference-drag penalties occurring in folded position negate the drag reduction due to increased effective sweep and decreased wing area.

Continued efforts are being made to conceive new morphing concepts that could potentially be used in future aircraft designs. These efforts include research into new compliant mechanisms, adaptive materials, and aircraft configurations that enable morphing flight control. The majority of the research is tailored towards novel UAV designs and is often still in the conceptual stage of the design.

The overview of morphing projects in the past decades has been primarily targeted towards military applications, particularly UAVs. Passenger aircraft have to comply with strict rules and regulations (FARs) in terms of structures and materials. Therefore, morphing structures have been limited to the high lift devices such as flaps and slats. An example of wing morphing on passenger aircraft can be found on the (canceled) Boeing 2707 supersonic transport (SST), which was proposed in 1964 in response to the European Concorde. A swing-wing configuration similar to that of the F-111 (and later F-14) was used to change the wing sweep between subsonic and supersonic speeds. However, due to insurmountable weight problems associated with the swing-wing mechanism Boeing discarded this morphing concept in favor of a fixed delta wing. The project was cancelled before one prototype was built due to heavy opposition by (among others) environmentalists.

Since contemporary passenger aircraft rely on their efficiency in order to be cost effective, changes in structural arrangement are only justified when direct operating cost (DOC) is decreased and the structural integrity is not compromised. The morphing wing concepts which were conceived for military applications (e.g. F-111, F-14 and F-18 AAW) are therefore unsuitable for commercial applications. The Mission Adaptive Wing, the tendon actuated structure, and the variable planform wing are examples of complex internal structures that require large numbers of parts, hinges and actuators to work properly. Maintaining such structures can be costly and is, therefore, unattractive for commercial airliners. Other disadvantages such as the limited ability to store fuel in the wings or a complex control system have prevented morphing technology from transferring from the experimental military aircraft to modern transport aircraft. As was mentioned before, because adaptive materials have not been certified for use in primary or secondary aircraft structures, applying them on commercial aircraft is still impossible.

Commercial applications of morphing structures can only be viable if certifiable systems (including certifiable materials) are used, direct operating costs are decreased, and structural integrity is maintained. To satisfy these disparate requirements, a radically different approach is required. To be competitive with conventional high lift devices on modern jet transports this morphing wing should produce values of $C_{Lmax}$ that are comparable to those presented FIG. 5. Furthermore, there is the objective to keep the number of parts, number of actuators and system complexity as low as possible. This enables a reduction in both manufacturing and maintenance cost. Finally, no weight, aerodynamic or aeroelastic penalties may arise as a result of the morphing concept.

The journey of a typical jet transport aircraft imposes different atmospheric conditions on the aircraft. Most jet transports cruise at altitudes between 10 and 13 kilometers, which means lower temperature, density, and pressure than at take-off and landing conditions. This section shows the temperature, pressure and density distribution in terms of latitude and altitude of the Earth's atmosphere in standard and deviated conditions.

In reality the atmosphere is never constant and standard atmospheric conditions are rarely encountered. The influence of seasons provides the first deviation from standard conditions. A second deviation comes from the position on Earth in terms of latitude. FIGS. 17A and 17B shows how the mean temperature varies with altitude and latitude. The difference between the isotherms in (a) and (b) shows that during winter the temperature distribution is more dependent on latitude than during summer. An aircraft flying over the tip of Greenland (60°N latitude) at an altitude of 10 km would therefore experience a temperature of 217K during winter and 226K during summer (on average).

In contrast to the global temperature distribution, FIGS. 18A and 18B demonstrates that the mean global pressure distribution is only mildly dependent on latitudinal and seasonal changes. The upper layers of the troposphere show a somewhat higher variability while near sea level the variations are almost negligible.

By using the mean temperatures and pressures and assuming that air behaves as a perfect gas the global density distribution can be calculated (using the perfect gas law, $p=\rho RT$, and $R=287$ J/kg/K). The density distribution, which is presented in FIGS. 19A and 19B, demonstrates that near the surface the mean density in both winter and summer is dependent on latitude, while at higher altitudes the isochors show little latitudinal or seasonal variation. The isochors of FIGS. 19A and 19B are important for aircraft cruise and airfield performance because they directly relate to the amount of lift the wings can generate. The temperature on the other hand only plays a role in the cruise condition because it determines the local speed of sound, $a=\sqrt{\gamma RT}$ ($\gamma=1.4$), and therefore the cruise velocity of the aircraft. The small seasonal and latitudinal variability in mean densities at altitudes between 10 and 15 km indicate that the cruise altitude for aircraft is fairly independent of place and time.

Contrary to cruise performance, airfield performance is dependent on the latitudinal position and seasonal time of the year. FIGS. 19A and 19B demonstrates that near sea level mean air densities increase with latitude and are higher in winter than in summer. A statistical relationship seems to exist between temperature and density. Lower densities imply that aircraft need longer take-off distances, not only because of less lift capability but also because of reduced engine thrust [1].

From the data presented in FIGS. 17A and 17B to FIGS. 19A and 19B the relation between temperature and density was investigated up to altitudes of 3 gpkm. This relation is shown in FIG. 20 for mean winter conditions. Investigating summer conditions resulted in a close match with the winter data, only over a smaller range of temperatures and was, therefore, not drawn in. The seasonal influence was negligible and data from latitudes between 10°S and 75°N was used. For this reason, it was anticipated that the temperature-density relation as presented in FIG. 20 was representative for global atmospheric conditions. Isobars were drawn to show the pressure-temperature relation according to the perfect gas law. It can be seen that at low altitudes (up to 1 gpkm) the density-temperature relation followed the shape of the isobars closely, resulting in good predictability of aircraft thrust and lift as a function of temperature only.

In addition to the standard deviation in temperature, the deviation in pressure was also investigated. Due to the fact that the pressure extremes during winter and summer were virtually the same as the average pressure distribution as shown in FIGS. 18A and 18B it is not presented in a separate figure. Due to the minimal pressure deviation, the extreme density was assumed to be a function of temperature only. The relationship between temperature and density on extremely cold days is shown in FIG. 22. As can be seen in FIG. 22, near sea level the density-temperature relation followed the isobars closely, while at higher altitudes the deviation was larger, although a higher correlation with isobars was present than for the mean winter temperatures. The same trends between density and temperature hold on extremely cold days as well as on extremely hot days throughout the range of latitudes shown in FIG. 21.

BRIEF SUMMARY OF INVENTION

The invention is a novel adaptive aerostructure is presented that relies on certified aerospace materials and can therefore be applied in conventional passenger aircraft. This structure consists of a honeycomb material which' cells extend over a significant length perpendicular to the plane of the cells. Each of the cells can contain an inelastic pouch (or bladder) that forms a circular tube when the cell forms a perfect hexagon. By changing the cell differential pressure (CDP) the stiffness of the honeycomb can be altered. Using an external force or the elastic force within the honeycomb material, the honeycomb can be deformed such that the cells deviate from their perfect-hexagonal shape. It can be shown that by increasing the CDP, the structure eventually returns to a perfect hexagon. By doing so, a fully embedded pneumatic actuator is created that can perform work and substitute conventional low-bandwidth flight control actuators. It is shown that two approaches can be taken to regulate the stiffness of this embedded actuator:

The first approach relies on the pouches having a fixed amount of air in them and stiffness is altered by a change in ambient pressure. Coupled to the ambient pressure-altitude cycle that aircraft encounter during each flight, this approach yields a true adaptive aerostructure that operates independently of pilot input and is controlled solely by the altitude at which the aircraft is flying.

The second approach relies on a controlled constant CDP. This CDP could be supplied from one of the compressor stages of the engine as a form of bleed air. Because of the air-tight pouches there would essentially be no mass flow, meaning engine efficiency would not be significantly affected due to this application. By means of a valve system the pilot could have direct control over the pressure and, consequently, the stiffness of the structure. This allows for much higher CDPs (on the order of 1 MPa) than could physically be achieved by relying on the ambient pressure decrease with altitude. This option does require more infrastructure like tubing, valves, and supporting electronics from the cockpit.

Applications of pressure-adaptive honeycomb are tailored primarily towards low-bandwidth applications like secondary flight control. The most profound application is the morphing of an entire wing section, from leading to trailing edge, due to the adaptive honeycomb. On a smaller scale, other examples include a solid state pressure-adaptive flap, a pressure-adaptive droop nose, a pressure-adaptive Gurney flap and a pressure-adaptive engine inlet. Each of these applications is based on the same principle of stiffness alteration with pressure and can be used with either actuation option (constant mass or constant pressure).

A model that relates the volumetric change of the honeycomb cells to the external blocked stress is shown to correlate well to experiments that are carried out on several test articles. Based on this model it is estimated that pressure-adaptive honeycomb has a maximum mass-specific energy density of 12.4 J/g, for the case of an externally applied CDP of 0.9 MPa (can be supplied from a high-pressure compressor stage of a gas turbine). In addition, it is shown that a maximum strain of 76% can be achieved and that the maximum blocked stress amounts to 0.82 MPa. In the case of a 40 kPa drop in atmospheric pressure and constant mass of air in the pouches, the maximum mass specific energy amounts to 1.1 J/g and a maximum blocked force of 70 kPa can be attained.

Pressure-adaptive honeycomb can be embedded into a 25% c adaptive flap on a NACA2412 wing section with a chord of 1.08 m. Wind tunnel tests at Reynolds number of 1 million demonstrated a shift in the $c_l$-$\alpha$ curve upwards by an average of 0.3, thereby increasing the maximum lift coefficient from 1.27 to 1.52. This successfully demonstrates the application of pressure-adaptive honeycomb embedded in a morphing aircraft structure. In summary, this morphing wing concept is relatively simple to manufacture and maintain, only contains certified materials and is competitive with contemporary conventional wings in terms of aerodynamic efficiency during cruise and high lift performance during take-off and landing.

It should be noted that the present invention for an adaptive morphing structure utilizing embedded pressure adaptive honeycomb cells can not only be utilized in various aerostructures including those noted herein and vertical tails, canards stabilizers, but can also be utilized in non aero-structures requiring adaptive morphing or deformation including airfoils in general. For example, the technology could be utilized for blades of a propeller, rotor or turbine, or for a sail. A specific example could be an adaptive blade for a wind power generator where the blades of the generator are adapted to morph or deform based on the current direction of the wind in order to maximize efficiency. Another specific example is that the blades of a turbine or compressor can be adapted to morph or deform based on the environmental or load conditions to run more efficiently. The blades for powering a submarine or the various fins for guidance can be morphed for maximum speed, maximum maneuverability, maximum silence, and or stopping abruptly. The adaptive morphing structure could be utilized for fins utilized in various fluid flow or air flow damping or flow control systems.

These and other advantageous features of the present invention will be in part apparent and in part pointed out herein below.

BRIEF DESCRIPTION OF THE DRAWINGS

For a better understanding of the present invention, reference may be made to the accompanying drawings in which:

FIGS. 24A-24B Example of a Curvature Change due to Pressure-adaptive Honeycomb

Table 2.1 Comparison of Actuator Technologies

Figure 1A:
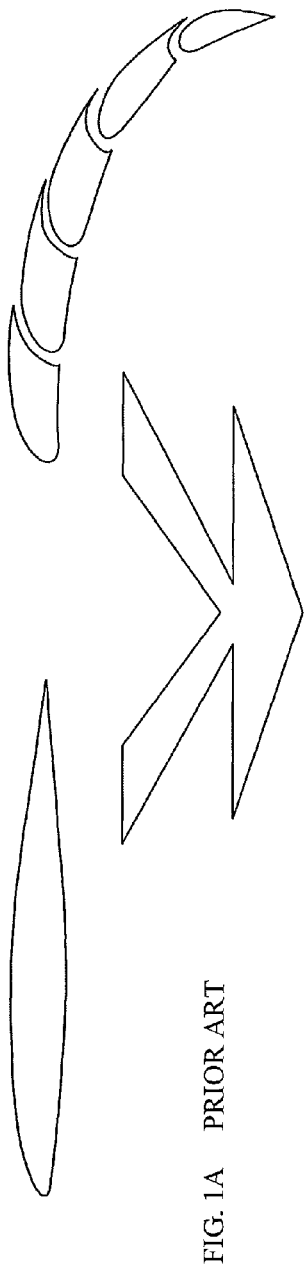
FIGS. 1A-1C Conventional and Morphing Approach to Satisfy Maximum-L/D and Maximum-Lift-Coefficient Requirements FIG. 2 Examples of Airfoil Geometries and Their Characteristics FIG. 3 Influence of Reynolds Number on Maximum Lift Coefficient FIGS. 4A-4K Effect of Flap Type on Maximum Wing Lift Coefficient for an Unswept, A=6 Wing FIG. 5 Maximum Lift Coefficients for Modern Jet Transport Aircraft (obtained from Data of Table 2.2 and Eqs. 2.2 and 2.3)
Figure 1B:
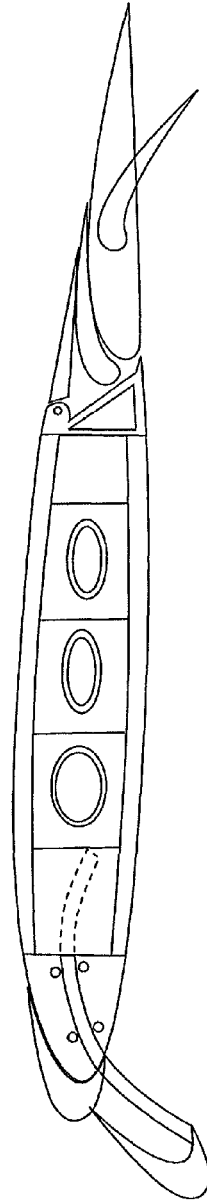
Figure 1C:
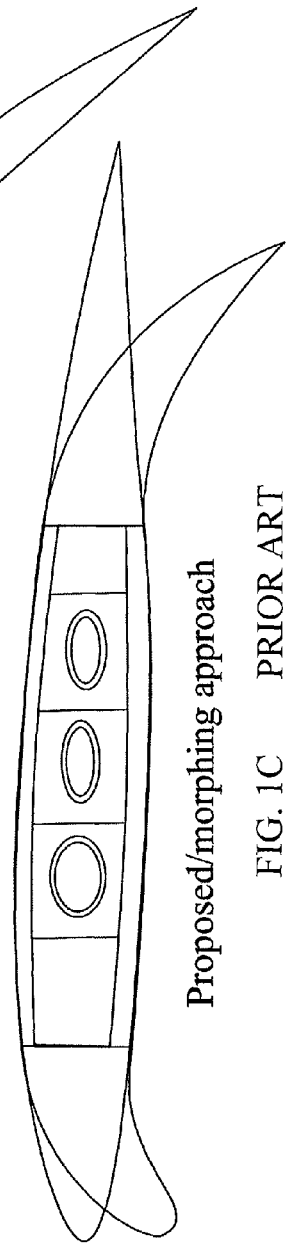
Figure 3:
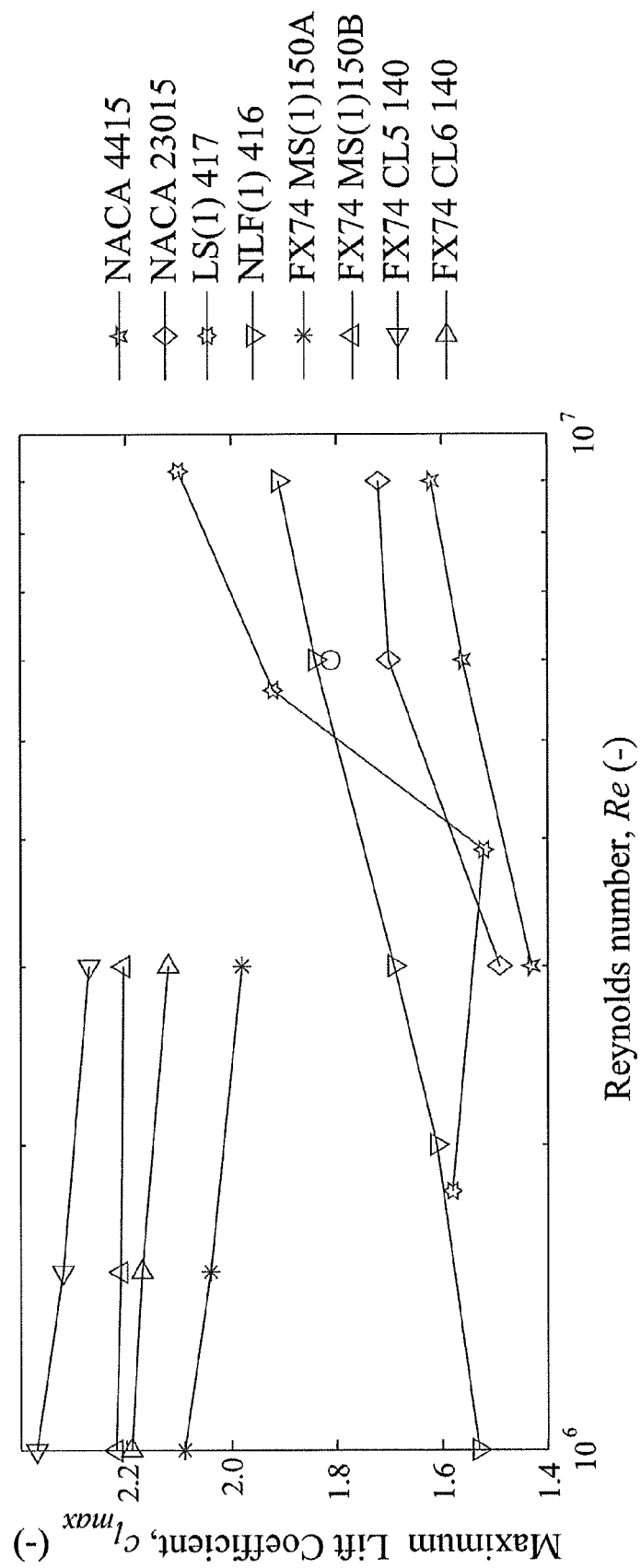

Table 2.2 Details for a Selection of Modern Transonic Transport Aircraft

Table 3.1 Geometric Properties of Pressure-adaptive Honeycomb

Table 4.1 Intrinsic Properties of Pressure-Adaptive Honeycomb

Table 4.2 Critical Amplification Factors for Various situations

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in the Figures. For further supporting information and data including test data—U.S. Provisional Patent Application Ser. No. 61/229,175, filed Jul. 28, 2009, entitled METHOD AND APPARATUS FOR PRESSURE ADAPTIVE MORPHING STRUCTURE, is hereby incorporated by reference in its entirety herein.

One embodiment of the present invention comprising a pressure adaptive honeycomb structure teaches an apparatus and method for a pressure adaptive aero-structure adapted for structural morphing deformation.

Based on the general outline of desired morphing properties, past efforts in wing morphing, and possible atmospheric stimuli, the present application presents a pressure adaptive morphing structure and a aircraft aero-structure morphing concept. For actuation, this concept can rely on the atmospheric pressure difference that exists between take-off and cruise altitudes or commanded pressure changes from within. A solid state compliant structure based on ordinary honeycomb cells is used to enhance structural deformation. The fundamentals of this concept are set forth herein, which explains why this is a feasible option. Also set forth herein are possible specific applications of this technology. Also the sources that are available to actuate this adaptive structure are described herein.

An adaptive structure can be developed that has low part count, complexity and that can be manufactured from conventional aerospace materials by utilizing the present invention for a pressure-adaptive honeycomb structure. It can be made from aluminum and nylon pouches at relatively low cost, with a low part count, and can be easily integrated in conventional aerospace structures or other structures requiring adaptive morphing technology. Pressurized honeycomb embedded structures have not been used in previous adaptive structures. Conventional inflatable structures have been around for several decades and have proven their applicability in aerospace structures. Partial inflation of individual cells on inflatable wings has been shown to alter airfoil geometry and change the aerodynamic characteristics. The only pneumatic actuator that could be qualified as an adaptive structure is a pneumatic artificial muscle that was designed to actuate a flap system. All these research efforts differ substantially from the fundamental concept that is the subject matter of the present invention.

If atmospheric stimuli are used to control morphing properties on an aircraft, the predictability of these stimuli is important to the performance of the aircraft. If an adaptive structure is built that relies on the temperature difference between take-off and cruise altitude these global and seasonal temperature variations should be accounted for. Tailored structures that rely on a particular transition temperature might work very well. However, since these structures rely on specific uncertified shape memory alloys they cannot be used in aircraft primary or secondary structure. Adaptive laminates that rely on the difference in coefficient of thermal expansion (CTE) between individual lamina (e.g. an aluminum carbon fiber laminate), in turn, require a consistent temperature range to function properly. In addition to the varying ambient temperature it should also be noted that aerodynamic heating during transonic conditions might offset part of the temperature decrease that is encountered as aircraft climb to higher altitudes. In conclusion, temperature induced morphing would not be feasible to install on modern transonic jet transports.

Pressure, on the other hand, does show consistent values throughout seasons and latitudes. Pressure differences between take-off and cruise altitude can be as much 80 kPa. Utilizing this pressure difference properly could result in solid stated pneumatic actuator elements producing large strains and relatively high forces. In addition, conventional, certified aerospace materials could be used to make up a comparatively uncomplicated adaptive structure.

Figure 23C:
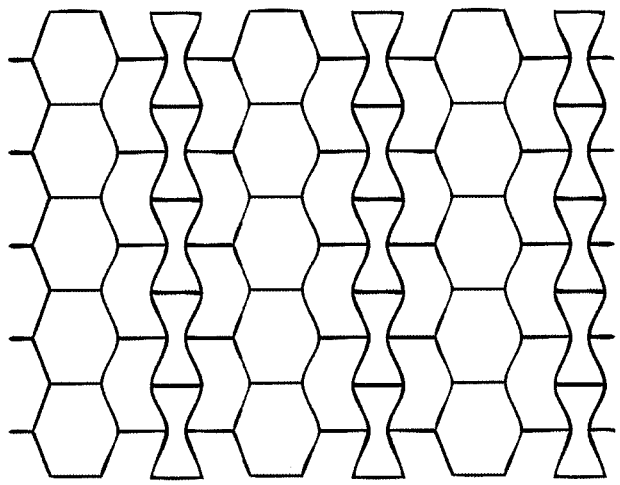
FIGS. 23A-23C Types of Honeycomb used in Aerospace Applications
Figure 23B:
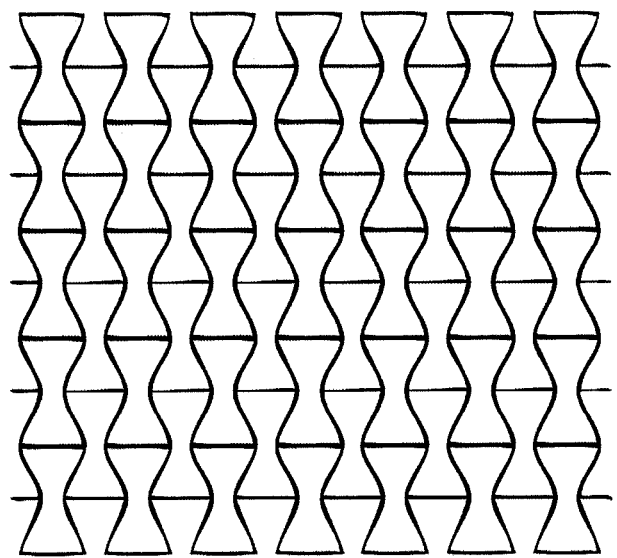
Figure 23A:
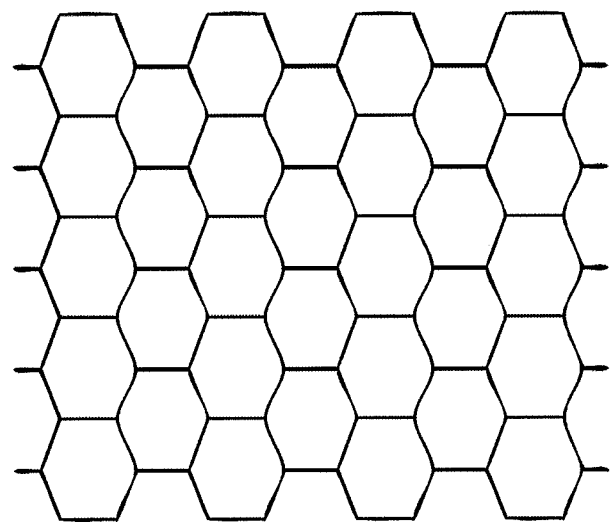

Several types of honeycomb are used (FIG. 23), of which the standard type is most common. The auxetic type can exhibit comparatively large strains in all directions, while the hybrid honeycomb exhibits no lateral contraction upon deformation in horizontal direction.

A pressure-adaptive structure based on honeycomb cells can be realized by sealing off the ends of each of the honeycomb cells at a particular geometry. When there is a fixed amount of air in each of the cells, the pressure between the inside and outside can control the shape of the honeycomb. By pressurizing the honeycomb it tries to assume a shape close to a perfect hexagon. Strained honeycomb therefore tries to go back to a perfect hexagonal shape when the pressure in the cell exceeds the ambient pressure. Consequently, an airtight honeycomb structure can be used as a pressure-adaptive structure, exhibiting comparatively large strains and high forces. It therefore qualifies as a narstic structure.

When the pressure difference between the cell and its surroundings is increased, the pressure stiffness increases accordingly. This pressure difference is generally referred to as the CDP (cell differential pressure): $CDP=p-p_a$, where p is the pressure in the cell and $p_a$ the ambient pressure. Whether using the powered approach (controlling p) or relying on the change in ambient pressure ($p_a$), the geometric properties of the honeycomb pose some physical limits on the amount of shape deformation that can be achieved. Whether using the auxetic, regular or hybrid honeycomb, the longitudinal strain is independent on the number of cells that are stacked. The absolute change in geometry is linearly related to the strain of one cell.

In TABLE 3.1 three possible deformation schemes are presented. In the first column the deployed shape of the honeycomb is displayed. This is the shape the honeycomb cells would ideally take when no CDP (p) is applied. In the second column the perfect hexagon is shown. This is the shape the hexagon takes when an infinite CDP is applied. Next to that are the maximum strains in horizontal (x) and vertical (y) direction. With strains being defined as:

$$\varepsilon_x = \frac{x_0 - x_1}{x_0} \quad \varepsilon_y = \frac{y_0 - y_1}{y_0} \tag{2.1}$$

Those are the maximum strains that the honeycomb experiences during its transformation between the two shapes. The strain is measured with respect to dimensions of the honeycomb when its cells form perfect hexagons (as in the second column). The final column displays the change in honeycomb angle that is required. The honeycomb angle is the angle measured between the diagonal member and the horizontal and is denoted with θ. This parameter is a good indication for the amount of bending that the walls of the honeycomb cells need to sustain in order to deform between the two given shapes.

From the data of TABLE 3.1 it can be seen that the most linear displacement in X direction can be found when the honeycomb changes between the auxetic shape and the regular shape. A potential disadvantage for this shape is the fact that the strain in y direction changes sign during deformation. When a small amount of bending is required in the honeycomb (to prevent any plastic deformation, for example) it can be wise to limit the change in honeycomb angle and have a shape change between rectangular and hexagonal honeycomb. A deformation between those two shapes is also required in hybrid honeycomb if no net longitudinal strain is allowed. There is a potential for very high lateral deformation.

Apart from linear deformation, a pressurized honeycomb can be used to induce changes in curvature when it is bounded on one side to a plate. A schematic example of how this can be achieved is shown in FIG. 24. Here, a rectangular honeycomb is used as the cell that border the free boundary. This results in a convex shape of the curved plate. If the cells that borders the free boundary were flat in their default shape, the plate would display a concave curvature.

The maximum curvature that can be achieved is based on the number (N) cells that are stacked atop each other and the characteristic length, l, of the honey comb walls. It can be shown that given these inputs, the curvature, K, of the plate is a function of the honeycomb angle of the cell touching the plate ($\theta_1$) and the honeycomb angle of the cell at the free boundary ($\theta_N$):

$$K = \frac{1}{l(1+\cos\theta_1)} \times \frac{\cos\theta_N - \cos\theta_1}{\sin\theta_1 + \sin\theta_N - 2\sum_{j=1}^{N}\sin\theta_j} \quad (2.2)$$

The honeycomb angles of the cells that are in between the first and last cell are linearly distributed according to:

$$\theta_j = \frac{\theta_N - \theta_1}{N-1} \quad (2.3)$$

Figure 25A:
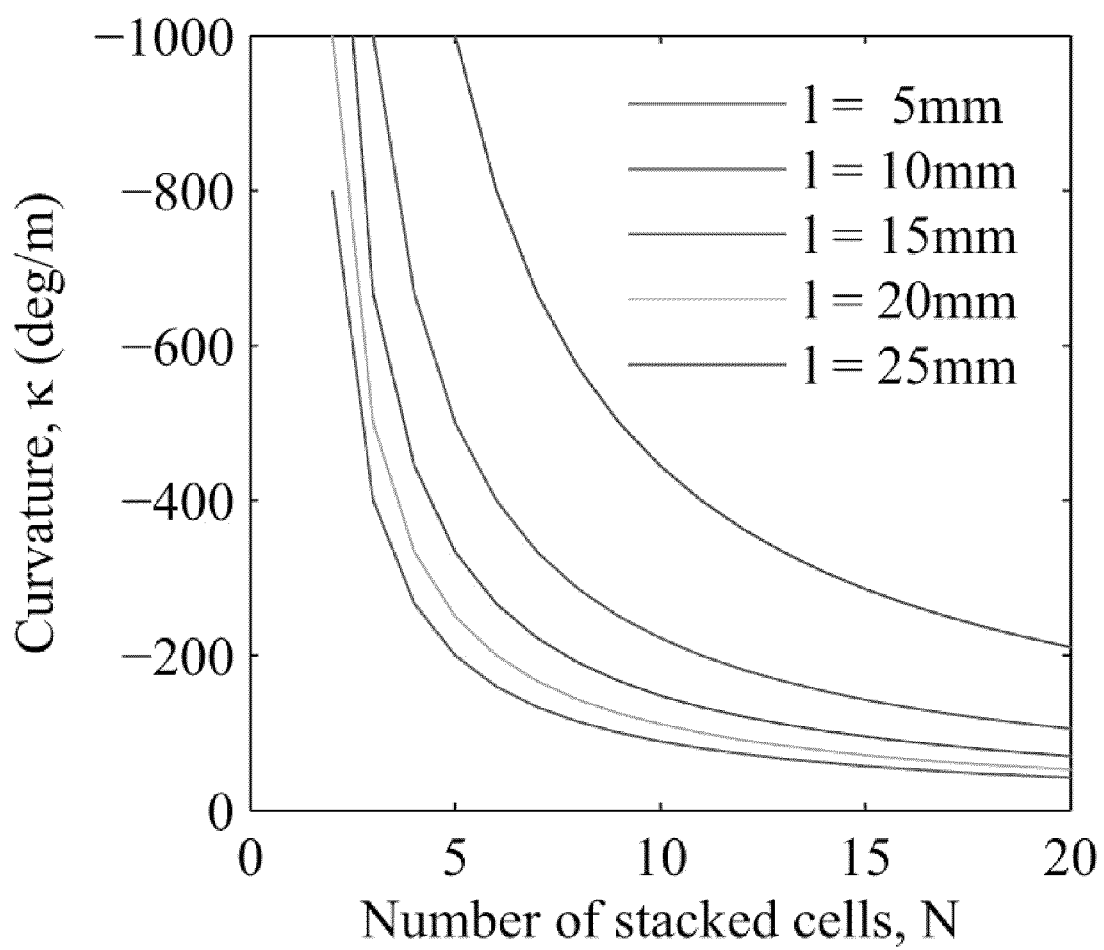
FIGS. 25A and 25B Change in Maximum Curvature with Stacked Cells
Figure 25B:
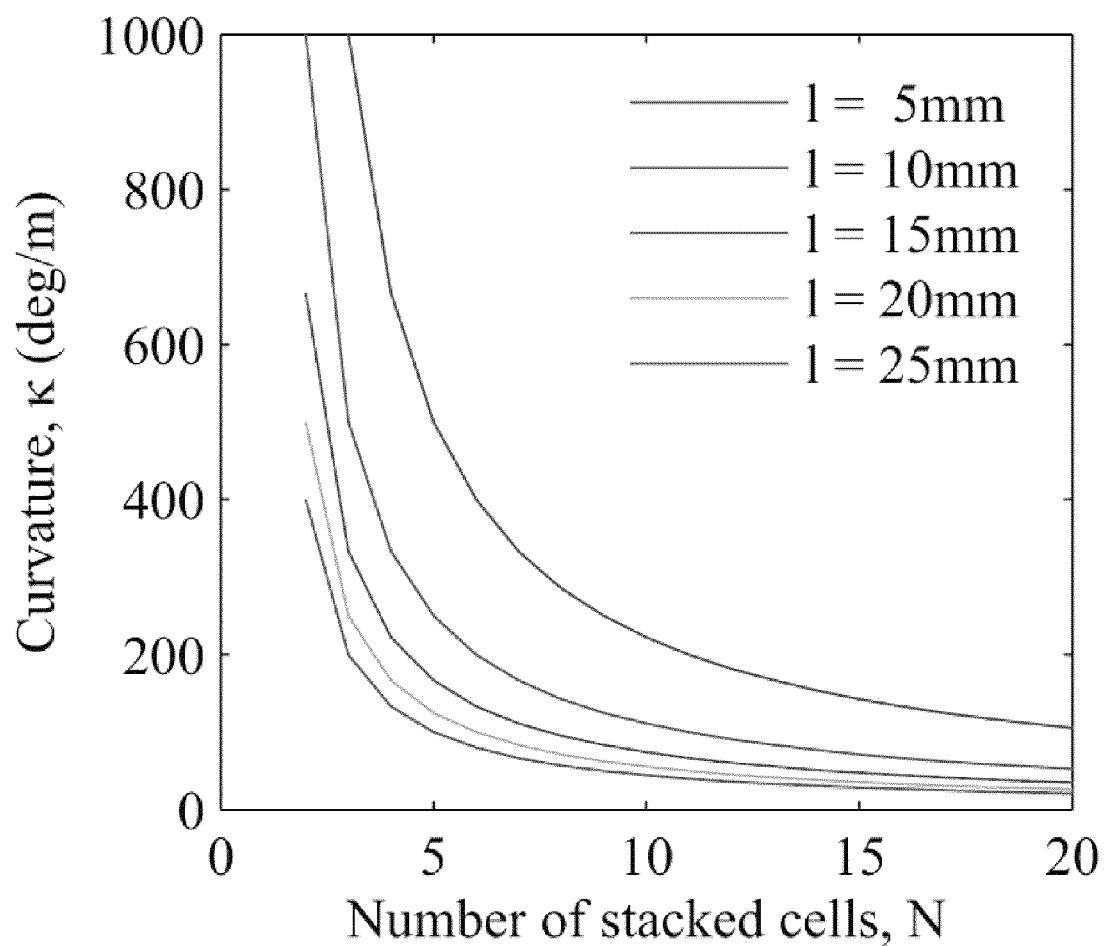

Equation 2.2 is plotted in FIGS. 25A and 25B for two different cases: $\theta_N=90°$ and $\theta_N=0°$. These cases correspond to a rectangular and a flat honeycomb cell at the free boundary, respectively (see also the two bottom rows of TABLE 3.1). In this case, it has been assumed that the cell that interfaces with the fixed boundary has a honeycomb angle of $\theta_1=60°$.

From the graphs above it can be seen, that by increasing the number of stacked cells, the maximum absolute curvature decreases. Also, with a larger honeycomb face length this decrease is much steeper. Comparing both graphs, it can be observed that the change in curvature induced by the honeycomb having a flat cell at the free boundary is considerably larger than for the honeycomb with a rectangular cell at the boundary. This is due to the fact that the latter one does not display as much change in lateral strain ($\epsilon_y$) during deformation as the first one. The total honeycomb thickness (measured between the fixed and the free boundary) is much smaller for the deployed honeycomb with a flat cell at the free boundary than it is for the deployed honeycomb with a rectangular cell at the free boundary. That said, the incremental thickness variation between deployed and retracted state can be calculated as follows:

$$\frac{\Delta t}{t_i} = \frac{2\sum_{j=1}^{N}\sin\theta_j}{2N\sin\theta_1} - 1 \quad (2.4)$$

Noting that the relative thickness change is independent of the wall length, Equation 2.4 is valid for any honeycomb size. When 20 cells are stacked atop each other, the relative change in thickness amounts to 45% for the case when a flat cell is at the free boundary and only 10.5% when a rectangular cell is at the free boundary.

Based on the fundamental principles of pressure induced morphing a variety of applications can be envisioned. This section lists some of these applications and demonstrates how aircraft could benefit from the addition of a pressure-adaptive structure. The application examples noted can be tailored to replace conventional high lift devices. Because of their complexity, part count and weight, replacing high lift devices with an adaptive structure of similar capability would be most beneficial. It is shown that a 250 klb aircraft employing double slotted flaps uses approximately 2430 individual parts, contributes over 4000 lb to the OEW, and takes up 5% of the airplane manufacturing costs. In addition, translating slats add 2640 lb, comprise of approximately 2700 parts and account for 3% of the manufacturing cost.

Figures 26A, 26B, 26C:
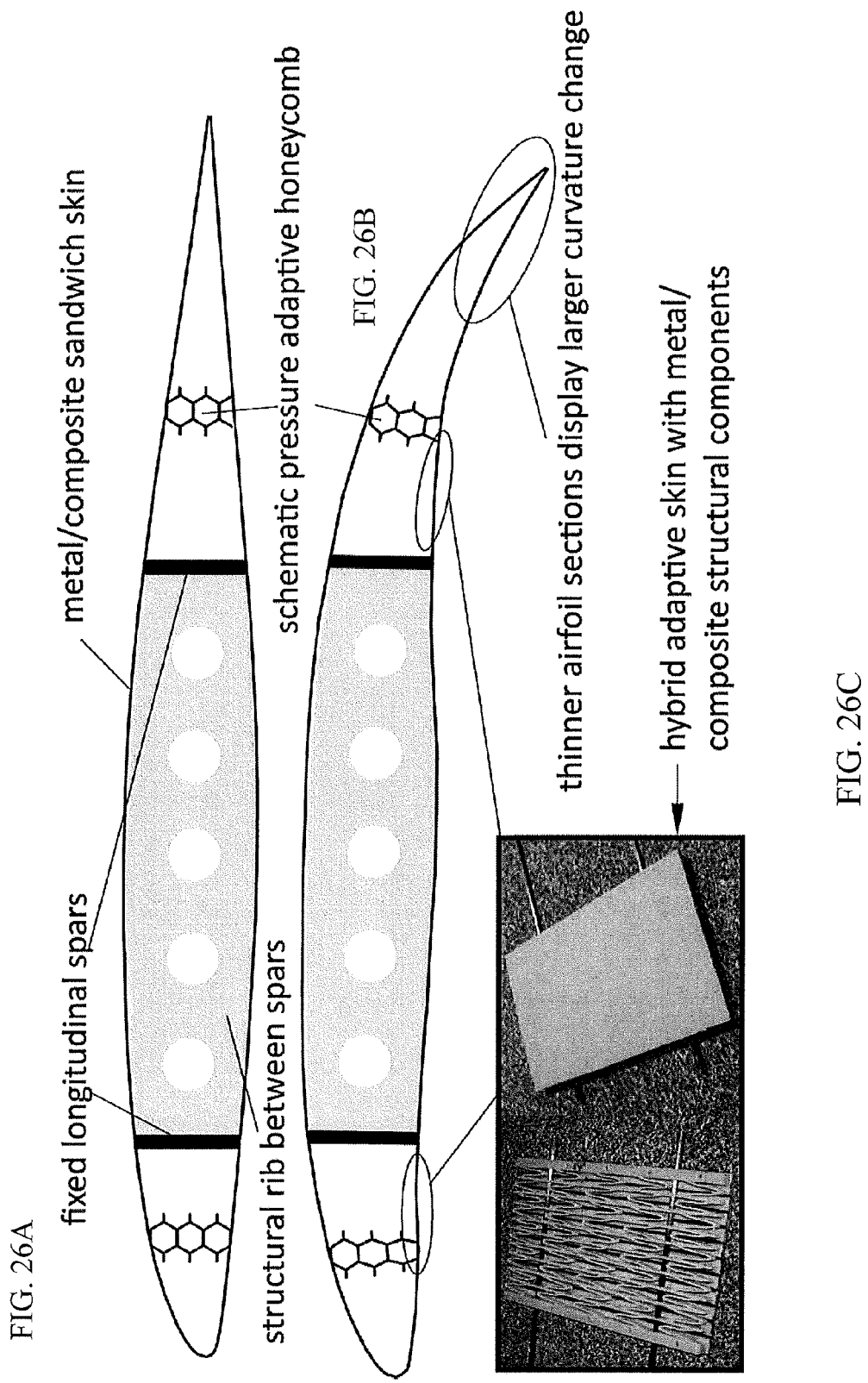
FIGS. 26A-26C Schematic of Morphing Airfoil Utilizing Pressure-adaptive Honeycomb FIGS. 27A-27C Sketch of Application of Pressure-adaptive Honeycomb on a 5% Gurney Flap FIGS. 28A-28B Sketch of Pressure-adaptive Solid State Plain Flap FIGS. 29A-29B Potential Application of Pressure-adaptive Honeycomb for LSA Wing FIG. 30 Sketch of Pressure-adaptive Engine Intake Lip Based On Hybrid Honeycomb FIGS. 31A-31B Sketch of Hinged Pressure-adaptive Elevator for Enhanced Down Force FIGS. 32A-32B Sketch of Pressure-adaptive Leading Edge on Horizontal Stabilizer FIGS. 33A-33B Sketch of Pressure-adaptive Droop Nose (Cross Section)

The most profound application of pressure-adaptive honeycomb is its integration into an entire wing section. The proposed airfoil profile of such a section is shown in FIG. 26. A brief description about its features follows.

This proposed design features pressurized honeycomb over the entire section of the airfoil except for the torque box. To allow for the large induced curvatures the bottom skin needs to be flexible. A compliant skin can be manufactured that allows strains in excess of 30% and does not suffer from lateral contraction. A picture of this hybrid adaptive skin is shown in FIG. 26 in the lower left inset. The structural grid of this skin is similar to the workings of a hybrid honeycomb grid and can be manufactured out of metal or composite materials. The skin provides enough flexibility to allow for complete morphing and simultaneously is able to sustain the aerodynamic loads at the pressure side of the airfoil. In addition, the elasticity of the skin can be used as a restoring force for the honeycomb to enforce its cambered shape when no CDP exists.

The size of the pressure-adaptive honeycomb should be determined at a later stage based on structural, manufacturing, and weight requirements. In FIG. 26 it is merely shown as an indication of the workings of the pressure-adaptive honeycomb in this concept. Notice how the honeycomb changes from a perfect hexagon close to the upper skin (which is the fixed boundary) to a rectangle close to the lower skin. This gradual transition induces a curvature in the upper skin and an increase in camber with respect to the baseline shape. At the same time, the total thickness of the wing increases as well.

From this conceptual sketch, the change in camber is difficult to predict. This is because the boundary conditions that are enforced by the spars might interfere greatly with the possible camber change. However, it is expected that the amount of camber can be changed substantially (in excess of 5% c). Based on the analysis in the previous section it can be deduced that at the thinner sections (e.g. near the trailing edge) the induced curvatures are larger than at the thicker parts of the section. This results in a highly curved trailing end of the wing.

There are multiple aerodynamic benefits that could be deduced from this morphing section. First of all, notice that there are no external actuators. There is no need for flap-track fairings or other external additions that increase interference drag. At the low speed realm there are more mutual benefits to be gained from this morphing airfoil. The camber of the wing can increase significantly which means added maximum lift capacity (see FIG. 9). The nose becomes thicker, which means the relative change in thickness between the 0.15% c and the 6% c becomes larger. According to FIG. 10 this also contributes to a higher maximum lift coefficient.

Naturally, the continuous flap contributes greatly to the increase in $C_{l_{max}}$. However, at this point it is still difficult to quantify each of these performance increases because the shape of the wing in low-speed and in cruise-speed configuration can still only be estimated. A detailed two-dimensional finite element analysis can be carried out to nail down the exact shapes in the two configurations. A two-dimensional panel code could be employed to calculate the aerodynamic coefficients at various angles of attack.

Structurally, the adaptive structure can be designed to be able to guide the distributed load from the skin panels via the spars to the fuselage of the aircraft. To that extent, this concept employs fixed spars that are connected chord-wise by fixed ribs. The spars form the backbone of the adaptive wing structure, as they do in a conventional wing.

The top skin can assist in keeping a proper shape both during cruise and the low speed realm of the mission profile. Since no shape ribs are available in front of and behind the torque box, one embodiment proposes to make the skin slightly thicker than conventional wing skin such that it is stiffer and can provide the desired wing shape. By making a sandwich structure of two thin metal or composite plates with a foam or honeycomb core the thicker skin does not necessarily need to be much heavier. Since structural interconnection between the skins and the adaptive honeycomb can be done using adhesives rather than rivets (except for maybe at the spars), a sandwich skin does not significantly affect assembly.

The challenge in designing and manufacturing this structure is the large difference between the jig shape of the product and the shape during cruise. It would be most convenient to start from a desired supercritical wing section, apply the pressurized honeycomb, and calculate (using for example finite element software) the shape the section would take when no CDP would be applied. From a manufacturer's point of view it would then be straightforward to fabricate all the individual components according to the zero-gage-pressure shape. After assembly is complete the section should then be tested to see if the wing returns to its supercritical shape once the prescribed CDP is applied. When the ambient pressure is employed to deform the wing shape, this experiment requires a vacuum chamber that enables a lowering of the pressure surrounding the wing. If a pressurized approach is used, this test is easier to carry out by just pressurizing the honeycomb cells.

A Gurney flap is a small trailing-edge tab that can increase high lift capabilities on airfoils and airfoils employing high lift devices. When properly designed, a Gurney flap can increase the lift-to-drag ratio and the maximum lift coefficient of the wing during take-off and landing conditions. However, during transonic conditions a Gurney flap can produce wave drag and flow separation resulting in a reduction in lift-to-drag ratio. An adaptive Gurney flap that retracts during cruise operations could therefore be beneficial. An example of a pressure-adaptive Gurney flap is presented in FIG. 27. In this example a double slotted flap system is used as the baseline wing section and a 5% c Gurney flap is considered. For an adaptive Gurney flap to be effective it should produce a higher lift to drag ratio when the flaps are in take-off configuration and a higher maximum lift coefficient when the flaps are in landing configuration.

Similar to the solid state flap the pressure-adaptive Gurney flap can be based on regular honeycomb that in its unstrained configuration is strained and attached to a curved lower skin panel. The spring force in the honeycomb and the spring force in the curved lower skin provide a restoring force that deploys the solid state Gurney flap. When the relative pressure in the pouches is increased, the strained honeycomb contracts and retracts the Gurney flap. The upper skin slides over the top of the honeycomb by means of a simple mechanism that needs to be developed. The honeycomb attaches to the rear spar of the flap and fills the entire trailing edge. It runs over the entire span of the flap.

Figure 4:
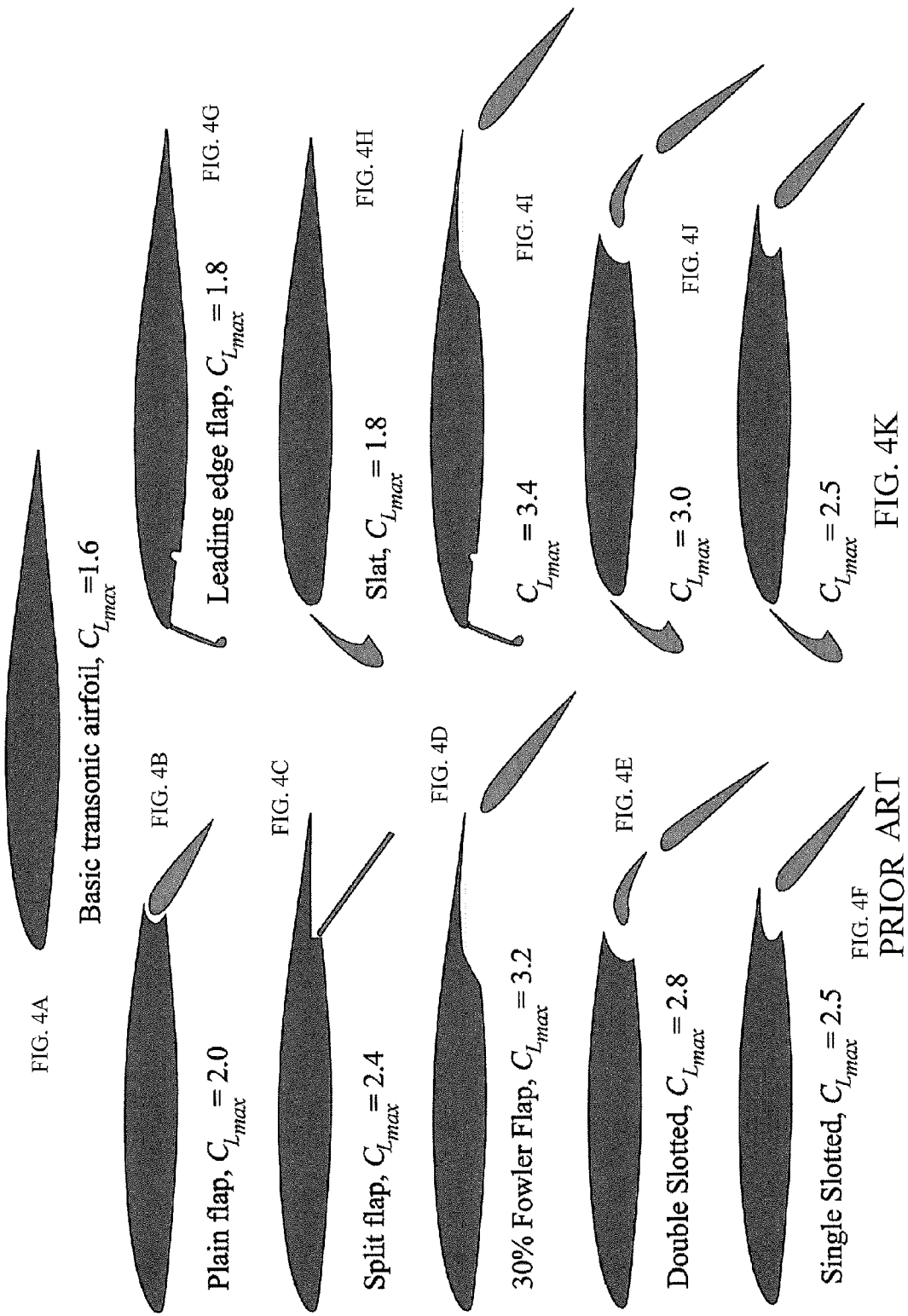
Figure 5:
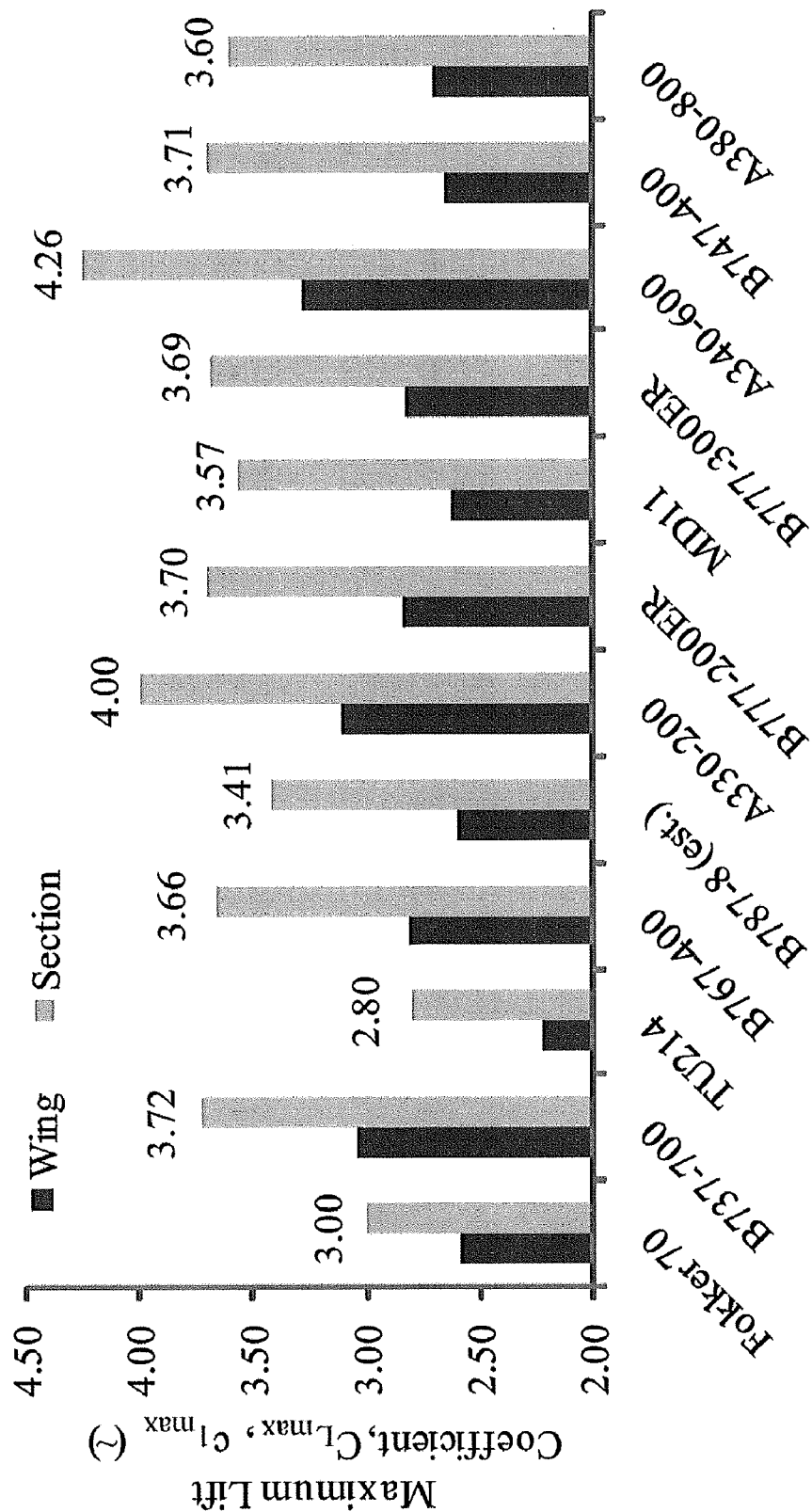
Figure 6A:
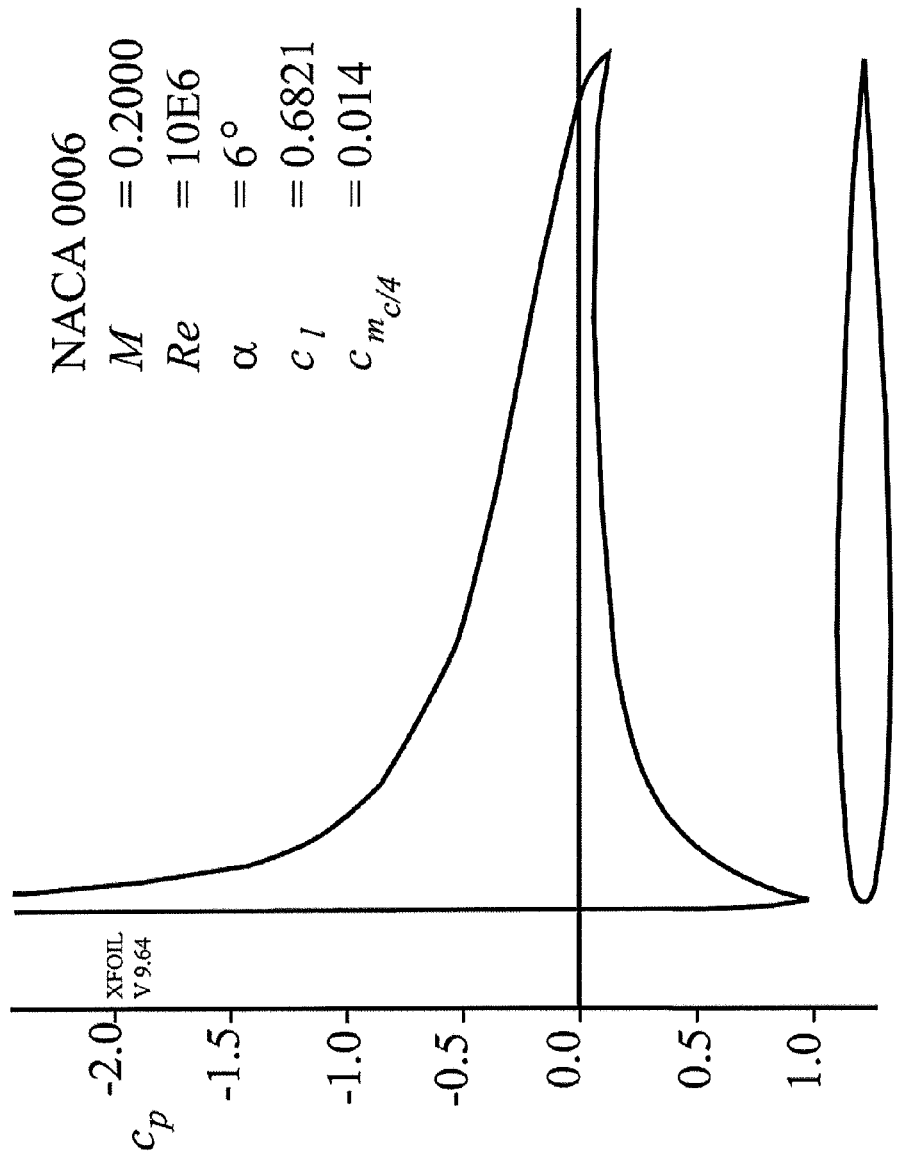
FIGS. 6A and 6B Effect of Thickness Ratio on Pressure Gradient
Figure 6B:
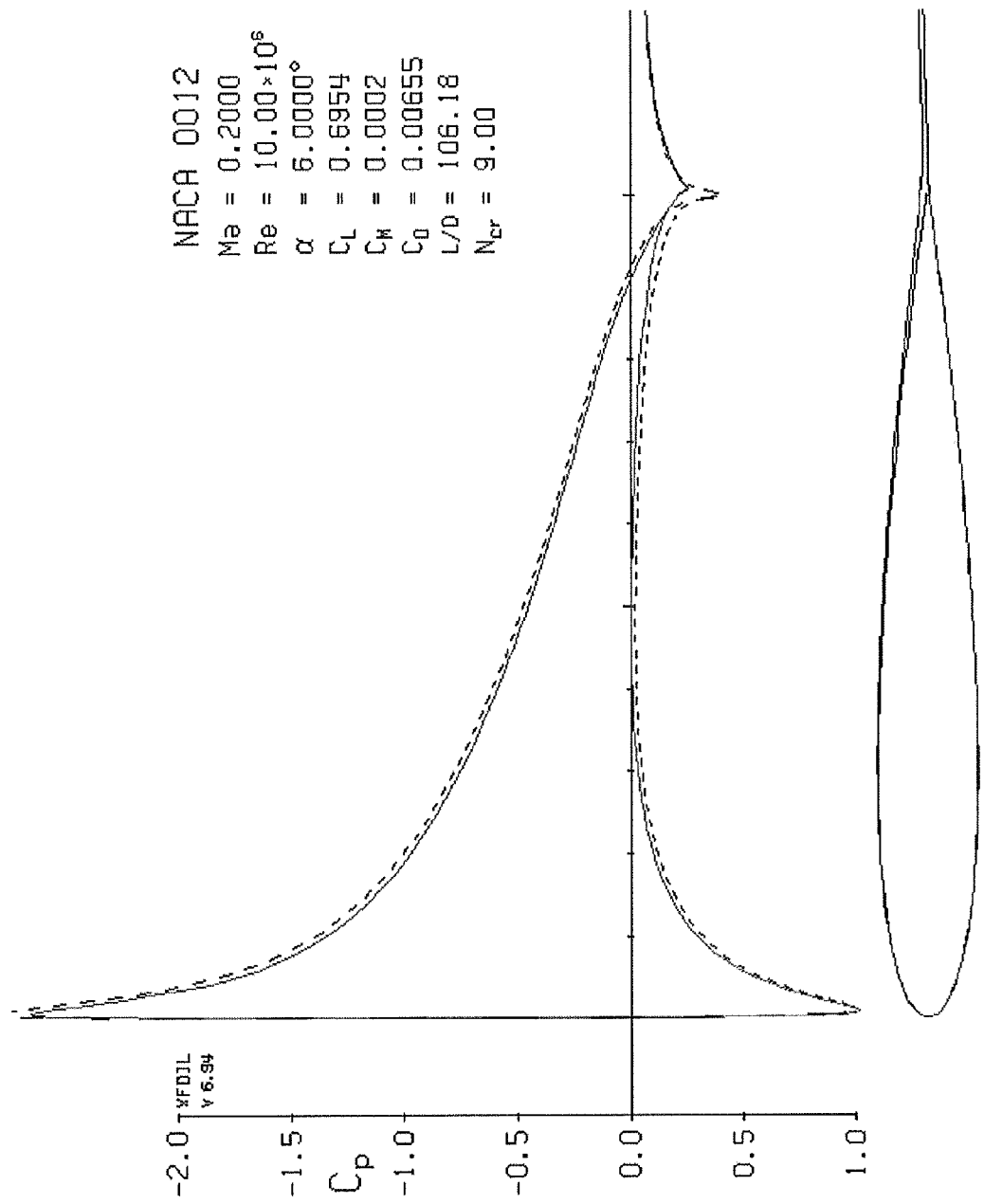
Figure 7A:
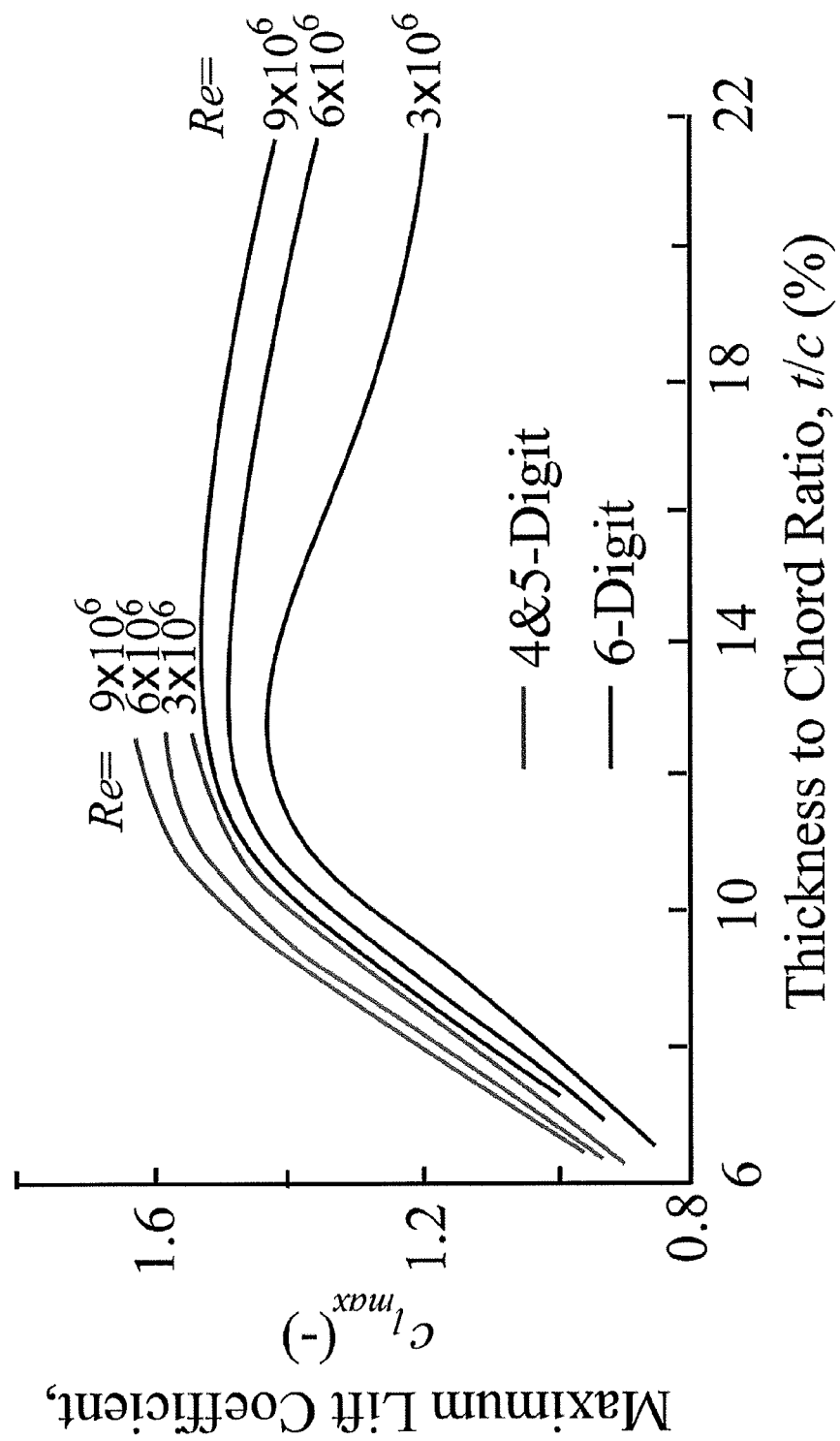
FIGS. 7A and 7B Effect of Thickness Ratio and Reynolds Number on NACA Airfoil Maximum Lift coefficient (Reproduced from p. 363 in Ref. 38)
Figure 7B:
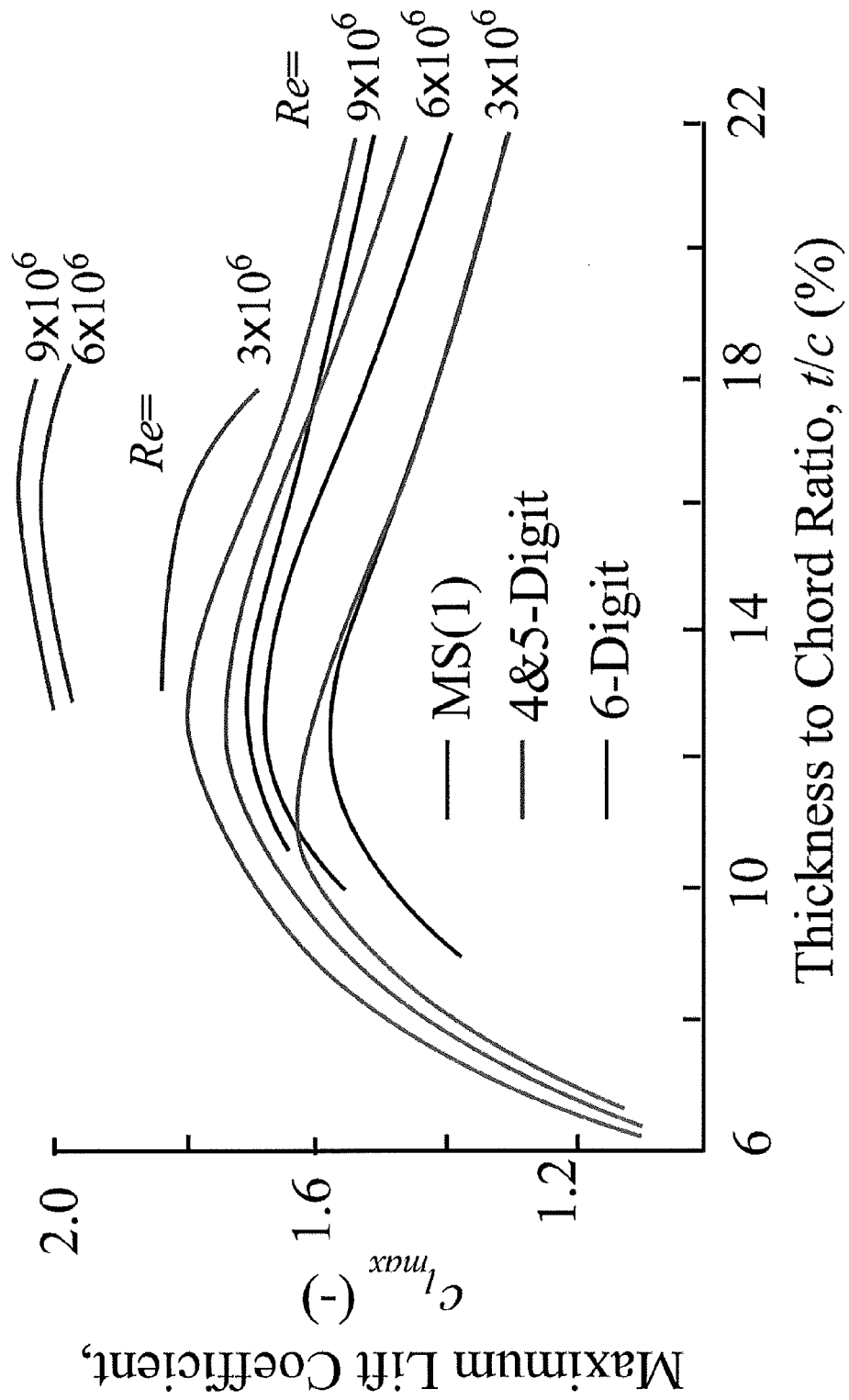
Figure 8:
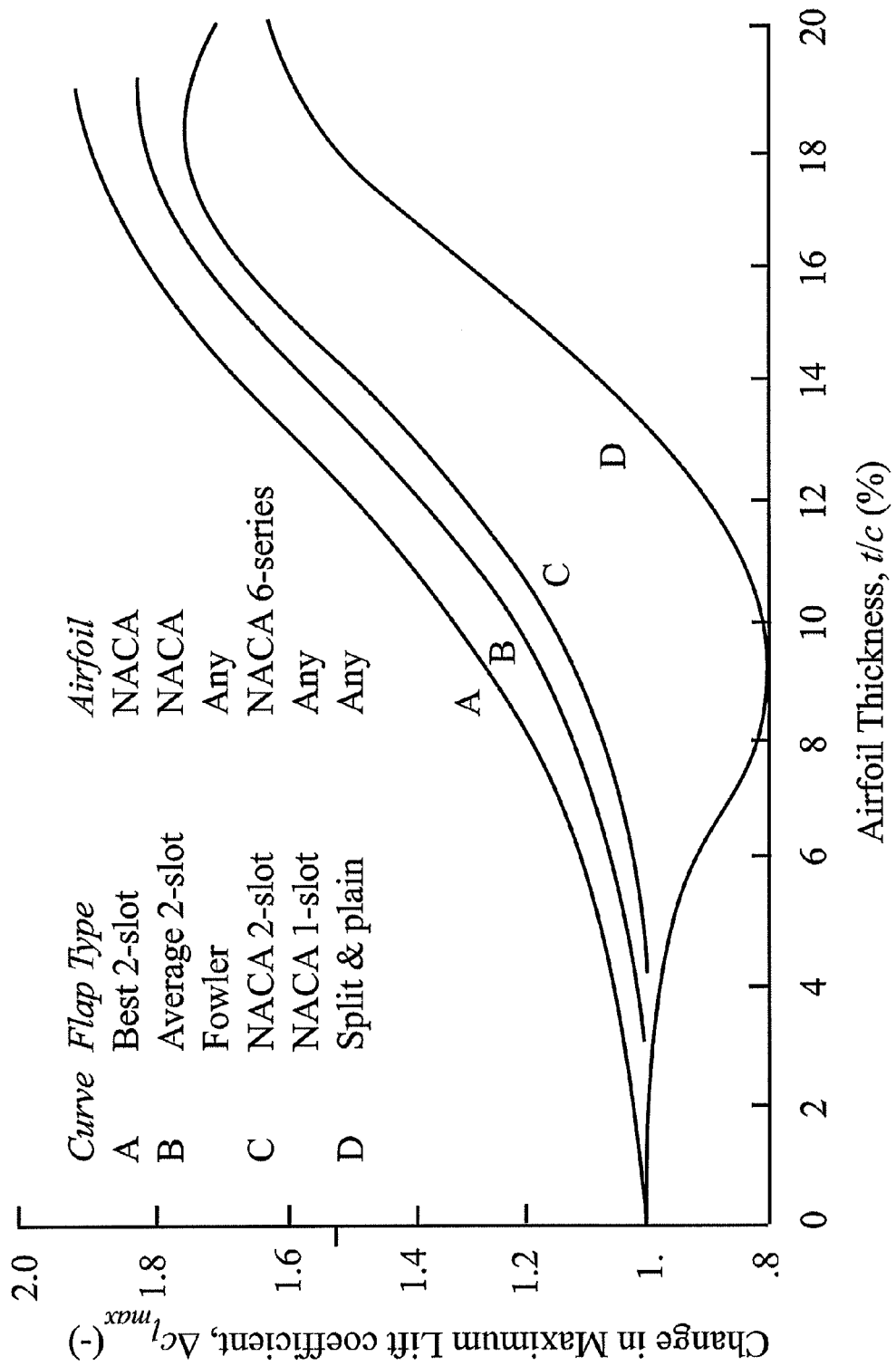
FIG. 8 Basic Airfoil Maximum Lift Increment due to Trailing Edge Flaps, Given for a Flap Chord to Airfoil Chord Ratio of 25% and Reference Flap Deflections: Fowler=40°, 1 Slot=45° 2 Slot=50° and Split and Plain=60° (Reproduced from p. 240 of Ref. 38)

The pressure-adaptive solid state flap application example that is proposed is similar to a plain flap, only with a continuous shape change rather than being hinged about a pivot point. According to FIG. 4 a plain flapped airfoil (25%) can have a lift coefficient of 2.0, adding about 0.4 to the baseline airfoil. Since the solid state flap does not translate nor display a slot, it does not benefit from an increase in chord or the jet effect. Therefore, lift coefficients are below the lift coefficients found on single slotted Fowler flaps. However, the solid state flap has other benefits including a low part count. It also does not require any flap tracks, which yields lower maintenance cost and a drag reduction. Since there are no hinges or sliding parts in this concept, the wear on the structure is minimal. In addition, no external actuators are required to deploy the solid state flap as it relies on the atmospheric pressure decrease with altitude.

FIG. 28 shows a possible configuration of the solid state flap on a transonic airfoil. It can be seen how the honeycomb attaches to the bottom skin of the wing. The wing skin and honeycomb are in their default, unstrained configuration when the flap is deployed. When the structure is activated, the honeycomb contracts and retracts the flap to its cruise configuration. The size of the honeycomb that is shown in FIG. 28 is merely to indicate where the honeycomb would go. Actual cell size and material sheet thicknesses can vary and should be determined as a function of the required restoring force and stiffness properties. The upper skin of the flap is not bonded to the honeycomb but slides over the upper surface of the cells. A simple sliding mechanism attaches the upper skin to the honeycomb.

In addition, both the upper and lower skins can be pre-curved metal or composite sheets. They can provide a restoring force such that the flap is deployed at low altitudes. Naturally, the sheet thickness can be limited by the yield strain of the material that is used for the lower and upper skins. One way to increase the total thickness of each of the skins is stacking two or more layers of sheet metal (composite) together with an elastomeric adhesive in between them. The elastomeric tape allows for the individual layers to slide with respect to each other. This lowers the strain that the material experiences in deployed position. Furthermore, the elastomeric adhesive also serves as a damper and can therefore limit excitations of the solid state flap during aerodynamically induced vibrations.

Figures 29A, 29B:
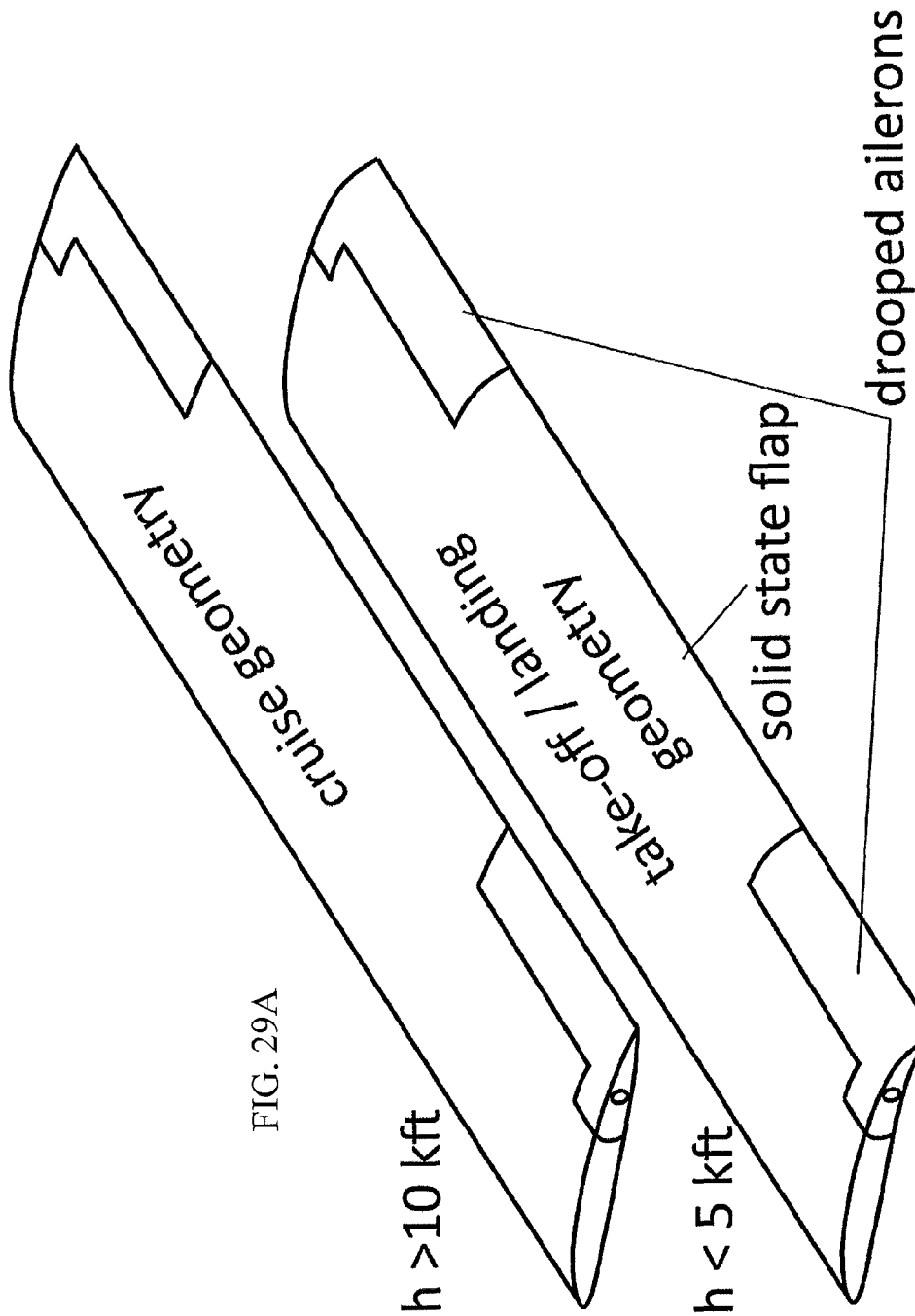

Another class of aircraft that could potentially benefit from this technology would be the light sport aircraft (LSA). Even though their operational ceiling is typically limited to 15,000 ft (e.g. Jabiru J250 [124]), this could be enough pressure difference to induce the required strain in the pressure-adaptive structure. By applying the pressure-adaptive honeycomb over the last 25% of the chord and over the entire span of the wing (including the ailerons) the pressure-adaptive honeycomb could be a low-weight replacement for mechanical plain flaps. No fuel storage space is compromised using this concept and there is no need for leverages that control the flap settings. An impression of such an LSA wing is presented in FIG. 29. In this example, the engagement altitude is fixed at a 5,000 ft and the full-pressurization altitude is set at 10,000 ft. In between those altitudes the flap setting changes gradually between the two positions sketched in FIG. 29.

The hinged ailerons in this conceptual design work the same as conventional ailerons. However, their internal structure of ribs and stringers is replaced by the pressure-adaptive honeycomb. The fact that both ailerons droop down creates a force balance on the control mechanism, which means no net hinge moments are created that need to be compensated by the pilot. The pilot is able to operate the ailerons in the same manner, whether they are drooped down or in cruise configuration.

The shape of engine inlets is a compromise between an optimal shape at transonic velocities and an optimal shape at low subsonic velocities. The inside of the intake lip is shaped such that it allows for attached flow at high angles of attack and slip angles. On the other hand, the outside of the lip is designed to ensure attached flow during transonic conditions. The first condition requires a relatively blunt, well rounded lip, but the latter condition requires a sharper lip. To account for both conditions adaptive engine intakes have been designed. Adaptive inlets that rely on hinging and sliding components are susceptible to leaking and improper sealing resulting in pressure losses and consequent losses in efficiency. Other disadvantages include the increased part count, complexity and weight.

Figure 30:
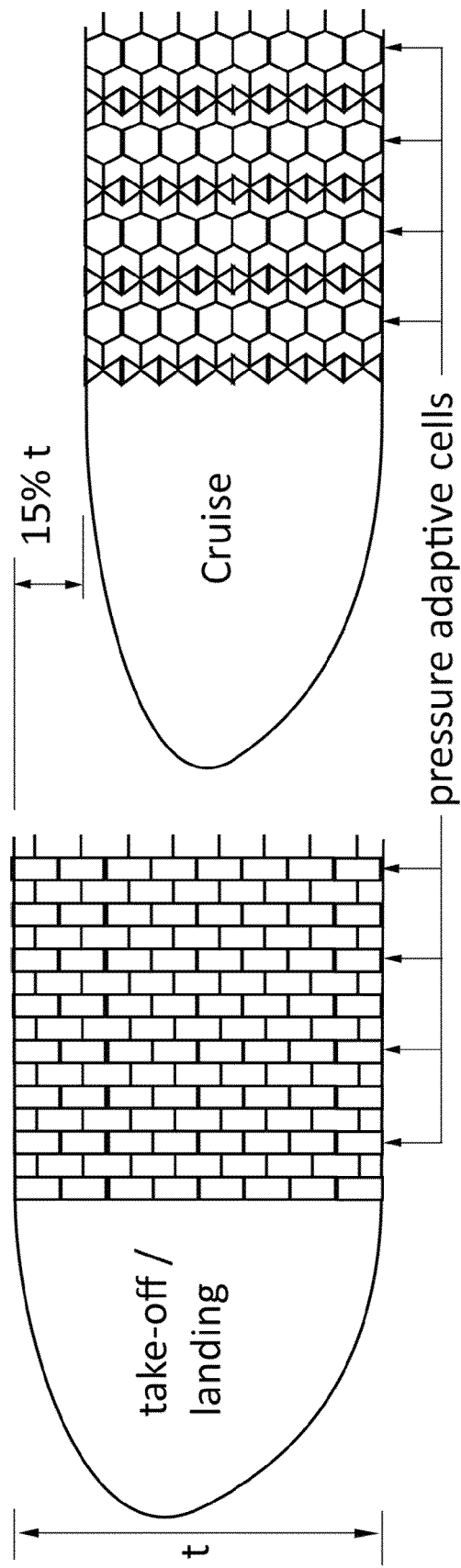

A solid state, pressure-adaptive intake lip, based on a hybrid honeycomb internal structure could change the shape of the lip between the two before-mentioned flight conditions. FIG. 30 shows how the thickness of the lip can be varied by using the pressure adaptivity of about approximately 25% of the honeycomb cells. The cells that induce the shape change are termed 'pressure-adaptive' in FIG. 30. These cells contain pouches while the other cells have no pouches and are therefore inactive. In the default position, when no pressure difference is present, the honeycomb cells are rectangular. When the pressure is increased, the structural deformation decreases the thickness of the lip with 15%, making it sharper and therefore more suitable to transonic conditions.

The pressure difference required to switch between the two configurations can be acquired from the ambient pressure decrease with altitude. However, since this application can rely on only 25% of all the available cells, and because it is located near the engine compressor, it is very suitable to be powered by pressurized bleed air from the compressor. Note that this would not decrease engine efficiency because there is no net flow of air in this pressure-adaptive structure.

Advantages of this concept compared to other adaptive incentives include a relatively simple structural layout, a low part count, low wear and almost no power requirements. Manufacturing of the honeycomb structure requires an additional step, where each layer is bent such that the cells can revolve around the engine centerline. Properly filling the lip with hybrid honeycomb cells can be a design challenge, along with predicting the shape change when three-dimensional effects come into play. However, pursuing this concept might lead to more efficient engine intakes in both subsonic and transonic flight conditions.

During take-off and landing the flap settings on an aircraft generate a higher nose-down pitching moment than during cruise. When an ambient-pressure approach is used for pressure-adaptive flaps, the flap setting gradually changes between take-off and landing. By trimming the horizontal stabilizer accordingly, a higher nose-up moment is generated by the empennage to compensate for the moment generated by the flaps. Alternatively, this moment could be generated by modifying the leading edge, such that it becomes blunter and gives the airfoil more camber. This section presents two conceptual designs on how to do this using pressure-adaptive honeycomb.

Figures 31A, 31B:
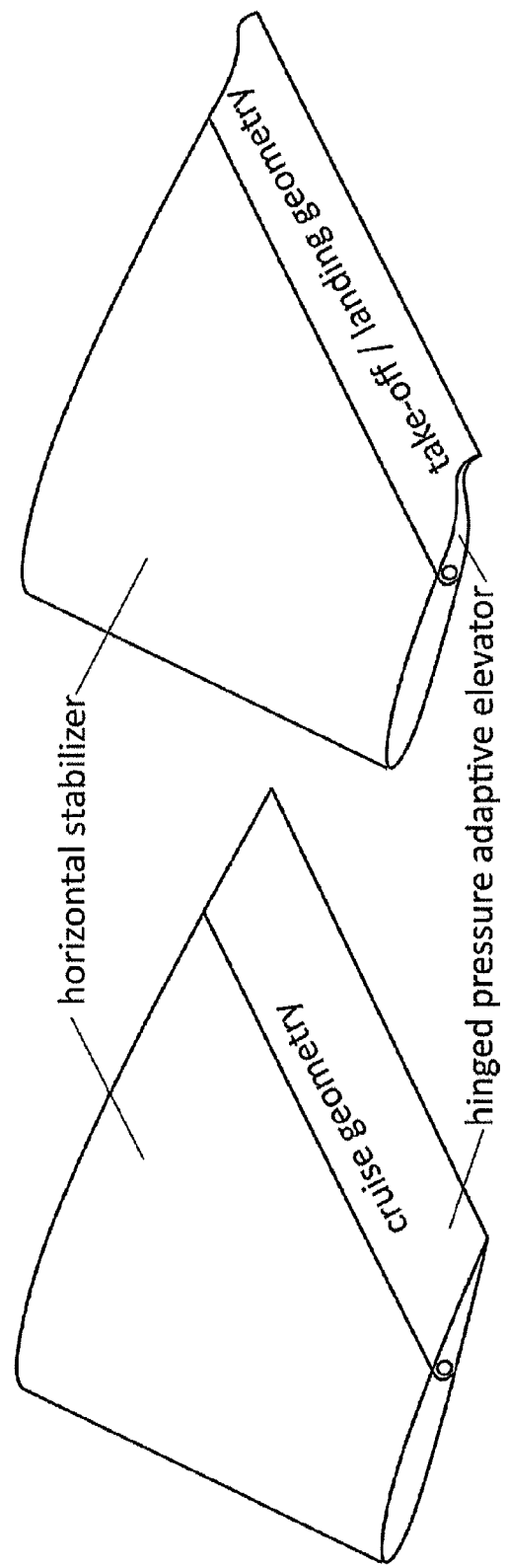

The first design employs pressure-adaptive honeycomb in the elevator control surface. As can be seen in FIG. 31, this design combines the hinged control surface with the solid-state, pressure-adaptive honeycomb. It is pointed out to the reader that the pressure-adaptive honeycomb is solely used to change the aft airfoil shape. The hinged elevator works the same as in conventional empennages. However, the internal structure of ribs and stringers is replaced by the pressure-adaptive honeycomb, similar to the drooped aileron.

Figure 9:
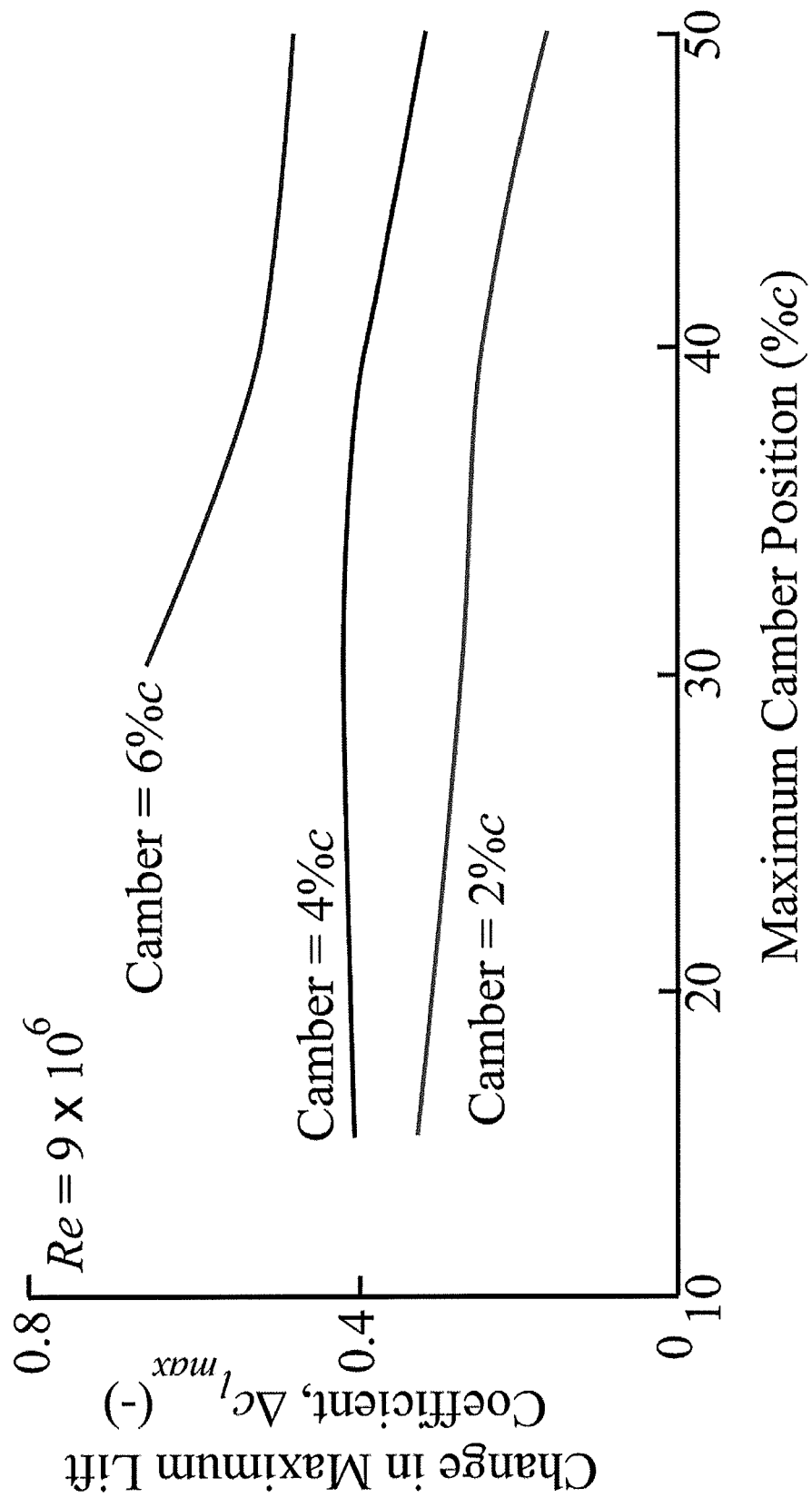
FIG. 9 Effect of Maximum Camber Position on Change in Maximum Lift Coefficient, Plotted for Optimum [38, 51]
Figure 10:
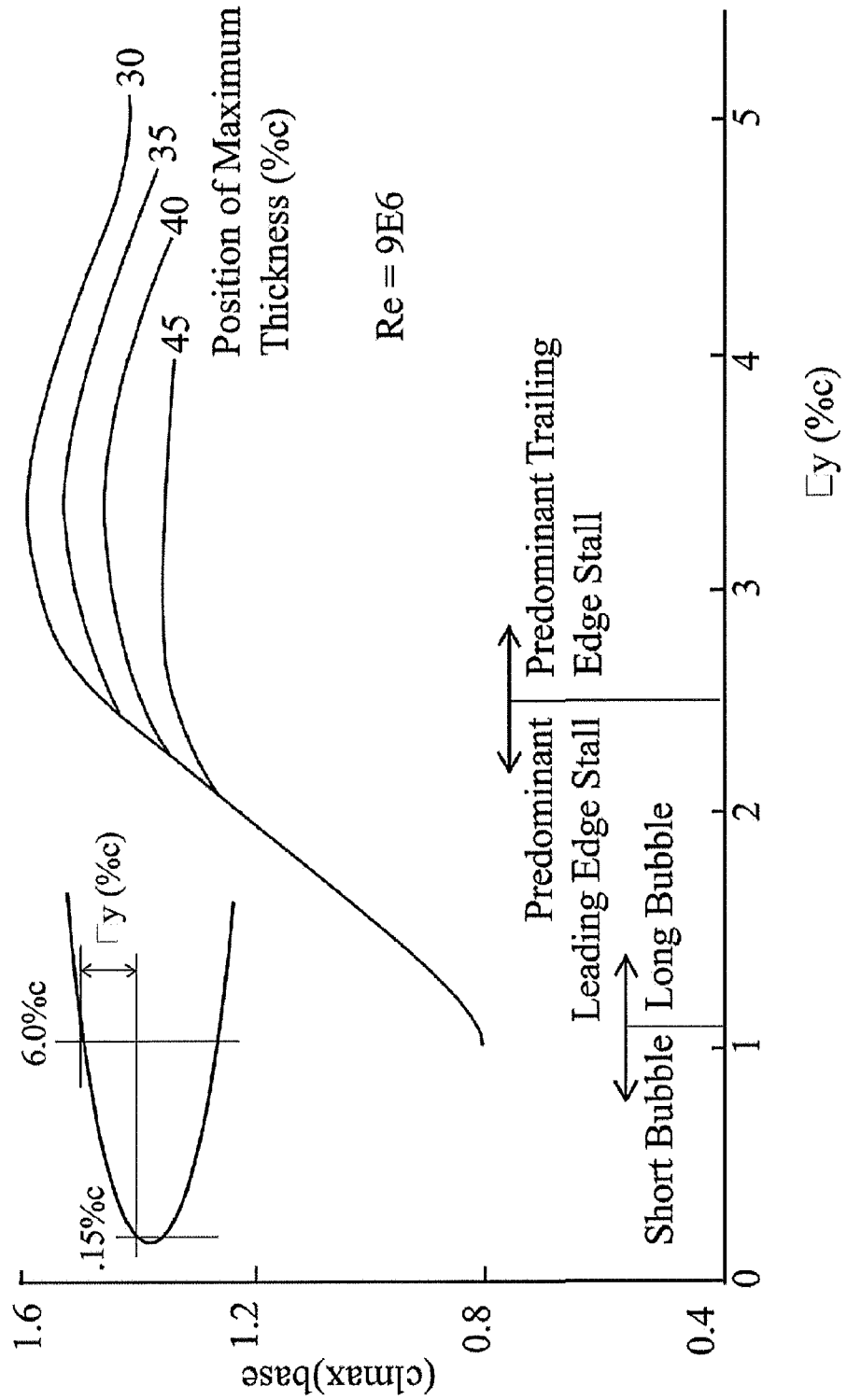
FIG. 10 Basic Airfoil Maximum Lift Coefficient for Uncambered airfoils (Reproduced from p. 219 of Ref. 38)
Figures 11A, 11B, 11C:
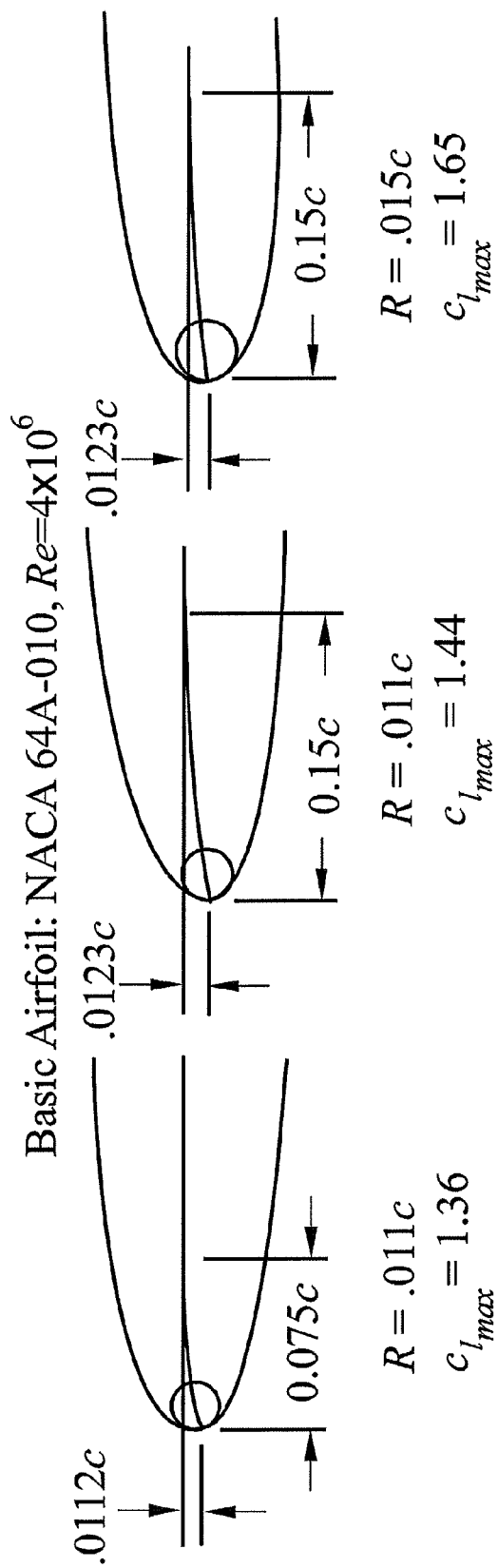
FIGS. 11A-11C Nose radius Effect on Maximum Lift Coefficient (Reproduced from Ref. 65)
Figures 12A, 12B:
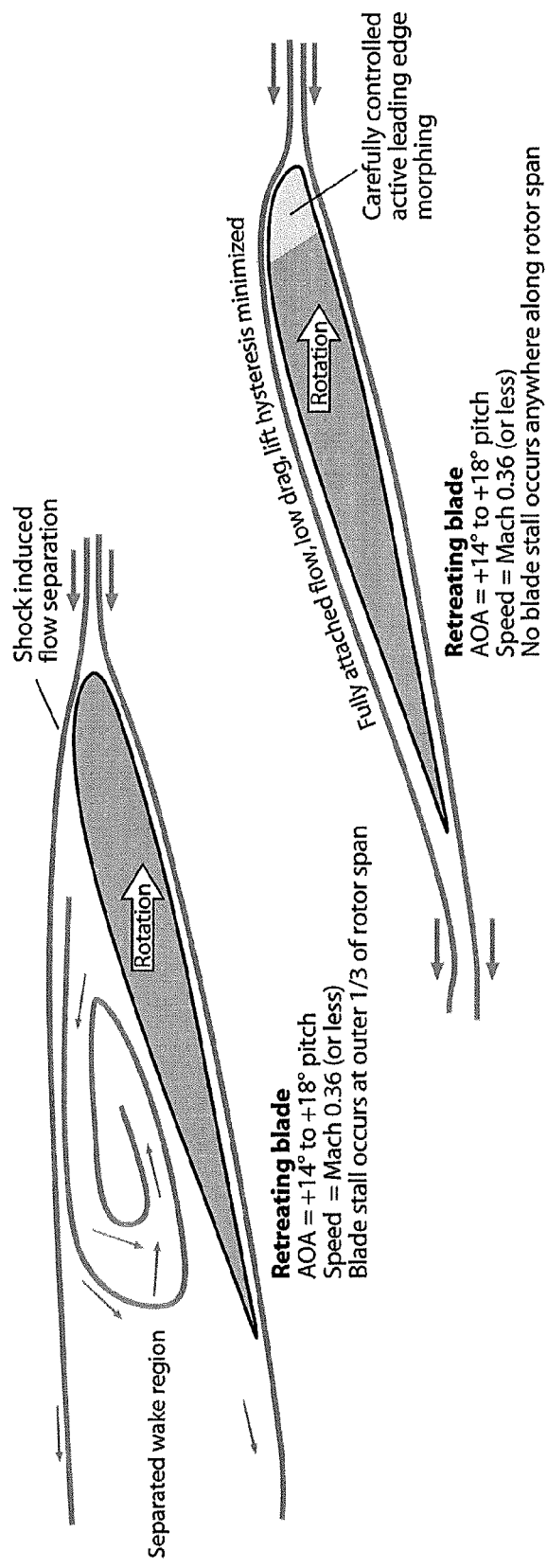
FIGS. 12A-12B Leading Edge Morphing Avoids Flow Separation on the Retreating Helicopter Blade (modified from Ref. 68)
Figure 13:
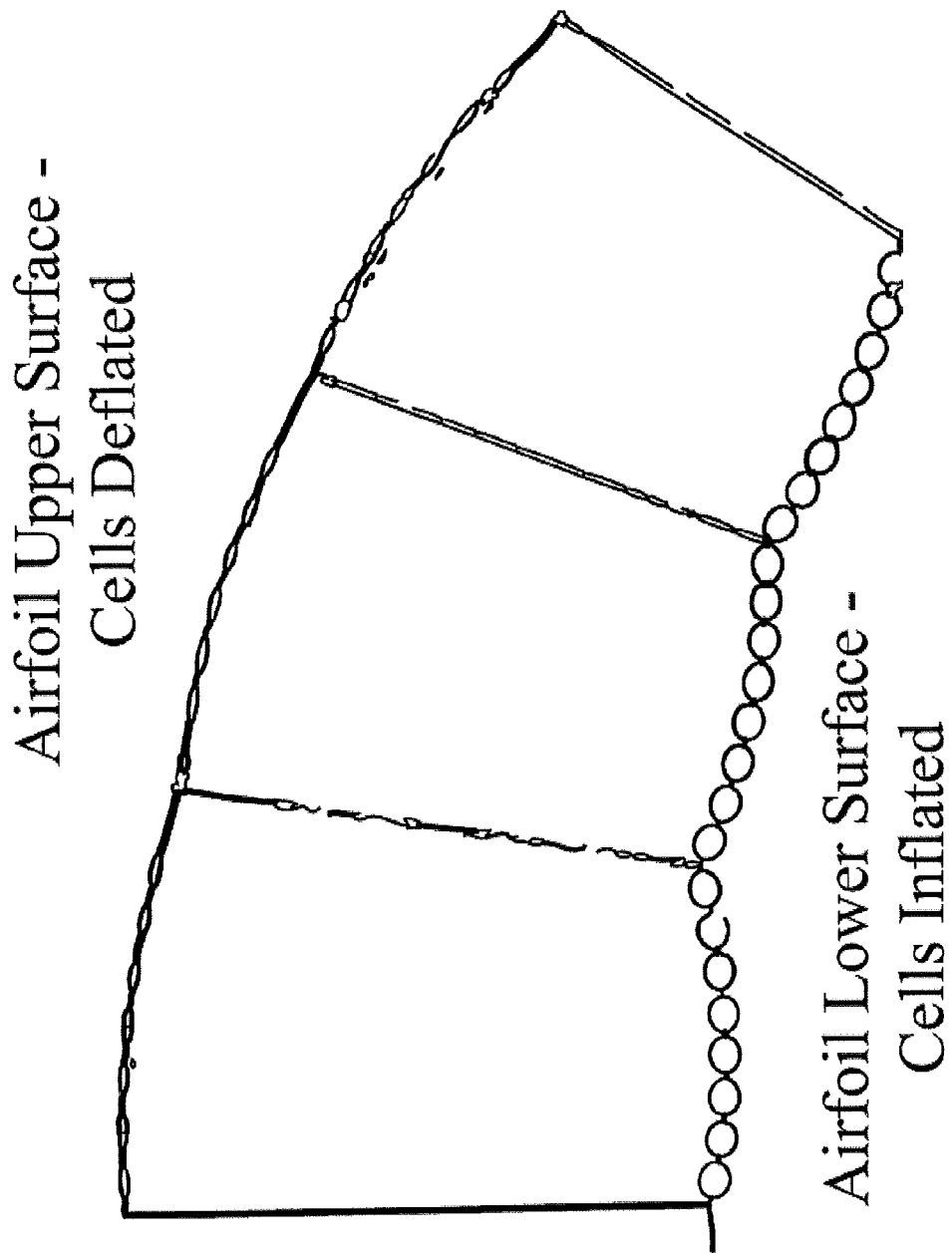
FIG. 13 Nastic Structure to Deform Inflatable Wing Section (copied from Ref. 72) 36
Figure 14:
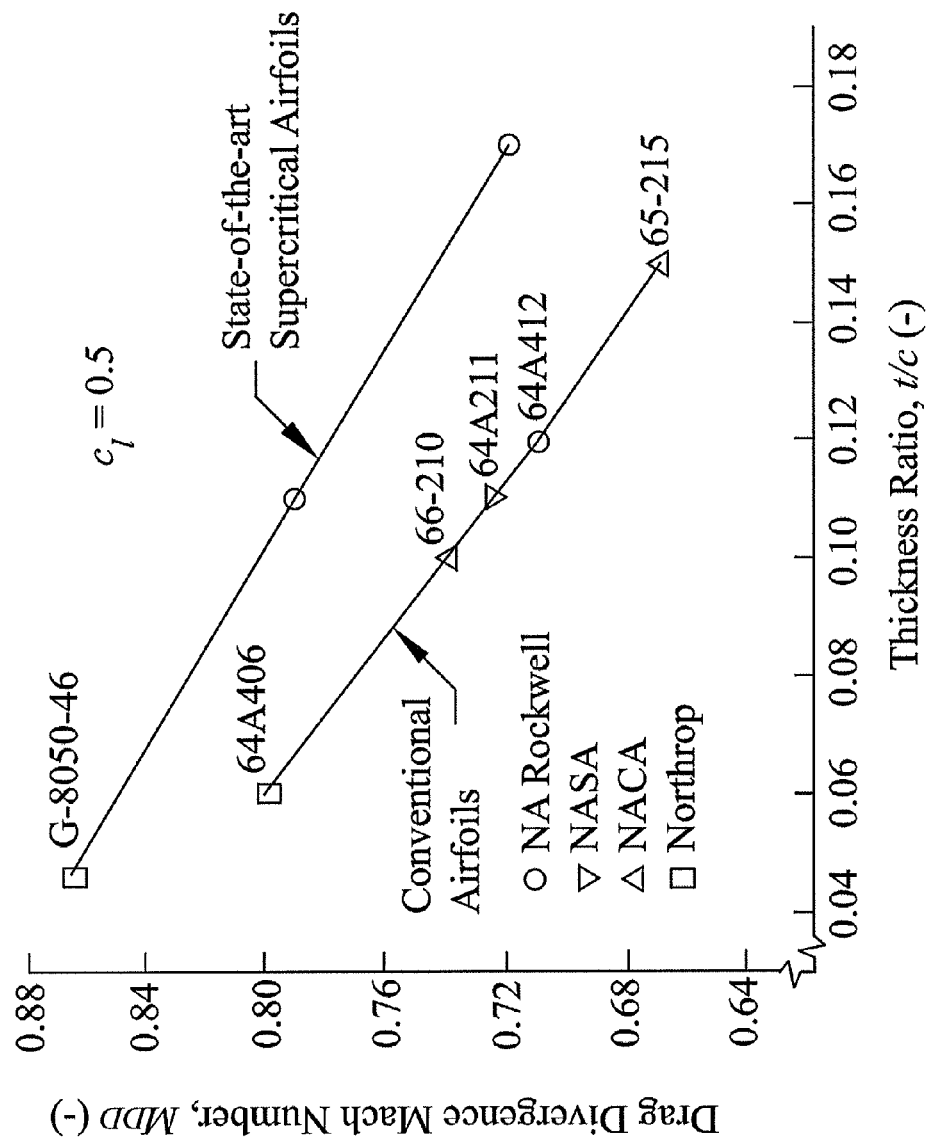
FIG. 14 Effect of Thickness Ratio Drag Divergence Mach Number for NACA and supercritical Airfoils (Reproduced from p. 151 in Ref. 42)
Figure 15:
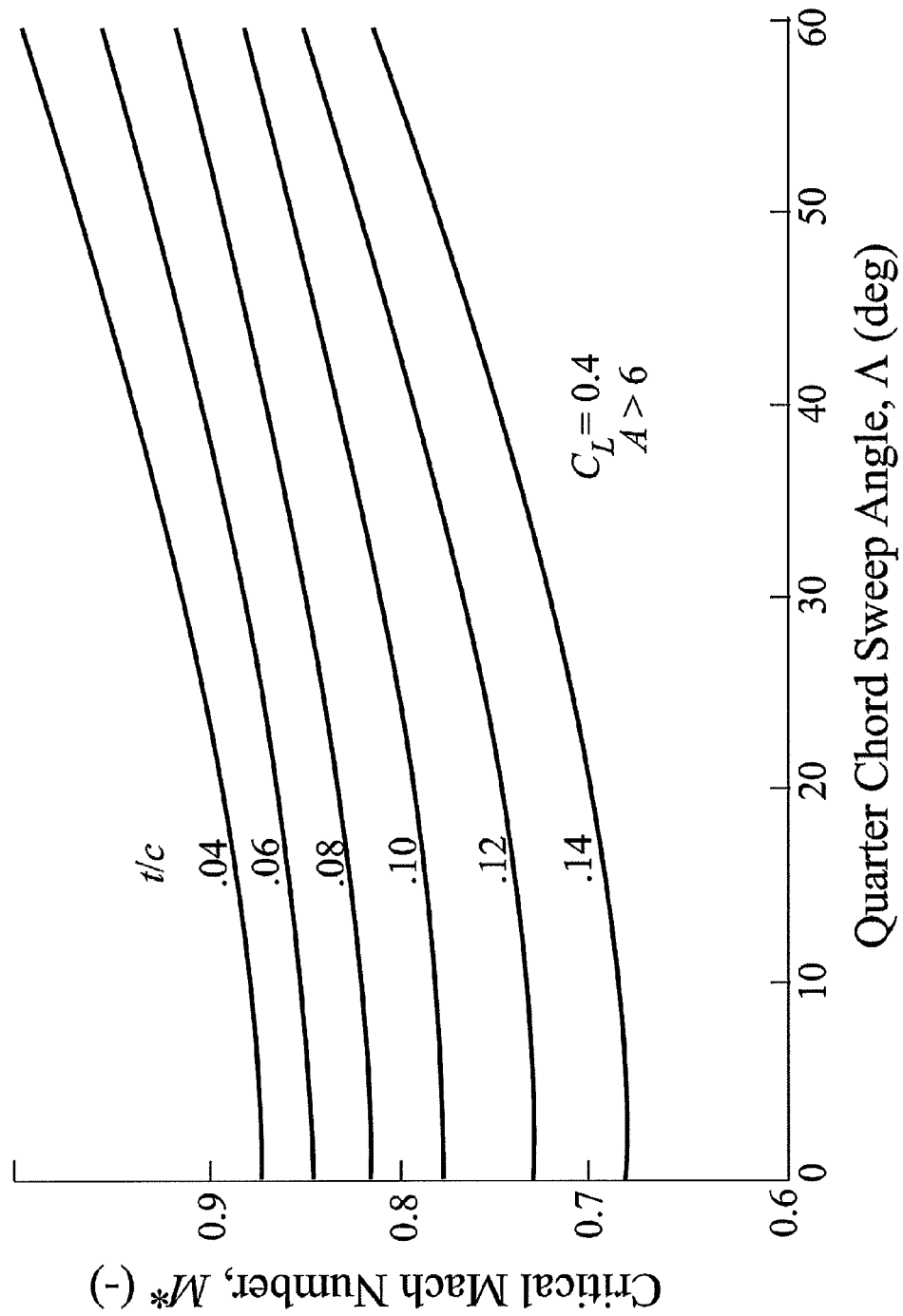
FIG. 15 Effect of Thickness Ratio and Sweep Angle on Critical Mach Number (Reproduced from p. 151 of Ref. 42)
Figure 16:
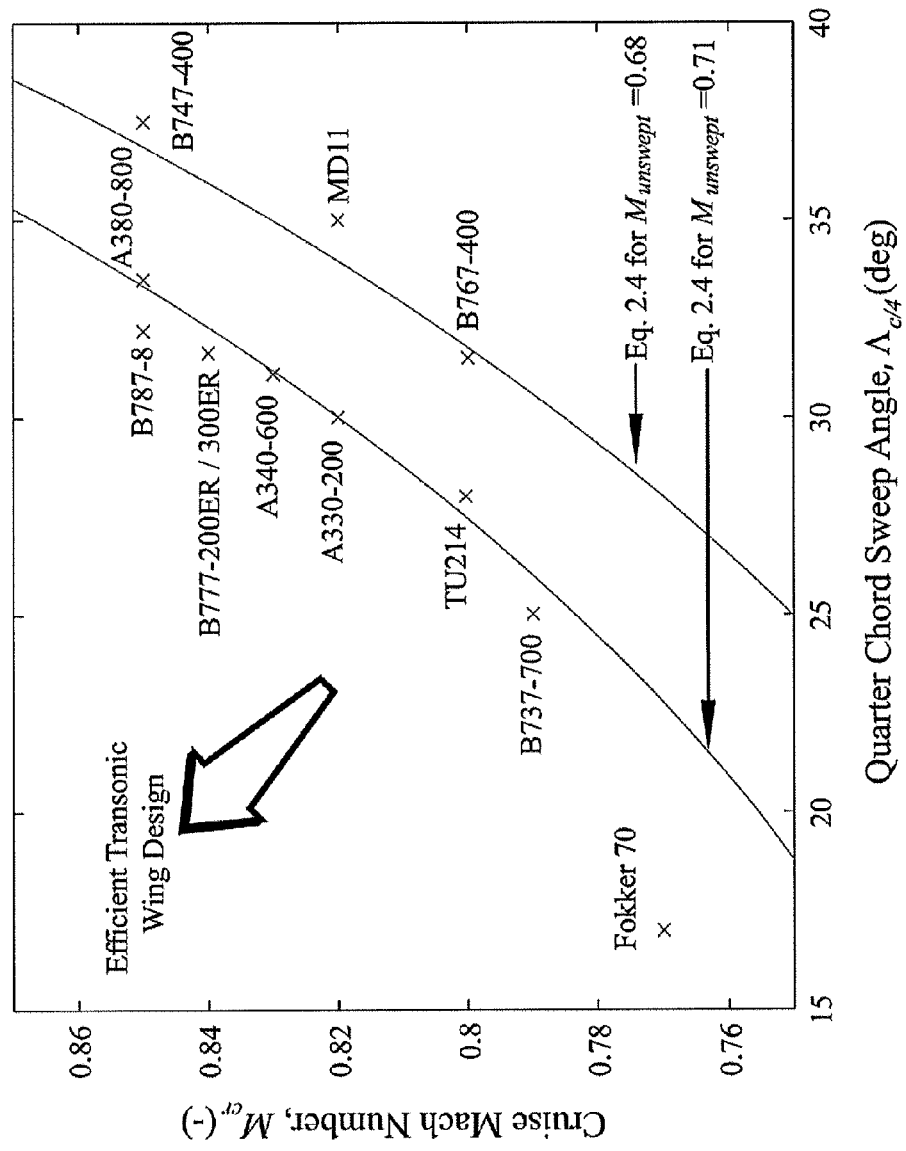
FIG. 16 Wing Sweepback Angle versus Cruise Mach Number (Data from Table 2.2)
Figure 17A:
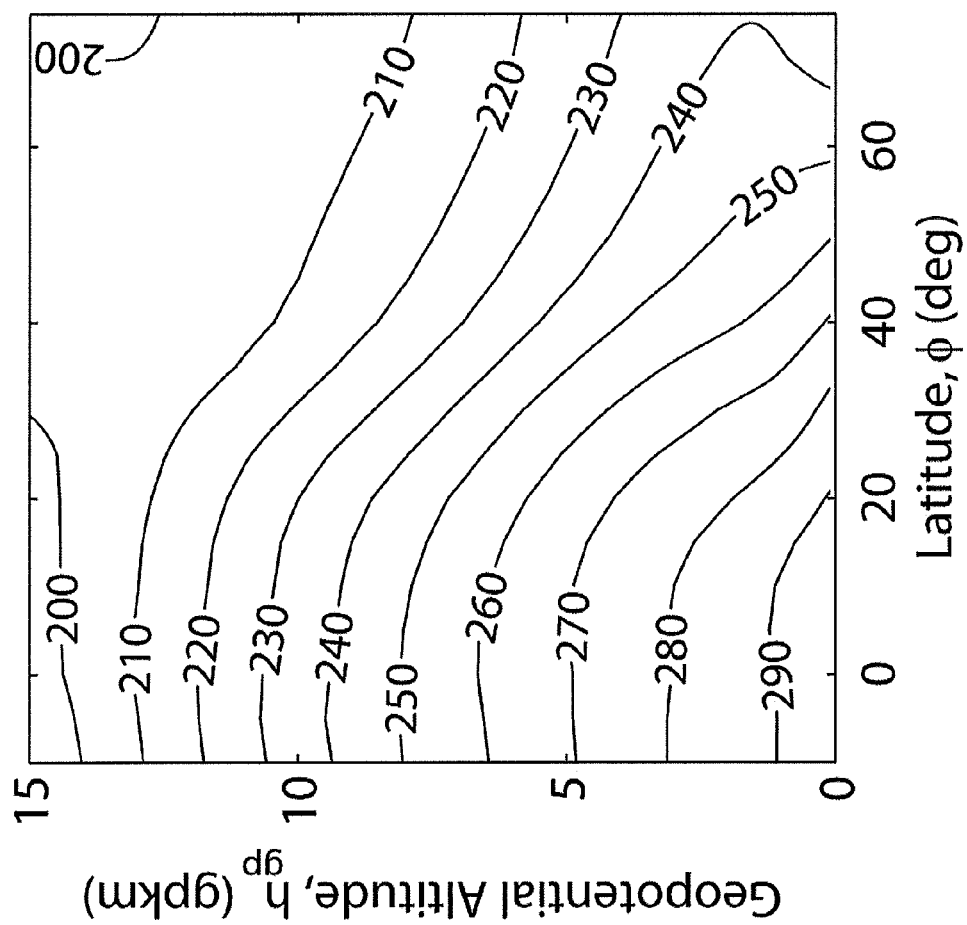
FIGS. 17A and 17B Isotherms for Mean Winter and Summer Atmospheric Conditions
Figure 17B:
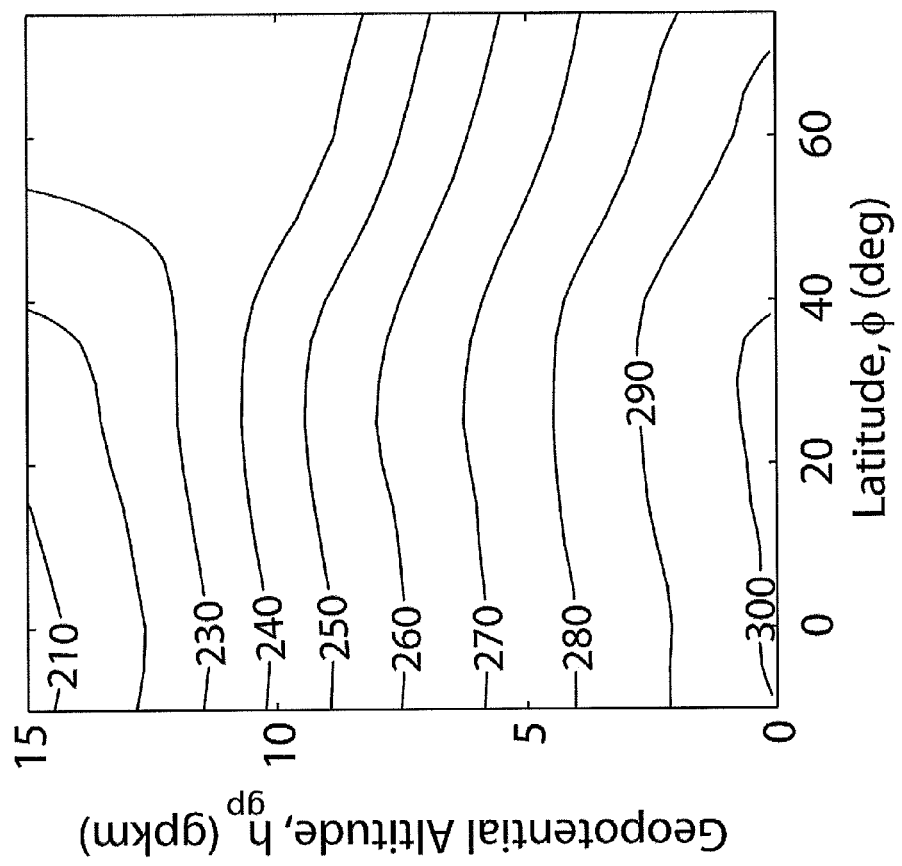
Figure 18A:
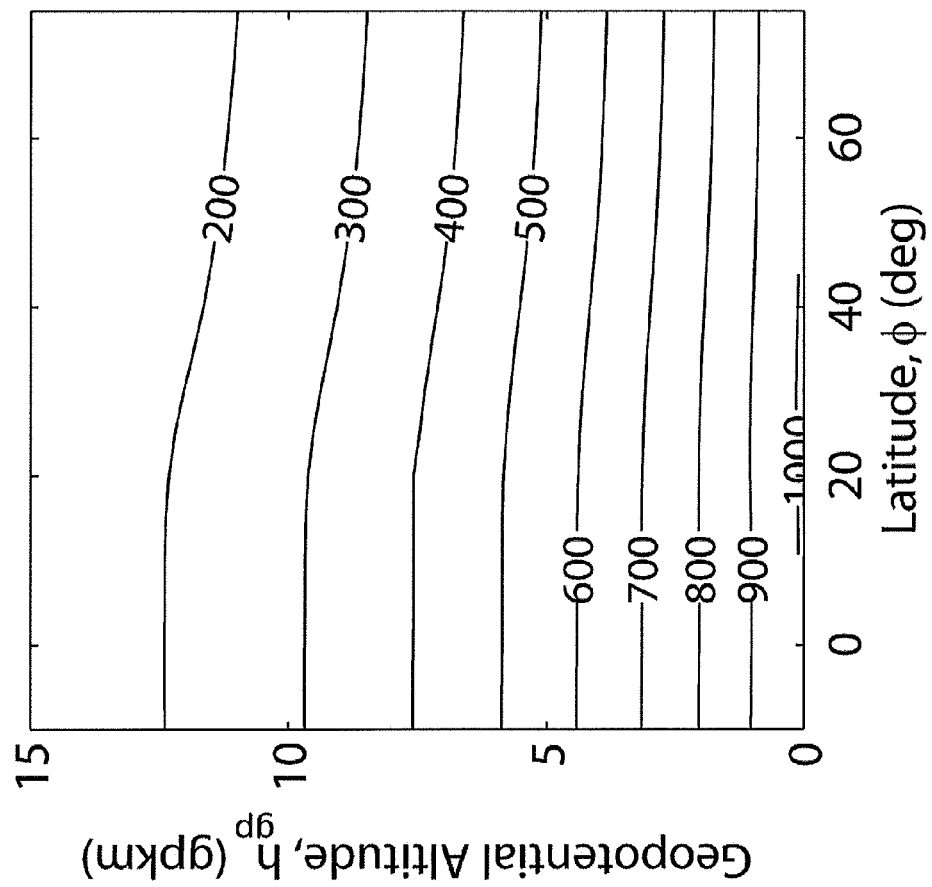
FIGS. 18A and 18B Isobars for Mean Winter and Summer Atmospheric Conditions
Figure 18B:
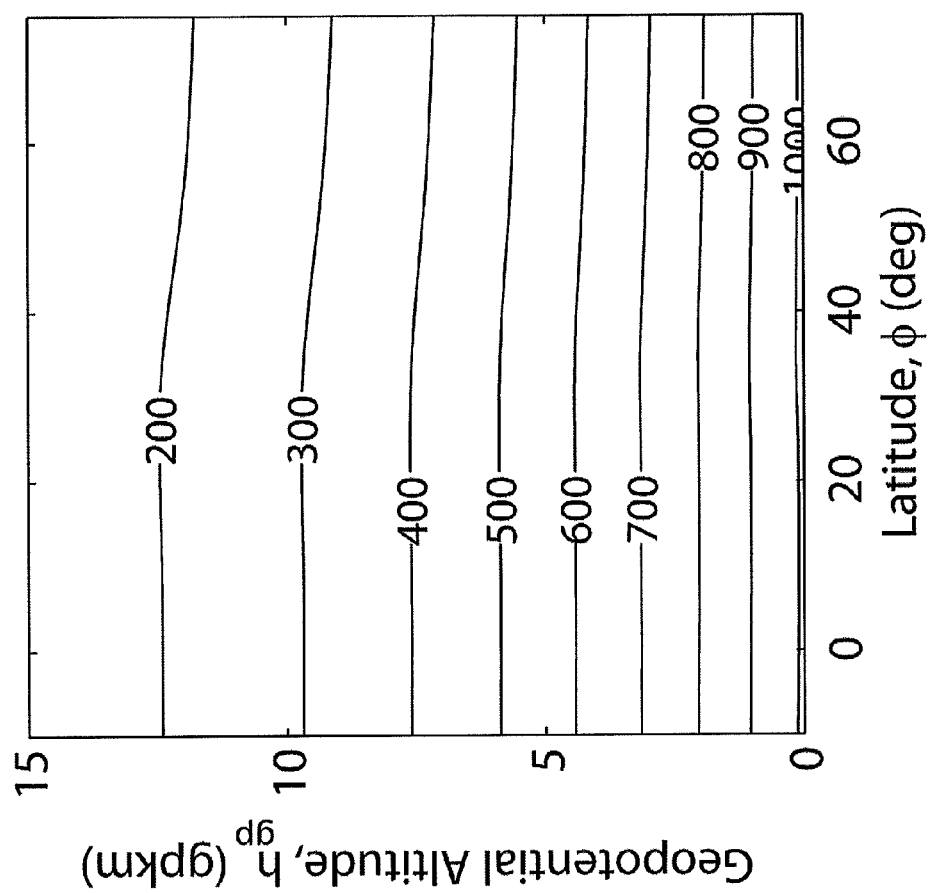
Figure 19A:
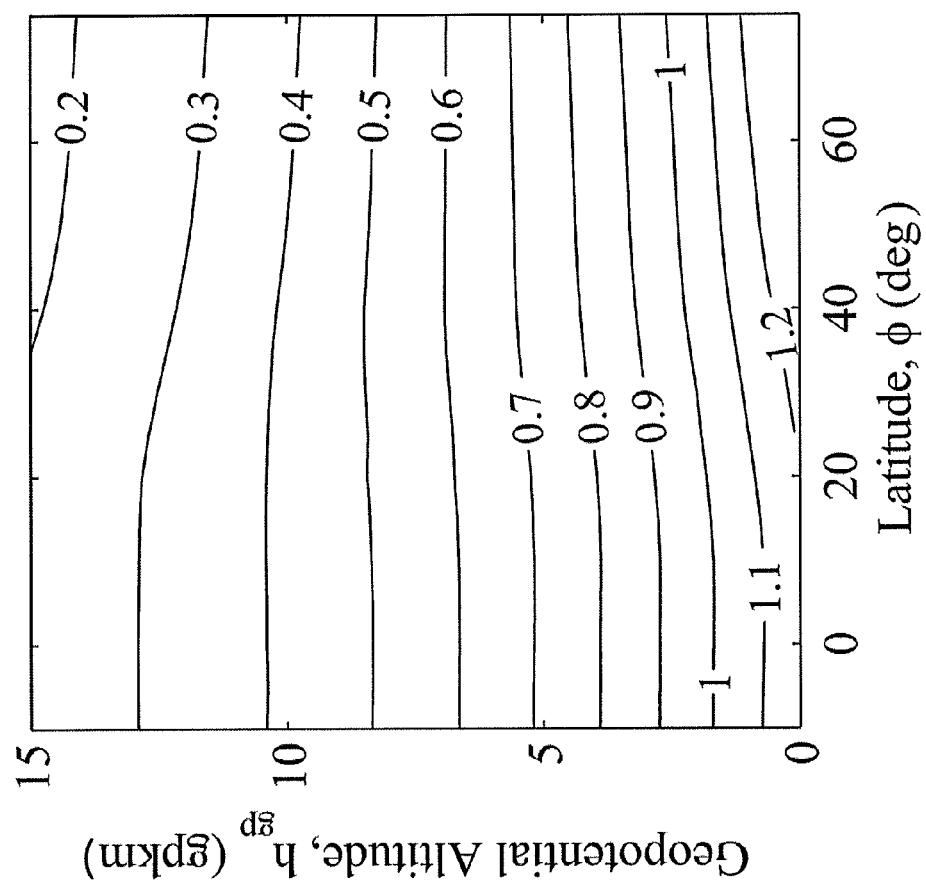
FIGS. 19A and 19B Isochors for Mean Winter and Summer Atmospheric Conditions
Figure 19B:
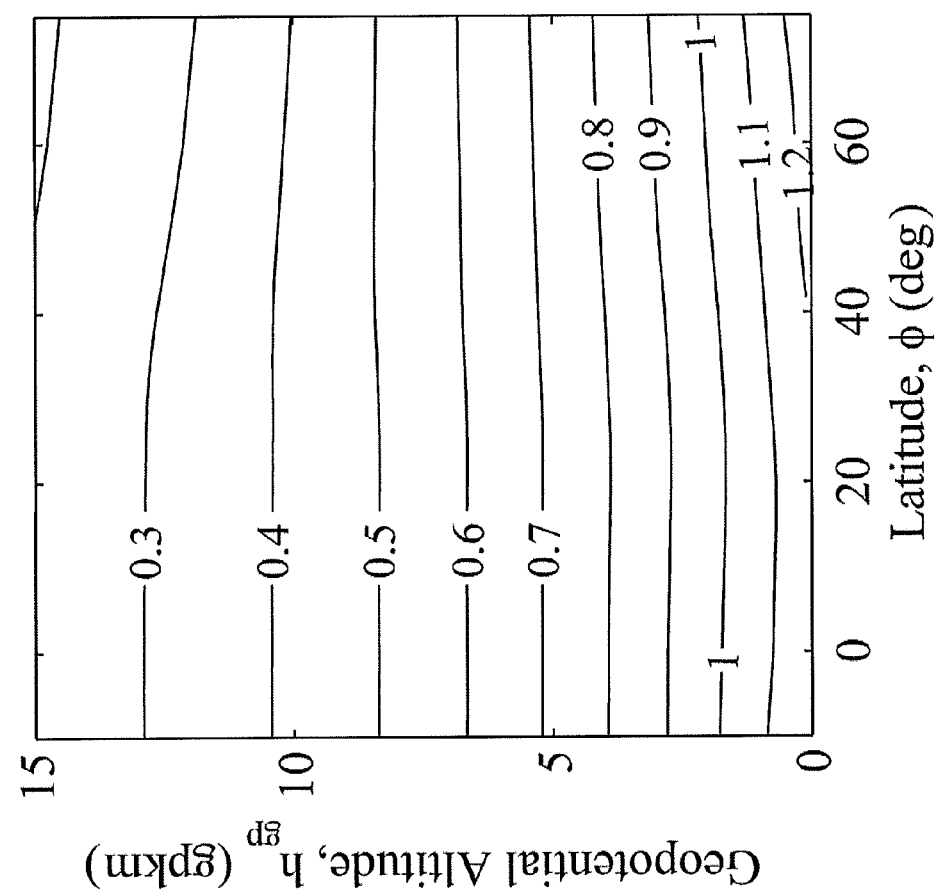
Figure 20:
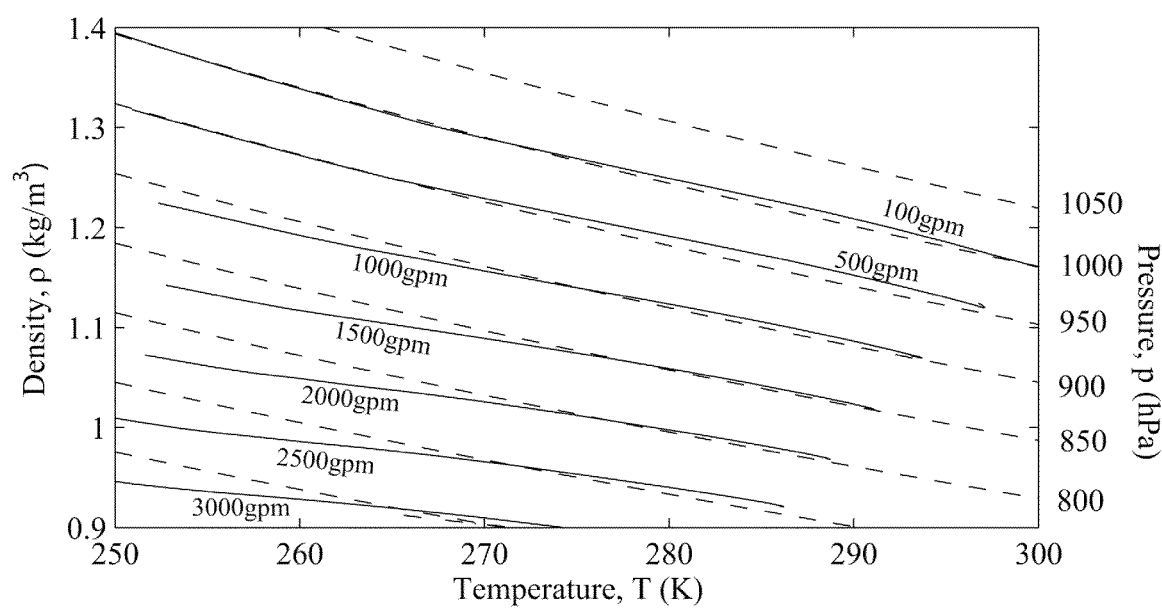
FIG. 20 Winter Temperature and Density Relation at Low to Moderate Altitudes
Figure 21A:
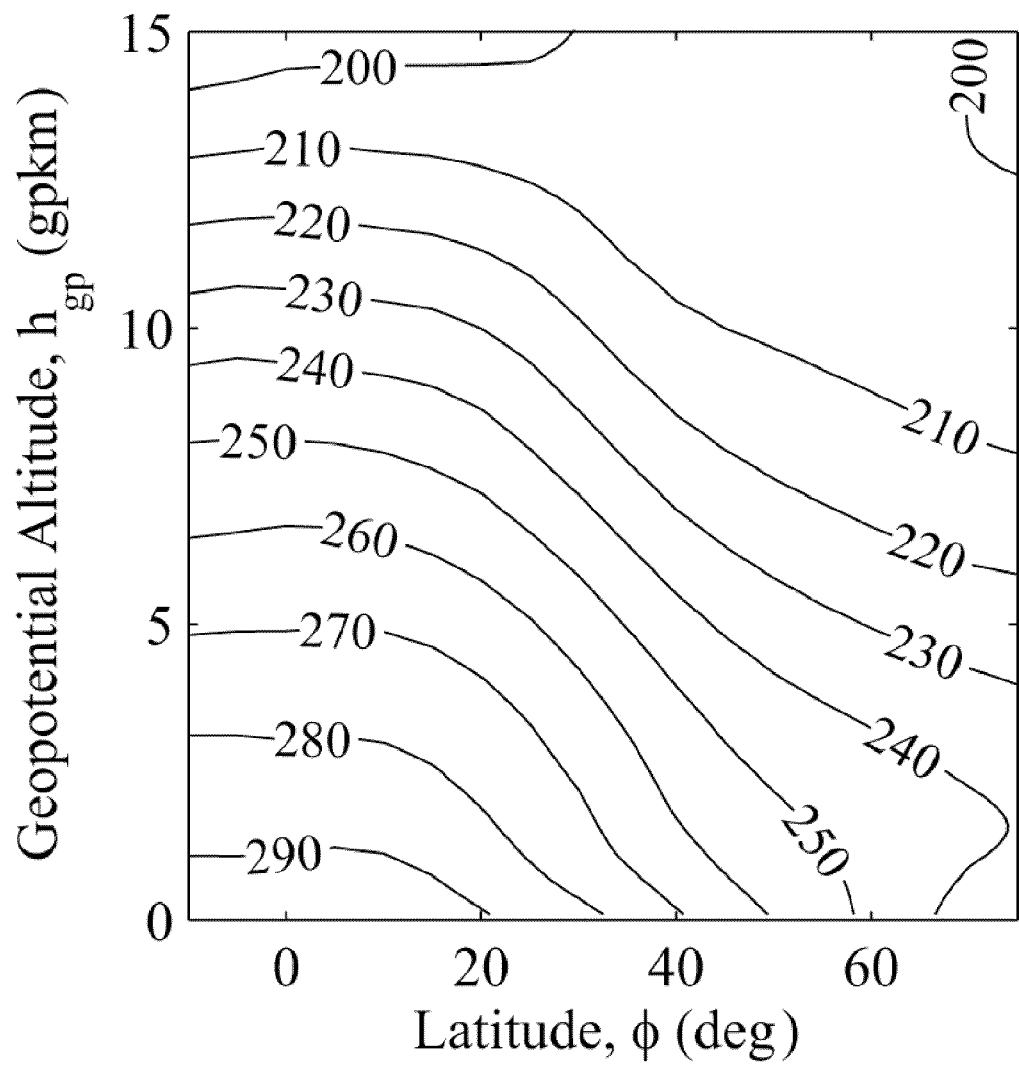
FIGS. 21A and 21B High and Low Extreme Values of Isotherms
Figure 21B:
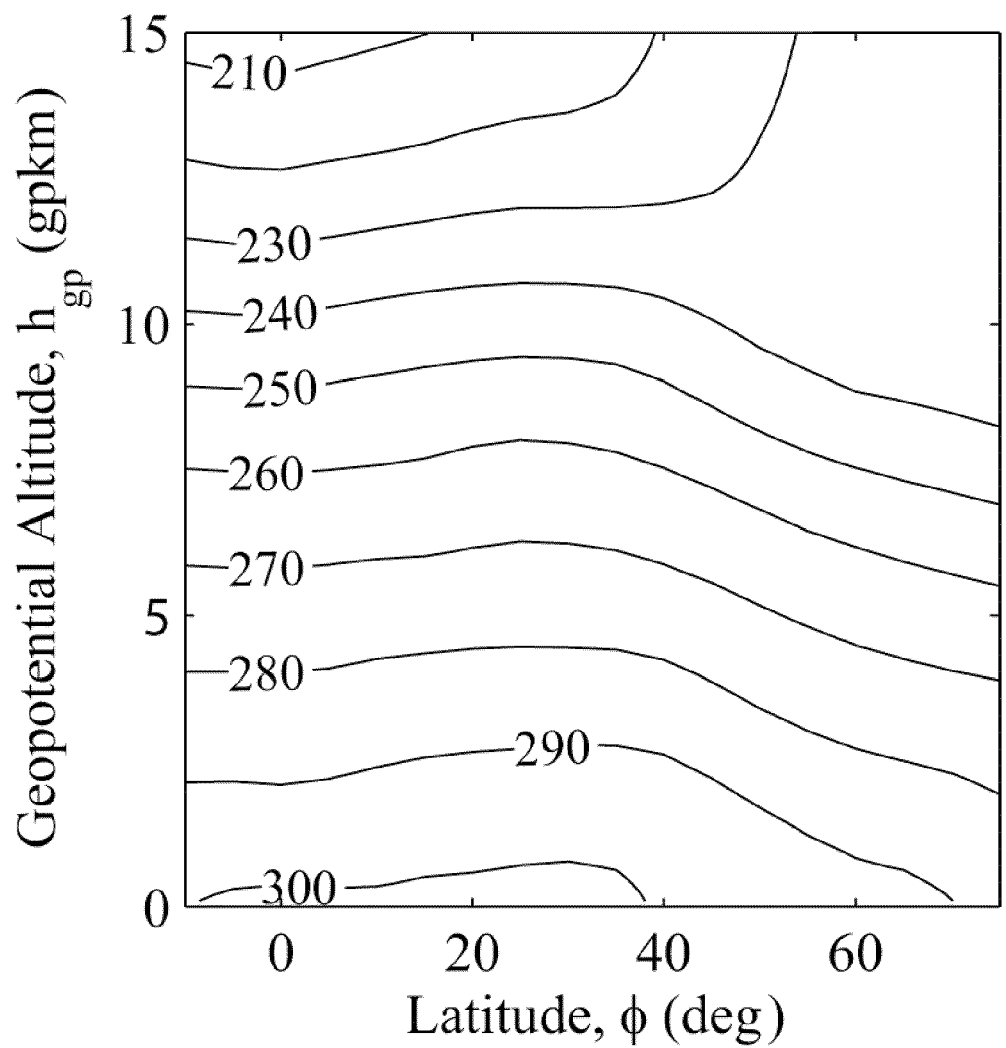
Figure 22:
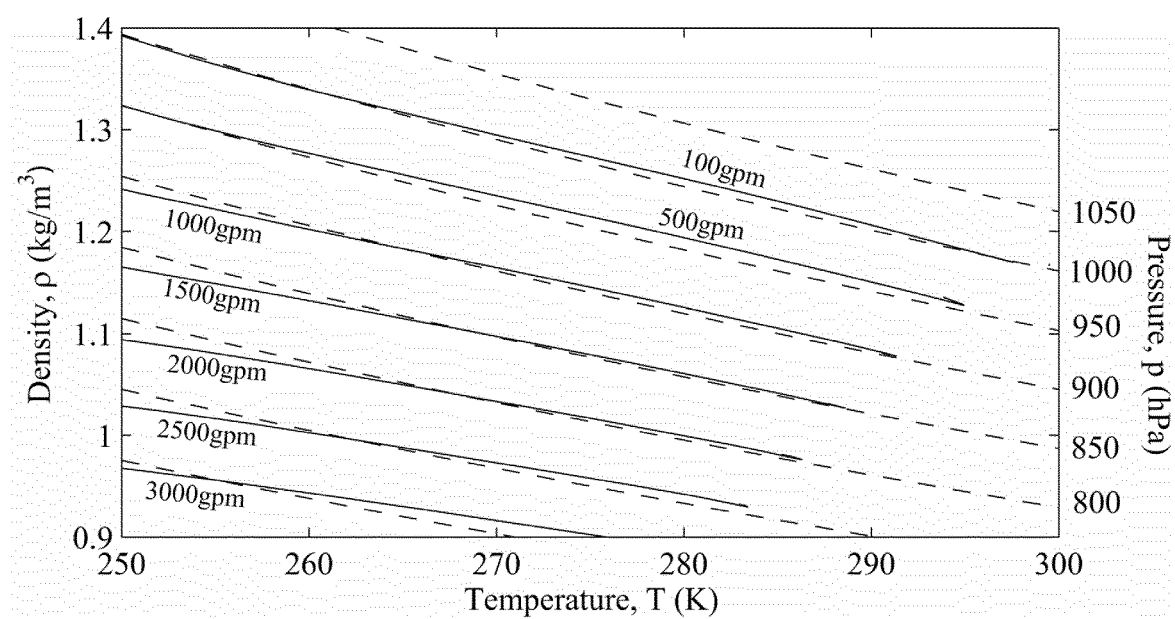
FIG. 22 Temperature Density Relation at Extreme Cold Days

The increased curvature of the elevator increases the overall camber of the airfoil which enhances the horizontal tail maximum lift coefficient, $C_{L_{max_h}}$ (see FIG. 9). To balance the elevator hinge moment, this conceptual design incorporates a pressure-adaptive trim tab. The increased camber of the elevator in combination with the trim tab results in an s-shape of the top and bottom skins. Therefore, a careful design does not require either of the two skins to show any strain which means no adaptive skin is needed to allow for the desired curvatures. In addition, the hinge moment derivatives, $C_{h_\alpha}$, and $C_{h_\delta}$ should be close to zero.

Figures 32A, 32B:
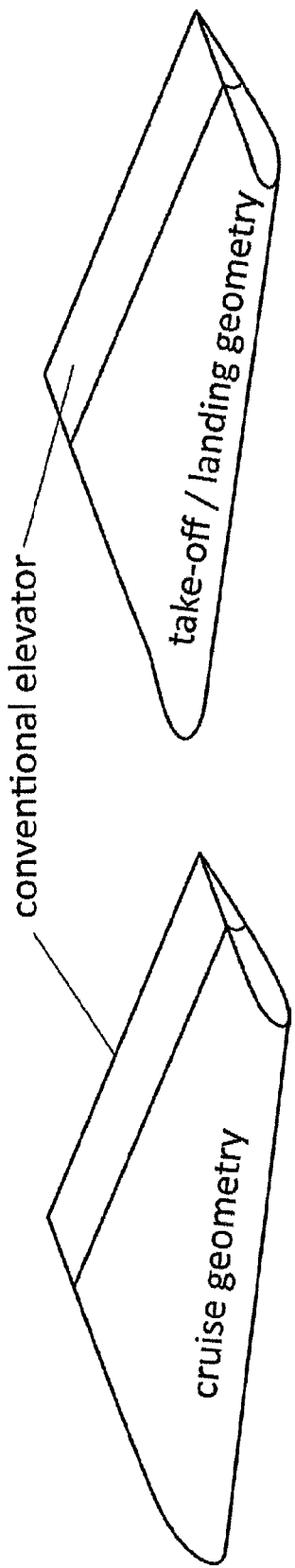

Rather than modifying the rear end of the stabilizer, the leading edge can also be altered to contribute to additional down-force during take-off and landing. Similar to the change in leading edge geometry, this design relies on the adaptive skin on the pressure side (top) of the stabilizer along with a thickened skin on the suction side (bottom). A change in CDP droops the leading edge slightly upwards. Simultaneously, the nose becomes thicker. The resulting increase in camber and bluntness of the stabilizer increases its $C_{L_{max_h}}$ (see FIG. 9 and FIG. 10). A sketch of this concept is presented in FIG. 32 for a swept and tapered horizontal stabilizer. It could just as well be used on straight horizontal stabilizers. Aircraft classes that could potentially benefit from this concept include LSA, business jets and commercial jet transports.

There has been considerable interest in an adaptive droop nose over the past several years. The desire to sustain laminar flow over a large part of the airfoil requires a drooped nose without any discontinuities such as seams between individual parts.

Figure 33B:
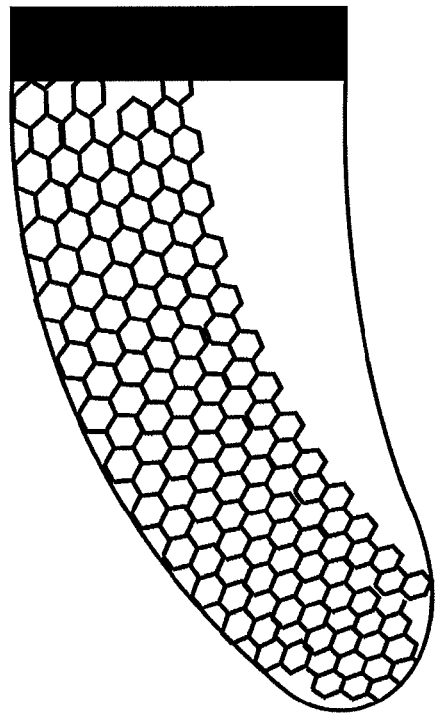
Figure 33A:
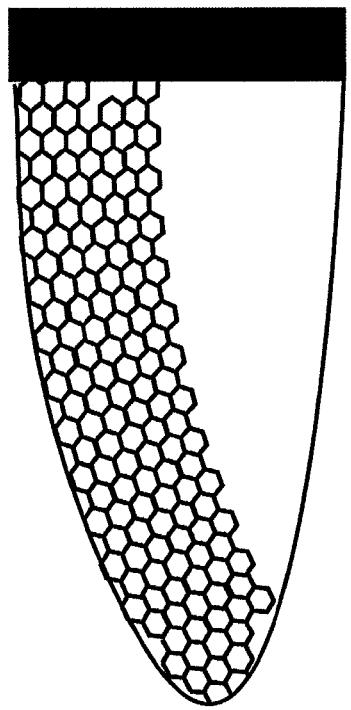

This can be achieved by applying pressure-adaptive honeycomb in the nose of the wing. FIG. 33 schematically demonstrates the mechanics behind this idea. The honeycomb would be attached to the inside of the top skin of the airfoil. In the default configuration, the pressure in the pouches would match the surrounding pressure and the nose would be drooped (as in the right-hand side of FIG. 33). When increasing the CDP, the cells would expand and the top skin would lose some of its curvature. This brings the droop nose into the cruise geometry (as in the left-hand side of FIG. 33). The sketches presented here are merely to give the reader an impression of the applicability of pressure-adaptive honeycomb in a droop nose and are by no means an accurate depiction of what a real structure would look like.

Conventional hinged droop noses often suffer from small hinge radius that can induce flow separation at high angles of attack. The present drooped nose does not suffer from this because it is based on the straining of the top skin. When appropriately designed, the present concept should not have a discontinuity in curvature over the top skin.

When pressurizing the pressure-adaptive honeycomb there are two optional approaches that can be taken. The first approach relies on the atmospheric pressure change with altitude which can induce a cell differential pressure, provided that the amount of enclosed mass in the honeycomb cell remains constant. The second approach relies on a pressure source within the aircraft. The next two subsections discuss these two alternatives.

One objective of this adaptive structure is to induce deformation between take-off and cruise altitude. Take-off altitude can vary considerably between airfields around the world with altitudes as high as 4 km (El Alto International Airport). If a pressureadaptive structure is used in any type of high lift device, it should be fully deployed at these high altitude airports. Airtight honeycomb cells would not suffice for this purpose. The difference in altitude between sea level and local airport altitude could already induce a significant change in structural geometry. In other words, a potential high lift device powered by such a pressure-adaptive structure would already be partly retracted at these high altitude airports. By implementing separate air bladders (pouches) inside each of the honeycomb cells this issue can be avoided. By carefully inflating the pouches with a fixed amount of gas at a known pressure and temperature it is possible to control the pressure differential at which the pouches pull taut, and start pushing against the honeycomb wall. During the initial altitude gain, the decreasing pressure does nothing else than expanding the gas in the pouches up until the pouch is constrained by the honeycomb structure. Then, as the pressure difference increases, the pouch attempts to reach its perfect circular shape, taking the honeycomb to a grid of near perfect hexagons. A more thorough analysis of this process is detailed herein.

Figure 34:
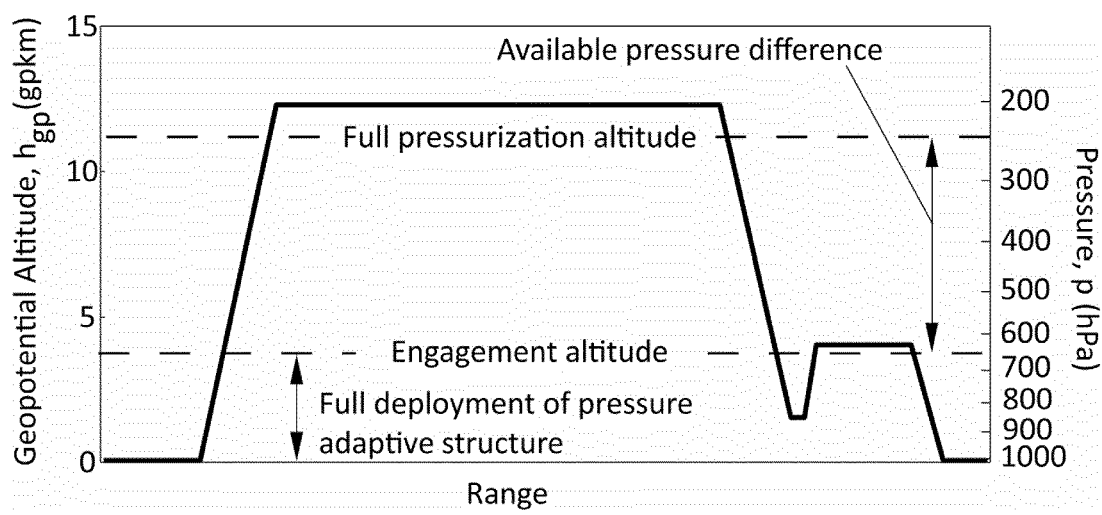
FIG. 34 Notional Mission Profile with Outlined Engagement and Full Pressurization Altitude FIG. 35 Pressurizing Adaptive Honeycomb from the High-Pressure Compressor FIG. 36 Cell Deformation due to Stresses in Principal Directions (After Ref. 129)
Figure 35:
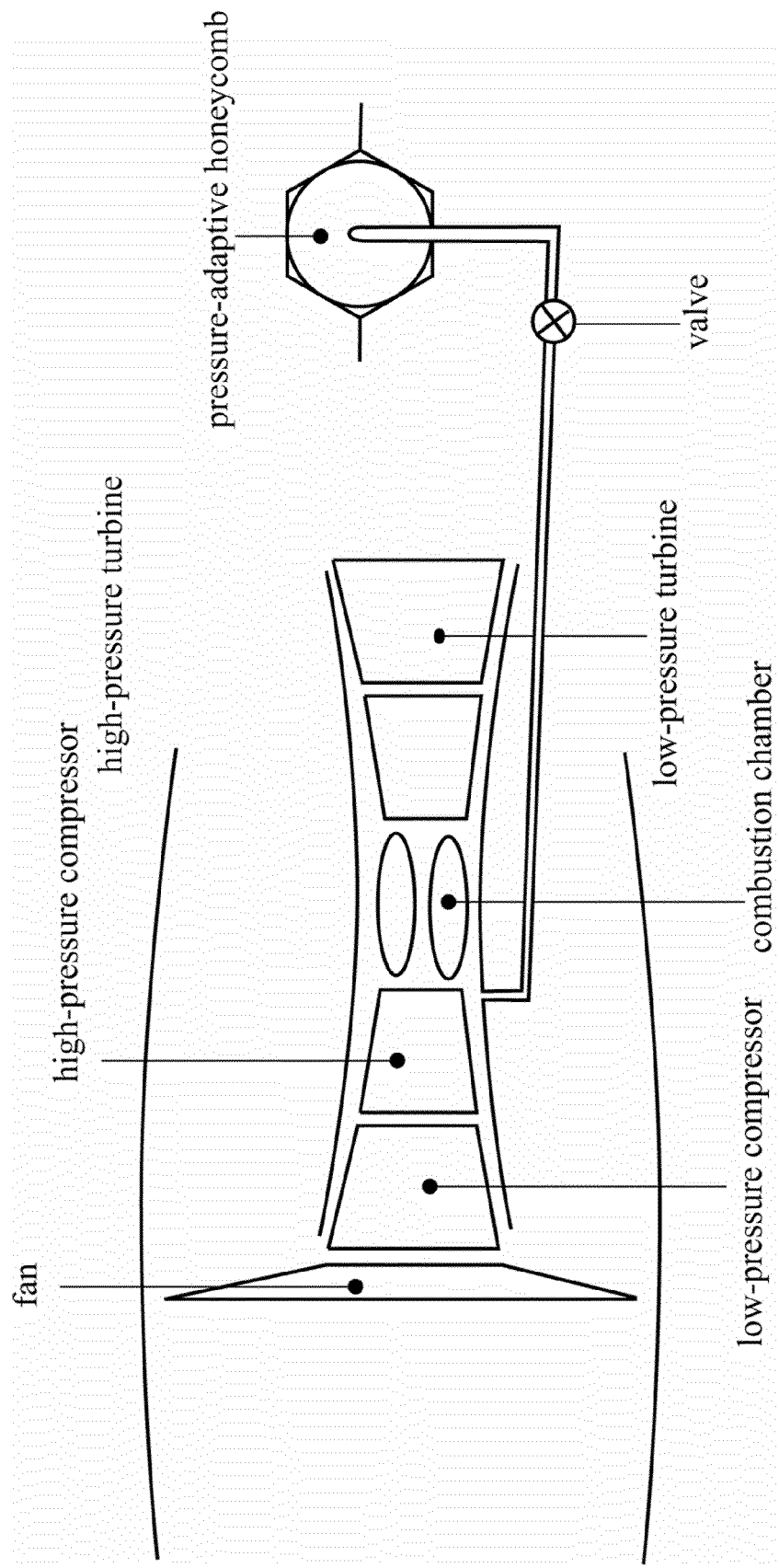

To see how a pressure-adaptive structure would be deployed, the reader is asked to consider the mission profile in FIG. 34. This diagram is typical for a jet transport or business jet. It shows the engagement altitude, and full pressurization altitude. In between those two altitudes the pressure-adaptive structure deforms between its two states. If the pressure-adaptive structure is used to enhance high lift devices it is fully deployed between sea level and engagement altitude. Above full pressurization altitude it is completely retracted. This means that during the climb and decent phases of the flights, the structure continuously changes its shape between these two states without any pilot interference.

On the right hand side of the diagram, the atmospheric pressure is indicated, based on the pressure distribution around the equator in the summer. Note that in this example the difference between engagement altitude and full pressurization altitude is around 400 hPa. Now, based on the application of the pressure-adaptive structure this may or may not be enough pressure to perform the specified task. By lowering the engagement altitude a significant increase in available pressure difference can be gained. However, the device is not fully deployed at airports that exceed the engagement altitude. A careful trade-off must be made for every application to come to a compromise between these two features.

One way to avoid a compromise between available pressure and serviceable airports is to make the pressure-adaptive structure independent of the ambient pressure. By installing a tubing system that finds its origin at the compressor of the jet engine an aircraft-based source is found. This makes the deployment of the structure controllable and provides an exponential increase in available pressure. The pressurized bleed air that is taken from the engine should not degrade engine efficiency because there is no net flow of air since all the pouches are airtight. By interconnecting all pouches a relatively simple morphing structure can be constructed that can show significant force and stroke capability, all the while keeping energy requirements minimized.

The proposed pressure-adaptive structure can utilize a restoring force, e.g. a spring, to return the structure to its initial position. When the pressure difference over the pouches is present, the structure overcomes this restoring force and changes into its retracted configuration. A careful balance should be found between the restoring force and the force generated by the structure. The restoring force can be embedded in the honeycomb structure by ensuring its initial configuration induces no strain on the structure. Whenever the structure deviates from its initial configuration the honeycomb structure provides a restoring force due to elastic straining of the cell walls.

The structure can have a bandwidth that is very low. It can be designed such as to adapt the aircraft configuration to take-off/landing and cruise conditions. If an adaptive actuation scheme based on ambient pressure is used then the rate of structural deformation keeps pace with the rate of descent or climb of the aircraft. If a powered approach is used the rate is limited by the maximum mass flow through the tubing system. Larger tubing allows for higher mass flow, but also increases weight and volume penalties.

The preceding discussion on aircraft applications silently assumed that pressure-adaptive honeycomb would be used exclusively in jet transport aircraft that cruise at altitudes in excess of 10 km. Indeed, this would be a suitable market for this new technology. A close relative, in terms of cruise altitude, would be the business jets. Since they cruise at altitudes close to that of jet transports, they could benefit from almost the same pressure difference. All aircraft classes that experience a significant pressure difference between their cruise and take-off altitude can potentially benefit from embedded pressure-adaptive honeycomb. This includes military aircraft and light sport aircraft (LSA).

Rather than relying on external sources for actuation, it is possible to use sources from within the aircraft to actuate the pressure-adaptive honeycomb. Compared to the atmospherically triggered pressure-adaptive honeycomb, the internally powered version is more controllable. The pilot can therefore determine exactly when the structure is pressurized. A second advantage is the fact that much higher CDPs can be achieved when the pressure is internally generated.

For aircraft that employ turbo-machinery, pressure could be tapped from the compressor stages of the engine. Since pressure-adaptive honeycomb essentially requires no continuous flow of air, this would not degenerate the pressure ratio of the engine. Consequently, the engine efficiency would not be influenced by the addition of pressure-adaptive honeycomb. A controllable valve could be positioned between the pressure-adaptive honeycomb and the compressor to regulate the CDP. Contemporary dual-shaft turbofans are capable of generating overall pressure ratios on the order of 40 [Pratt&Whitney PW4000: 35, Rolls-Royce Trent 900: 39, General Electric GE90-115B: 42, GE/PW GP7270: 44 (all data from www.wikipedia.org)]. When cruising at an altitude of 11km (~36 kft) a cell differential pressure of 0.9 MPa can be achieved, assuming ISA conditions.

The generated CDP in the aircraft has an effect on the overall weight of the system. High CDPs ask for a dedicated infrastructure of tubes and hoses to connect to the pouches inside the honeycomb. For the envisioned applications a low actuation bandwidth is required. Relatively small diameter tubes could therefore be used in order to minimize added system weight. Another effect of high pressure is that the pouch material incurs a much higher circumferential stress level. In order to keep this stress level below the material yield stress either the thickness would need to be increased or the radius decreased. The first option, obviously has a negative effect on total weight. However, the latter option has a similar negative impact because it increases the cell density of the honeycomb and consequently the total weight of the system, for a given volume. Because of those possible negative effects on the total weight of the system, the designer is advised to carefully review the impact of a higher CDP on the total weight of the system. A measure for the effectiveness of the adaptive actuation system could be the specific energy density, where the total energy output is divided by the total weight of the system.

When internally generated pressure is used to power the pressure-adaptive honeycomb, there should be a back-up system to supply power in case the engine fails. In that case a static pressure source such as a CO2 cartridge could be used to provide pressure over a sufficient period of time, such that the aircraft can safely land. These cartridges are commonly used on subscale UAVs with inflatable wings and can supply sufficient gage pressure for more than eight hours, providing that there is no significant leak.

If pressure-adaptive honeycombs are used in aerospace structures, designers should have some tools they can use to predict the mechanical properties of the structure and its influence on the aerodynamics of the deforming part. The main focus is on the mechanics of pressure-adaptive honeycomb. A simple analytic model is proposed that gives the designer a first cut at stress-strain relationships based on the geometry of the honeycomb and the cell differential pressure. In addition, a finite-element-based model is presented that relies on linear elasticity with appropriate boundary conditions and pressure loading. To predict the gross aerodynamic performance of a flap deformed by pressure-adaptive honeycomb, an off-the-shelf Euler code is used.

Figure 36:
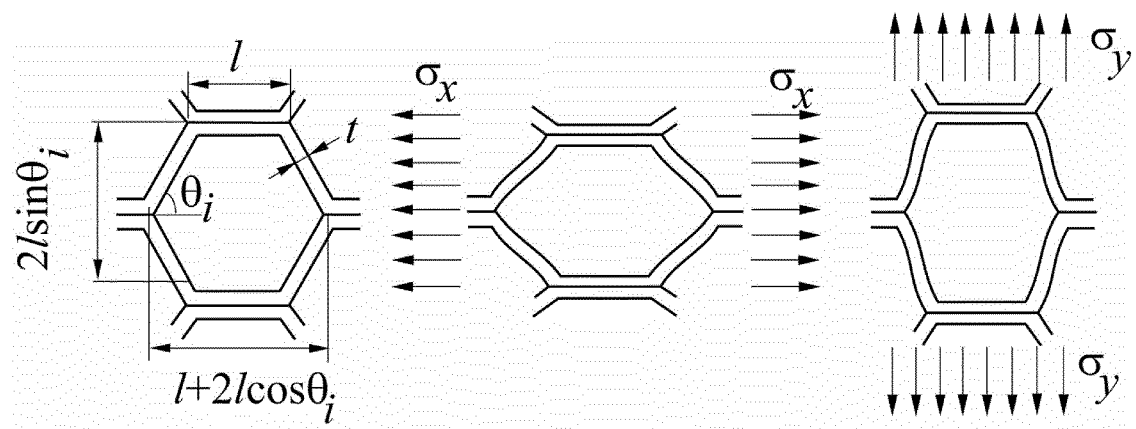

A Newtonian approach is used to find the stress-strain relationships in honeycomb. Cellular material theory (CMT) has been shown to give good predictions of material stiffness up to strains of 20%, provided that the relative thickness of the material $t/l<1/4$. FIG. 36 schematically shows how a honeycomb cell deforms when subjected to pure longitudinal and transverse stresses. If this deformation is elastic it is assumed that the wall angle, $\theta_i$, does not change throughout the process.

Instead, the members between the corner points bend into an (inverse) s-shape. As shown in FIG. 36 the honeycomb that is considered in this section is comprised of layers that are joined together. The reason behind this lies in the fact that the envisioned honeycomb is manufactured out of corrugated sheet metal or a composite material. Joining the corrugated sheets together is a relatively simple method for creating a honeycomb structure. For analysis purposes it is assumed that the bond thickness between the two sheets is negligible with respect to the wall thickness, t. Therefore, the thickness of the horizontal members in FIG. 36 amounts to 2t.

To distinguish the material properties from the honeycomb structure properties, the latter one uses a '*'. For example, E would be the stiffness of the material of which the honeycomb consists, while E* is the stiffness of the honeycomb structure itself. By doing so, the density ratio of a regular honeycomb structure can be found from:

$$\frac{\rho^*}{\rho} = \frac{2t/l}{(1+\cos\theta_i)\sin\theta_i} \quad (4.1)$$

Figure 37:
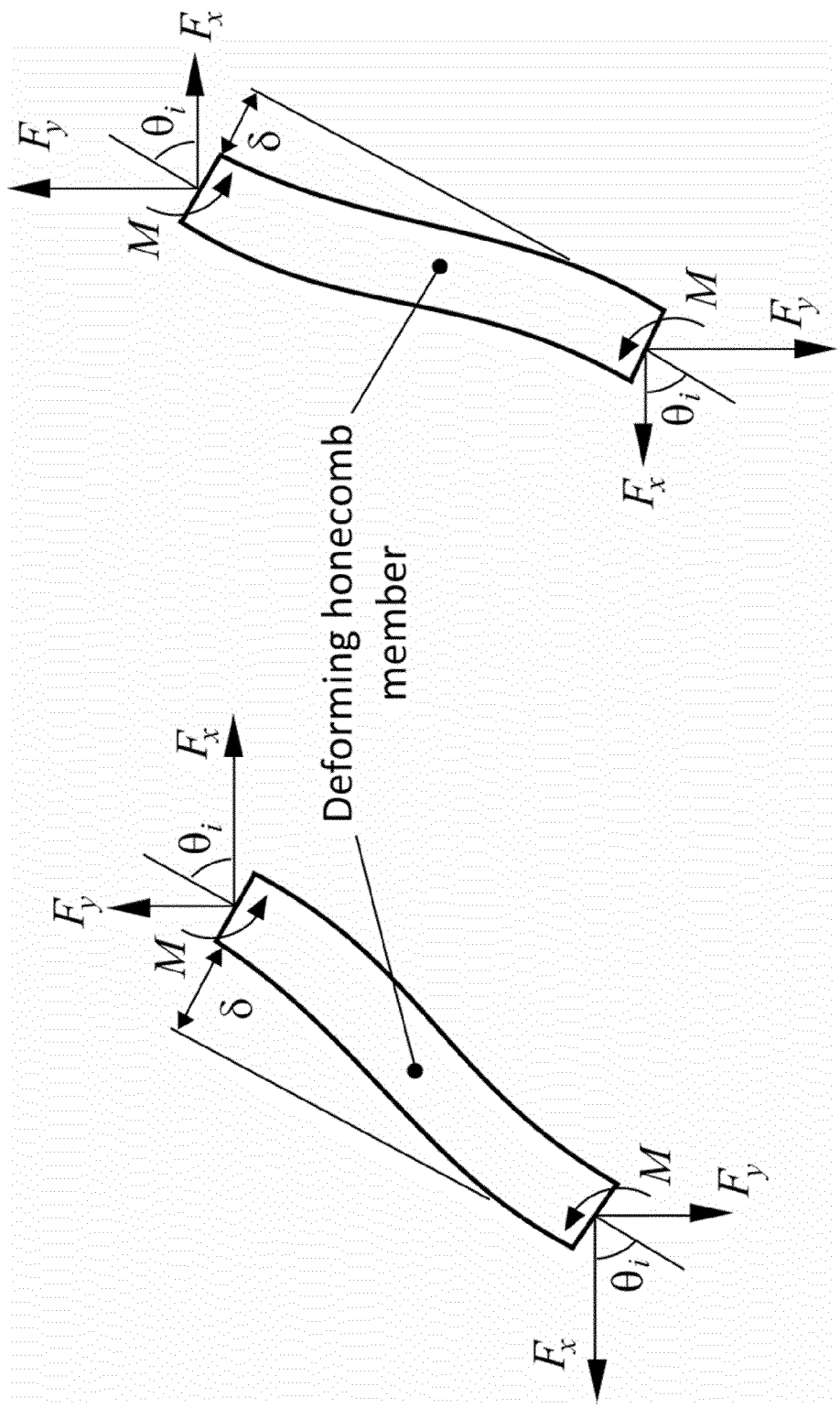
FIG. 37 Wall Deformation due to Loads in Principal Directions (Reproduced from Ref. 129)

In this section it is assumed that the honeycomb structure is build from sheets of elastic material that are strip-glued together, as shown in FIG. 36. The principal stresses on the honeycomb are redistributed throughout the structure in terms of forces and moments that induce bending in the single-thickness wall. A detail of the forces and moments acting on each of these walls is depicted in FIG. 37.

The deformation due to longitudinal stress, $\sigma_x$, is considered first. The force in x-direction is related to the longitudinal stress according to (assuming unit width):

$$F_x = \sigma_x l \sin\theta_i \quad (4.2)$$

Due to equilibrium, $F_y=0$. Therefore, the moment, M, can be defined as:

$$M = \frac{F_x l \sin\theta_i}{2} \quad (4.3)$$

Using Euler-Bernoulli beam theory the beam deflection due to the loading is:

$$\delta = \frac{F_x l^3 \sin\theta_i}{12EI} \quad (4.4)$$

where I is the second moment of area of the cell wall ($I=t^3/12$ for a wall of uniform thickness and unit width). The strain parallel to the x-axis can be found as follows:

$$\varepsilon_x = \frac{\delta \sin\theta_i}{l(\cos\theta+1)} = \frac{\sigma_x l^3 \sin^3\theta_i}{12EI(\cos\theta_i+1)} \quad (4.5)$$

Knowing that the equivalent material stiffness, $E_x^*=\sigma_x/\varepsilon_x$, the ratio of honeycomb stiffness to material stiffness is as follows:

$$\frac{E_x^*}{E} = \left(\frac{t}{l}\right)^3 \frac{\cos\theta_i+1}{\sin^3\theta_i} \quad (4.6)$$

A similar analysis applies to the deformation due to a stress in y-direction. By equilibrium $F_x=0$ and the resulting moment can be found from:

$$M = \frac{F_y l \cos\theta_i}{2} \quad (4.7)$$

where $F_y$ defined according to:

$$F_y = \sigma_y l(1+\cos\theta_i) \quad (4.8)$$

The wall then deflects according to:

$$\delta = \frac{F_y l^3 \cos\theta_i}{12EI} \quad (4.9)$$

This results in the following expression for the strain in y-direction $$\varepsilon_y = \frac{\delta \cos\theta_i}{l \sin\theta_i} = \frac{\sigma_y l^3 (1+\cos\theta_i)\cos^2\theta_i}{12EI \sin\theta_i} \quad (4.10)$$

Again, the equivalent material stiffness in y-direction can be expressed as:

$$\frac{E_y^*}{E} = \left(\frac{t}{l}\right)^3 \frac{\sin\theta_i}{(1+\cos\theta_i)\cos^2\theta_i} \quad (4.11)$$

If θi=60 degrees, then both Young's moduli reduce to the same value, yielding isotropic properties:

$$\frac{E^*_{x,\theta_i=60°}}{E} = \frac{E^*_{y,\theta_i=60°}}{E} = \frac{4}{\sqrt{3}}\left(\frac{t}{l}\right)^3 \quad (4.12)$$

By loading the honeycomb members, their s-s member which is not accounted for in the model magnify their deflection. In particular, when the of the member, this magnification becomes sub assumes this effect to be negligible.

The Poisson's ratios can be found by taking the ratio of the strains caused by the applied stress in either x- or y-direction:

$$\upsilon^*_{xy} = -\frac{\varepsilon_y}{\varepsilon_x} = \frac{\cos\theta_i(\cos\theta_i + 1)}{\sin^2\theta_i} \quad (4.13)$$

$$\upsilon^*_{yx} = -\frac{\varepsilon_x}{\varepsilon_y} = \frac{\sin^2\theta_i}{\cos\theta_i(\cos\theta_i + 1)} \quad (4.14)$$

The Poisson's ratios that are defined above should be interpreted as global Poisson's ratios. In other words, their value changes with the reference angle, $\theta_i$, of the honeycomb. The following identity is satisfied:

$$E_x\upsilon^*_{yx} = E_y\upsilon^*_{xy} = E\left(\frac{t}{l}\right)^3 \frac{2}{\sin 2\theta} \quad (4.15)$$

Figure 51:
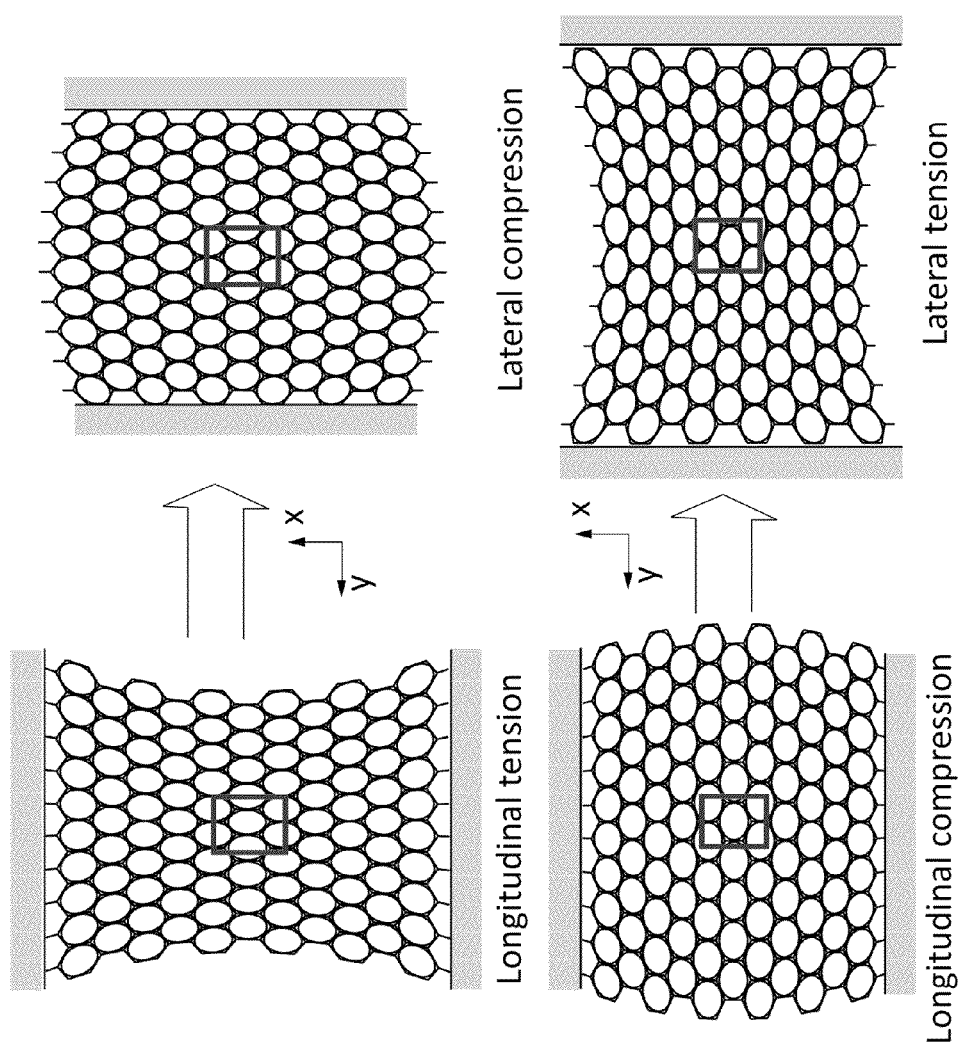

The shear deformation of honeycomb is less straightforward as the deformation in principal directions (shown in FIG. 51). To verify the behavior in shear, a simple shear frame was constructed in which a regular honeycomb was positioned at an arbitrary honeycomb angle, the shear frame was photographed at its initial position (left) and in its skewed position. Detailed analysis of 126 honeycomb cells confirmed that during shear deformation only the 'horizontal' members of the cell showed deformation. The angled members were rotated, but their relative position remained unchanged.

Figure 38:
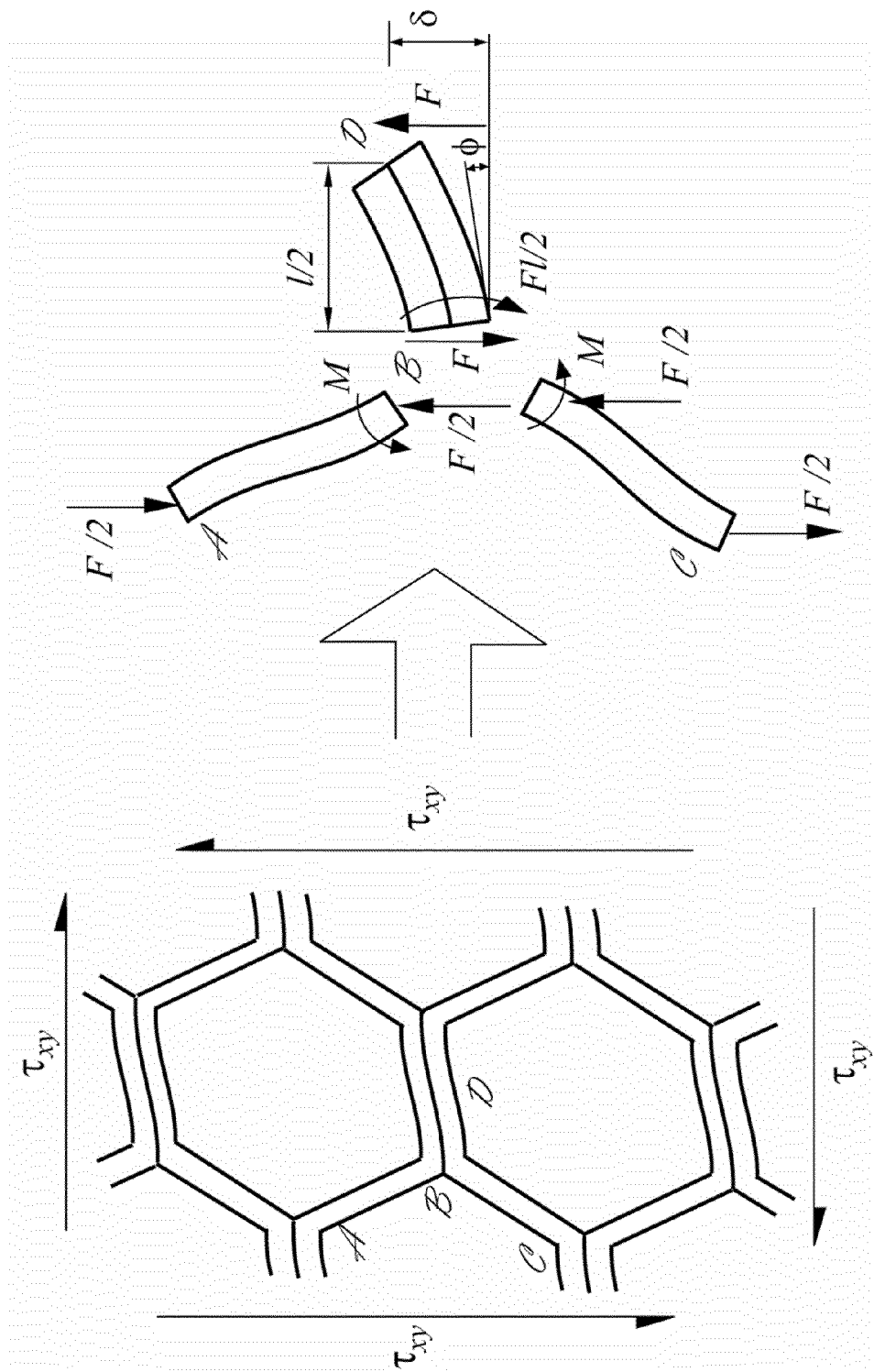
FIG. 38 Shear Deformation of Honeycomb Cells (Reproduced from p. 80 of Ref. 129)

The shear deformation in honeycomb cells is schematically shown in FIG. 38. The shear stress, $\tau_{xy}$, is redistributed as a set of discrete forces that act on the individual members. As was explained in the previous paragraph, there is no relative motion of points A, B, and C when the honeycomb is sheared. The shear deformation is entirely due to the rotation, of the joint at point B and the deflection, δ, at point D. Forces resulting from shear stresses that run in horizontal direction, therefore, do not contribute to the shear deformation of the cells. Only forces resulting from the vertical components of the shear stress induce shear strain in the honeycomb cells.

Following the nomenclature laid out in FIG. 38, the moment applied to members AB an BC amounts to:

$$M = Fl/4 \quad (4.16)$$

The deflection due to the shear load at point D is:

$$\delta = \frac{1}{2}\phi l + \frac{F}{3EI_2}\left(\frac{l}{2}\right)^3 = \frac{Fl^3}{48EI_1} + \frac{Fl^3}{24EI_2} = \frac{5Fl^3}{16Et^3} \quad (4.17)$$

Where $I_1$ is the second moment of the cross-sectional area of the single-thickness walls and $I_2$ is the second moment of the cross-sectional area of the double-thickness walls. The shear strain, $\gamma_{xy}$, can be obtained as follows:

$$\gamma_{xy} = \frac{2\delta}{l(1+\cos\theta_i)} = \frac{5}{8(1+\cos\theta_i)}\frac{Fl^2}{Et^3} \quad (4.18)$$

The discrete force, F, relates to the shear stress according to:

$$\tau_{xy} = \frac{F}{2l\sin\theta_i} \quad (4.19)$$

Combining Equations 4.18 and 4.19 and substituting for the moment of inertia yields the shear stiffness:

$$\frac{G'_{xy}}{E} = \frac{4}{5}\left(\frac{t}{l}\right)^3 \frac{1+\cos\theta_i}{\sin\theta_i} \quad (4.20)$$

For regular honeycomb where $\theta_i=60°$ this relation reduces to $$\frac{G'_{xy,\theta_i=60°}}{E} = \frac{12}{5\sqrt{3}}\left(\frac{t}{l}\right)^3 = 5E^*_{\theta_i=60°}/4E \quad (4.21)$$

This section lays out a simple model that characterizes pressurized honeycomb cells with rigid walls. The model can be used to predict honeycomb strains as a function of pressure, initial geometry, and applied stress.

It is assumed that the ratio between pouch volume and the volume occupied by the hexagonal cell is constant during deformation. This ratio is set to the ratio that is found when the pouch forms a perfect circle inside the hexagon and touches each of its flanges. This ratio is denoted with ζ, and amounts to ζ=√3π/6≈0.91. Furthermore, it is assumed that the honeycomb walls are rigid and connected by frictionless hinges. Therefore, no structural stiffness comes into play. In addition, the pouch is assumed to be totally inelastic. Its perimeter does not change during deformation.

Figure 39:
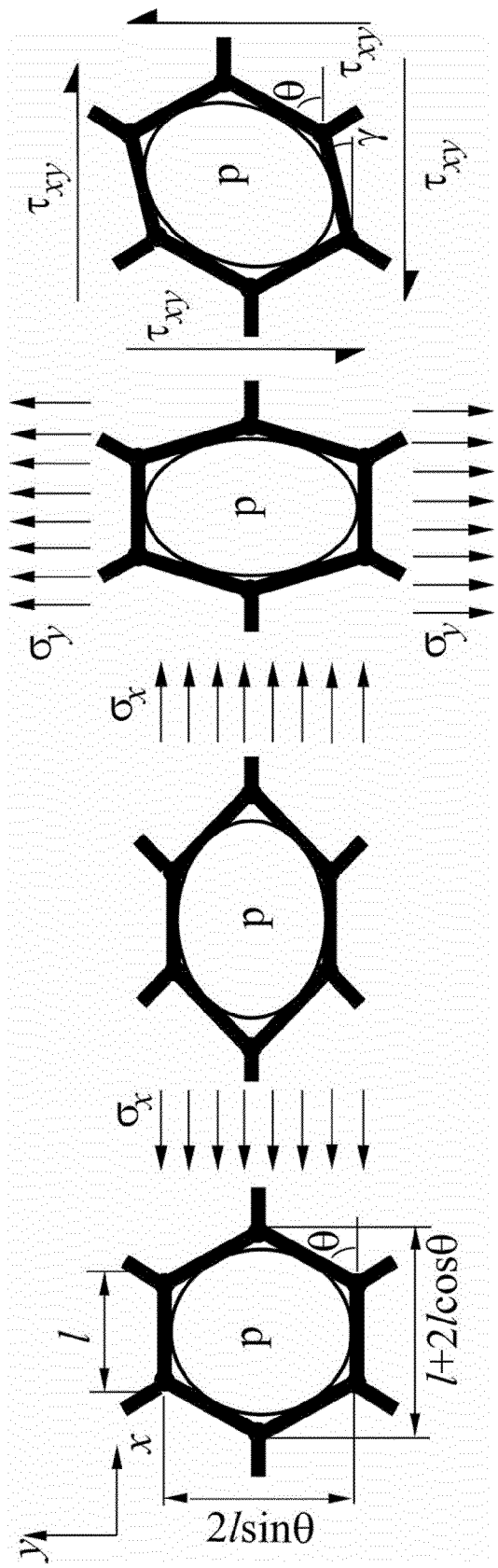
FIG. 39 Definitions and Sketch of Principal and Shear Deformations

The honeycomb angle, θ, changes continuously during deformation. Along with the honeycomb angle, the internal volume, V, of the pouch changes as well. When the pressurized honeycomb is to perform mechanical work, the pressure needs to overcome the inherent stiffness of the honeycomb and some sort of external stress, σ. In practice the external stress might originate from aerodynamic and/or structural loads. FIG. 39 shows how a cell within the honeycomb grid would deform as a result of applied stresses. To model the relationship between the stress and the strain of the honeycomb an energy approach is considered.

Figure 40A:
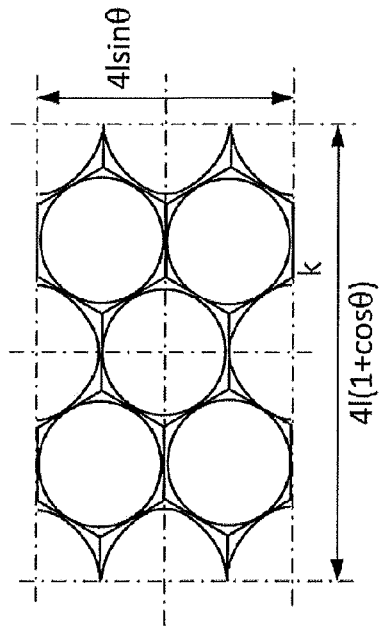
FIGS. 40A-40D Breakdown of Honeycomb Grid into Basic Modeling Blocks
Figure 40C:
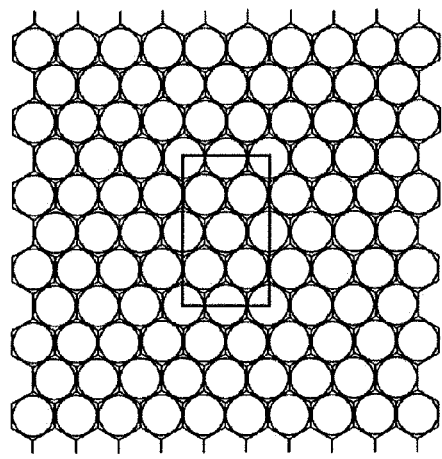
Figure 40B:
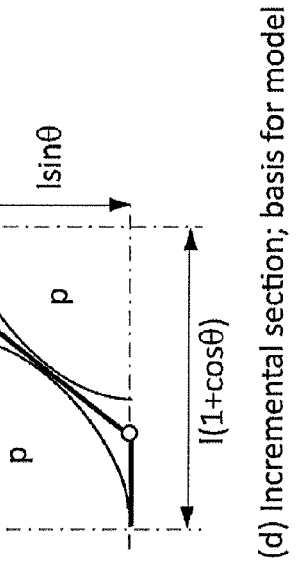
Figure 40D:
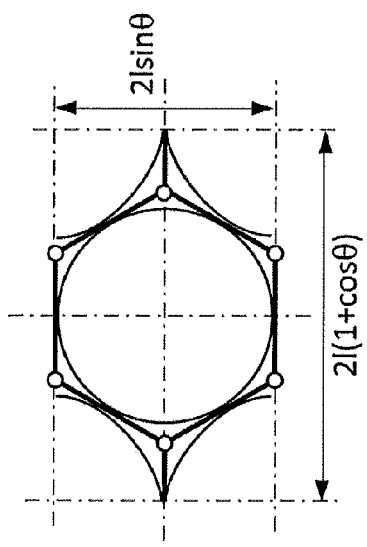

To model its bulk properties the honeycomb grid is broken down into smaller and smaller sections that still exhibit the same geometric and stiffness properties. This stepwise process is shown schematically in FIG. 40. The smallest building block that still possesses the same properties as the bulk structure is depicted in FIG. 40(d).

To evaluate the relation between the internal volume and pressure, the perfect gas law is employed, where R is the gas constant for air, T is the temperature, and m is the mass of air that is trapped in the pouch:

$$p = mRT/V \quad (4.22)$$

the useful work of a pressurized volume can be expressed as follows:

$$W_{use} = \int_{V_i}^{V} p\,dV - p_a(V - V_i) \quad (4.23)$$

In this equation, $V_i$ is the initial volume of the system. The ambient pressure is the pressure is denoted with $p_a$. Two forms of applications can be envisioned for the pressurized honeycomb. One application would use sealed pouches that have a constant mass of air in them. In that case Equation 4.23 yields:

$$W_{use} = mRT \ln(V/V_i) - p_a(V - V_i) \tag{4.24}$$

Note that Equation 4.22 relates the change in pressure to the change of the inverse of the volume. When temperature and mass are independent of the displacement they are taken outside the integral.

Another application could rely on an outside pressure source to keep the pouches at a constant pressure. In that case p is constant and Equation 4.23 integrates to:

$$W_{use} = (p - p_a)(V - V_i) \tag{4.25}$$

I

The external work done by the force F can be found from:

$$W_{ex} = \int_s F \cdot ds \tag{4.26}$$

When the external work is balanced by the useful work done by the pressurized honeycomb a solution can be found for the external force, F. This force, in turn, can be related to principal and shear stresses as is pointed out in the next two sections.

Figures 41A, 41B:
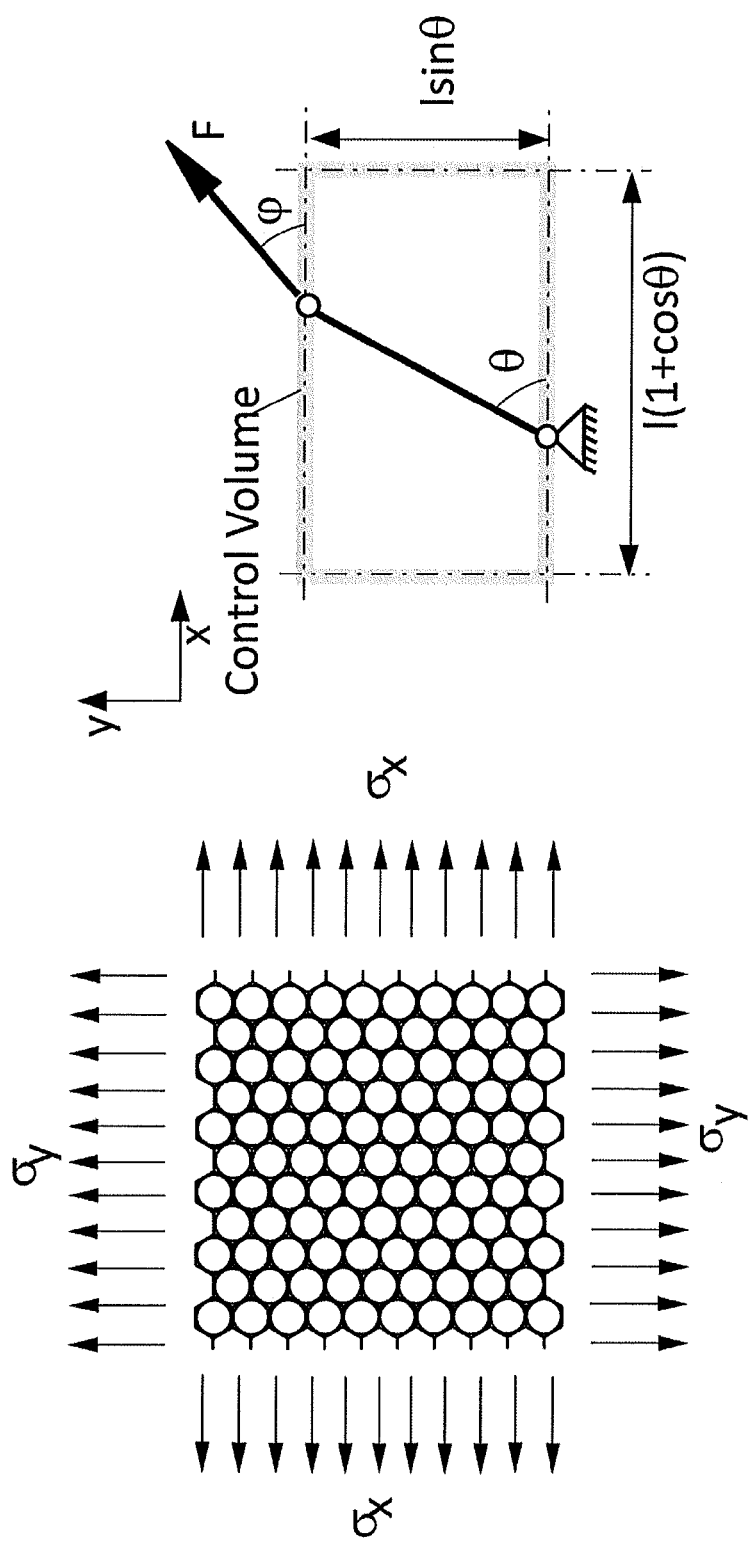
FIGS. 41A and 41B Normal Stress on a Honeycomb Grid

By loading a honeycomb grid with shear and normal stresses, discrete forces are introduced in the hinge points of the members. FIG. 41(a) shows schematically how the stresses are introduced into the grid. FIG. 41(b) demonstrates how an incremental section of the honeycomb would be loaded as a result of the stresses. The force that is introduced is related to the applied stresses and initial honeycomb angle, $\theta_i$, as follows:

$$F = l\sqrt{\sigma_x^2 \sin^2\theta_i + \sigma_y^2(1+\cos\theta_i)^2} \tag{4.27}$$

$$\phi = \tan^{-1}[\sigma_y(1+\cos\theta_i)/\sigma_x \sin\theta_i] \tag{4.28}$$

Referring to FIG. 41(b) for definitions, the relation between the pouch volume, V, and angle, θ, can be expressed as follows:

$$V = \zeta l_2(1+\cos\theta)\sin\theta \tag{4.29}$$

The incremental displacement in the direction of the applied force, ds, can be found from geometry:

$$ds = l\sin(\theta - \phi)d\theta \tag{4.30}$$

Integrating between $\theta_i$ and $\theta$ and taking the constant force out of the integral results in the following:

$$W_{ex} = Fl[\cos(\theta - \phi) - \cos(\theta_i - \phi)] \tag{4.31}$$

The external work balances the closed system work of Equations 4.25 and 4.24, respectively. For a constant mass, the force can be expressed as a function of the geometric and physical parameters according to:

$$F = \frac{1}{l}\frac{mRT\ln(V/V_i) - p_a(V - V_i)}{\cos(\theta - \varphi) - \cos(\theta_i - \varphi)} \tag{4.32}$$

In the case of a constant pouch pressure the force yields:

$$F = \frac{1}{l}\frac{(p - p_a)(V - V_i)}{\cos(\theta - \varphi) - \cos(\theta_i - \varphi)} \tag{4.33}$$

The relations of Equations 4.27 and 4.28 can be inverted to express the stresses as a function of the force as follows:

$$\sigma_x = \frac{F\cos\varphi}{l\sin\theta_i} \tag{4.34}$$

$$\sigma_y = \frac{F\sin\varphi}{l(1 + \cos\theta_i)} \tag{4.35}$$

Equations 4.32 and 4.33 can be combined with Equations 4.34 and 4.35 to demonstrate relationships between stress and honeycomb angle for constant mass and constant pressure scenarios.

Two special cases are distinguished: ($\phi=0$ or, equivalently, $\sigma_y=0$) and pure lateral stress ($\phi=\pi/2$ or, equivalently, $\sigma_x=0$). For these two instances the relationship between stress and honeycomb angle can be determined for the case of constant mass and the case of constant pressure. These relations are presented below. Note that the volume terms should be substituted with the RHS of Equation 4.29, where $V_i$ is found by substituting $\theta=\theta_i$.

Assume Constant Mass:

$$\sigma_y = 0 \quad \sigma_x = \frac{1}{l^2\sin\theta_i}\frac{mRT\ln(V/V_i) - p_a(V - V_i)}{\cos\theta - \cos\theta_i} \tag{4.36}$$

$$\sigma_x = 0 \quad \sigma_y = \frac{1}{l^2(1+\cos\theta_i)}\frac{mRT\ln(V/V_i) - p_a(V - V_i)}{\sin\theta - \sin\theta_i} \tag{4.37}$$

Assume Constant Pressure:

$$\sigma_y = 0 \quad \sigma_x = \frac{1}{l^2\sin\theta_i}\frac{(p - p_a)(V - V_i)}{\cos\theta - \cos\theta_i} \tag{4.38}$$

$$\sigma_x = 0 \quad \sigma_y = \frac{1}{l^2(1+\cos\theta_i)}\frac{(p - p_a)(V - V_i)}{\sin\theta - \sin\theta_i} \tag{4.39}$$

If the honeycomb is modeled with rigid members connected by hinges, the angle θ is related to the strain of the honeycomb according to:

$$\varepsilon_x = \frac{\cos\theta - \cos\theta_i}{1 + \cos\theta_i} \tag{4.40}$$

$$\varepsilon_y = \frac{\sin\theta - \sin\theta_i}{\sin\theta_i} \tag{4.41}$$

Figures 42A, 42B:
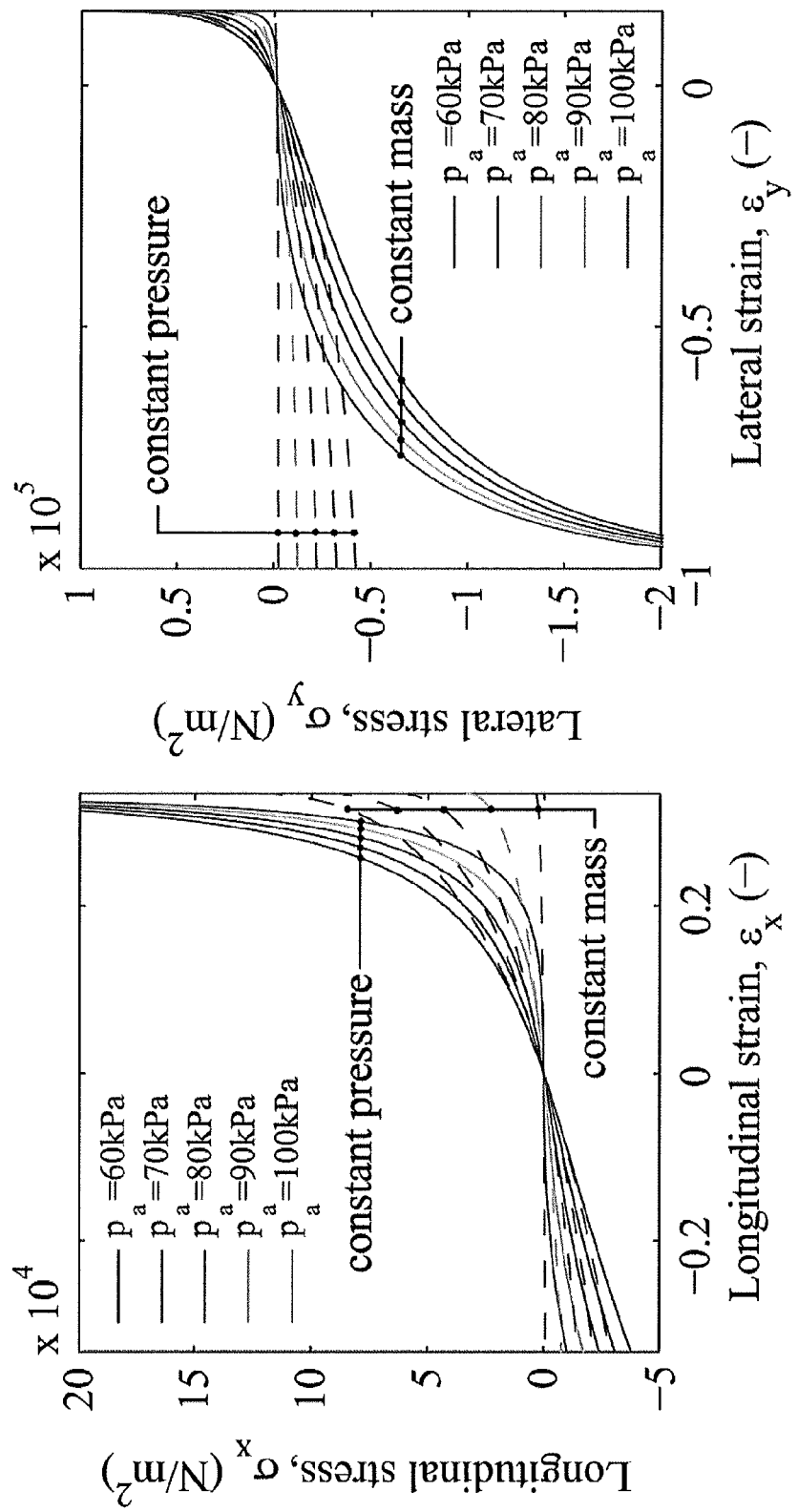
FIGS. 42A-42B Comparing Results between Constant Mass and Constant Pressure Models in Pure Longitudinal Stress (left) and Pure Lateral Stress (right)

Both stress and strain are defined in terms of the honeycomb angle, θ. A comparison is made between the constant-mass and constant-pressure models in pure longitudinal and lateral stress, respectively. These stress-strain relations are displayed in FIG. 42, where the following conditions apply: $\theta_i=60°$, R=287 kJ/kg/K, T=288K, and $\rho=1.225$ kg/m$^3$. In addition, the mass is calculated according to $m=\rho V_i$ and the pressure is calculated using the perfect gas law (Eq. 4.22).

From the graphs it can be seen that both models predict non-linear stress-strain behavior. Both models align around the zero-stress point. The constant-mass model shows more resistance against deformation than the constant-pressure model, especially at large positive longitudinal strains and large negative lateral strains. Note, that these two strain situations correspond to the same volumetric change. At negative longitudinal strains and positive lateral strains both models follow each other much more closely.

Figures 43A, 43B:
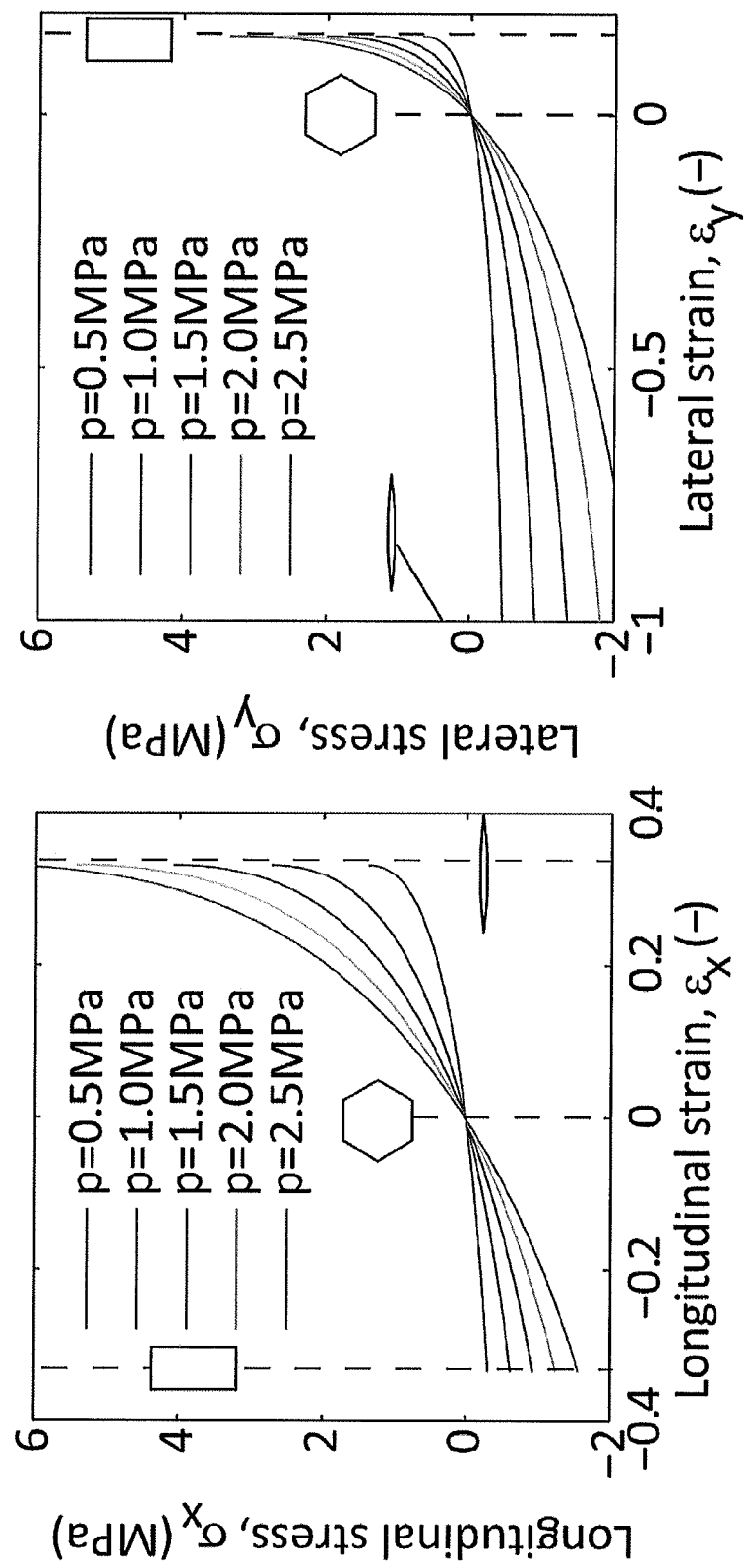
FIGS. 43A-43B Stress Strain Relations at Elevated Constant CDPs

In addition, the stress-strain relations for high-gage-pressure honeycomb are shown in FIG. 43. Notice that the scale on the vertical axis in these graphs show stresses an order of magnitude greater than those presented in FIG. 42. Apart from the scaling, the lines show similar behavior to those in the graphs above. The stress strain graphs for high-gage-pressure honeycomb are useful for determining the performance of externally pressurized honeycomb.

The Poisson's ratio is highly nonlinear because of the kinematics of the honeycomb structure. The Poisson's ratio is related to the angle $\theta$ according to:

$$\upsilon_{xy} = -\frac{\varepsilon_y}{\varepsilon_x} = -\frac{1+\cos\theta_i}{\sin\theta_i}\frac{\sin\theta - \sin\theta_i}{\cos\theta - \cos\theta_i} \quad (4.42)$$

$$\upsilon_{yx} = -\frac{\varepsilon_x}{\varepsilon_y} = -\frac{\sin\theta_i}{1+\cos\theta_i}\frac{\cos\theta - \cos\theta_i}{\sin\theta - \sin\theta_i} \quad (4.43)$$

Figure 44:
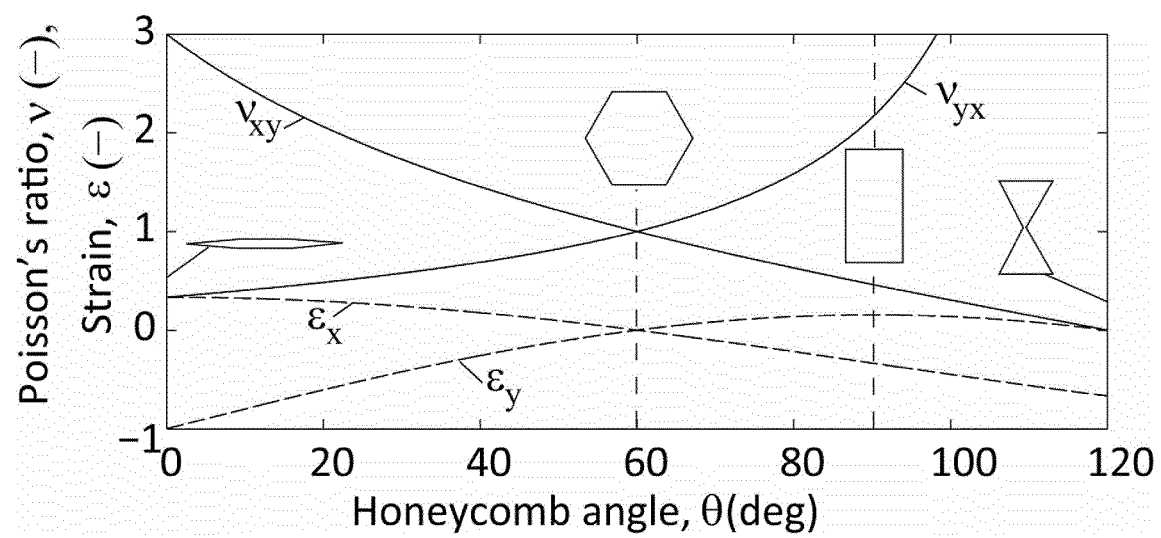
FIG. 44 Poisson's Ratio and Strain Plotted Against Honeycomb Angle

Via the honeycomb angle, $\theta$, the relation between the longitudinal and lateral strain, as well as the relation between the longitudinal strain and the Poisson's ratio can be plotted. Equations 4.40 through 4.43 are graphed in FIG. 44 for $\theta i=60°$. From the figure below it can be seen that at the initial position ($\theta=\theta i$) the Poisson's ratios equal unity.

Because the relationship between stress and strain is highly nonlinear the stiffness induced by the pressure is not constant. The stiffness changes throughout the deformation of the honeycomb. To explore the variation in longitudinal and lateral stiffness, respectively, the slopes of the local tangents to the stress strain curves are found:

$$E_x = \frac{d\sigma_x}{d\varepsilon_x} = \frac{d\sigma_x}{d\theta}\frac{d\theta}{d\varepsilon_x} \quad (4.44)$$

$$E_y = \frac{d\sigma_y}{d\varepsilon_y} = \frac{d\sigma_y}{d\theta}\frac{d\theta}{d\varepsilon_y} \quad (4.45)$$

Figures 45A, 45B:
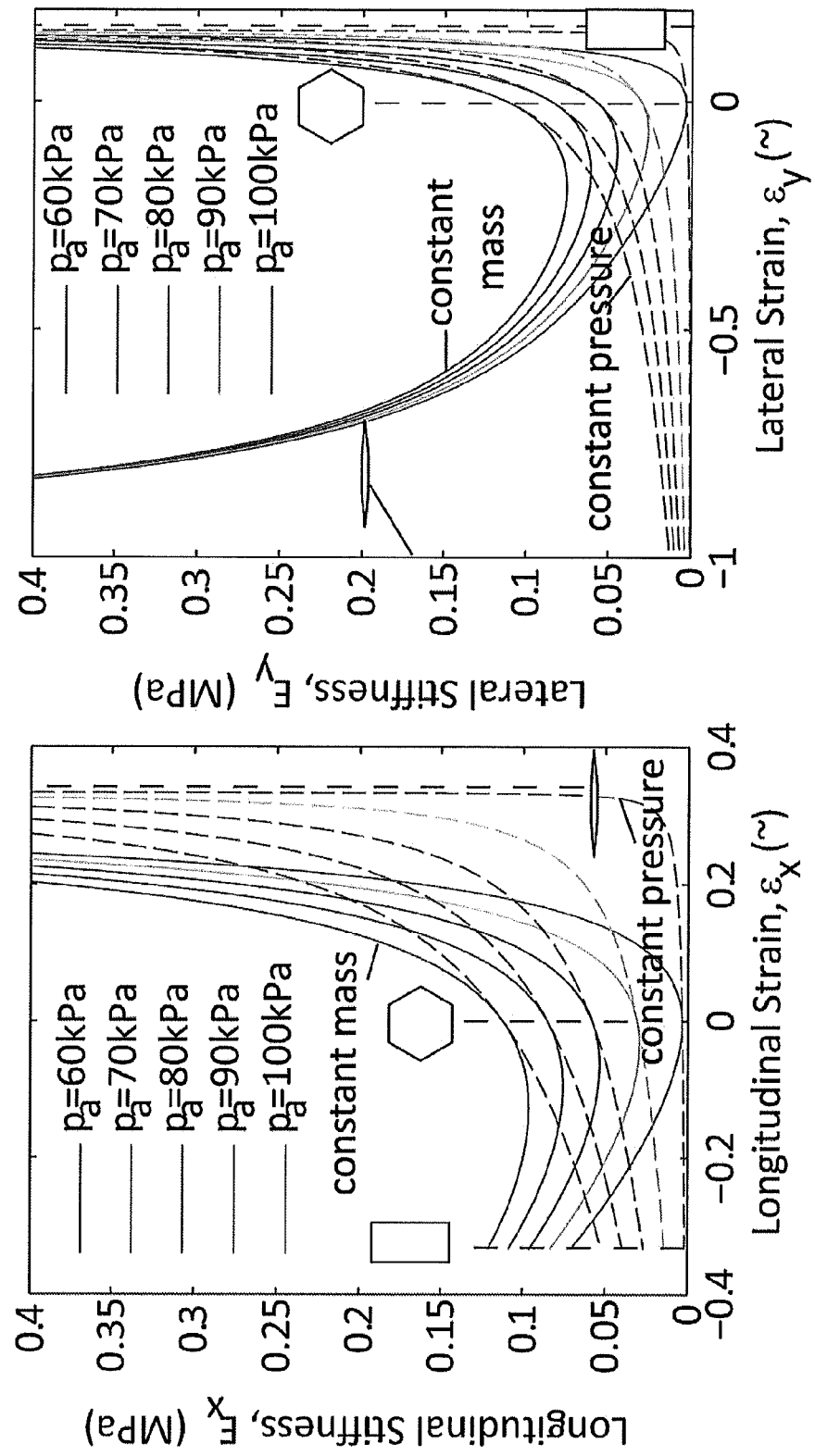
FIGS. 45A-45B Stiffness Variation with Strain for $p_a$=101.3 kPa
Figures 46A, 46B:
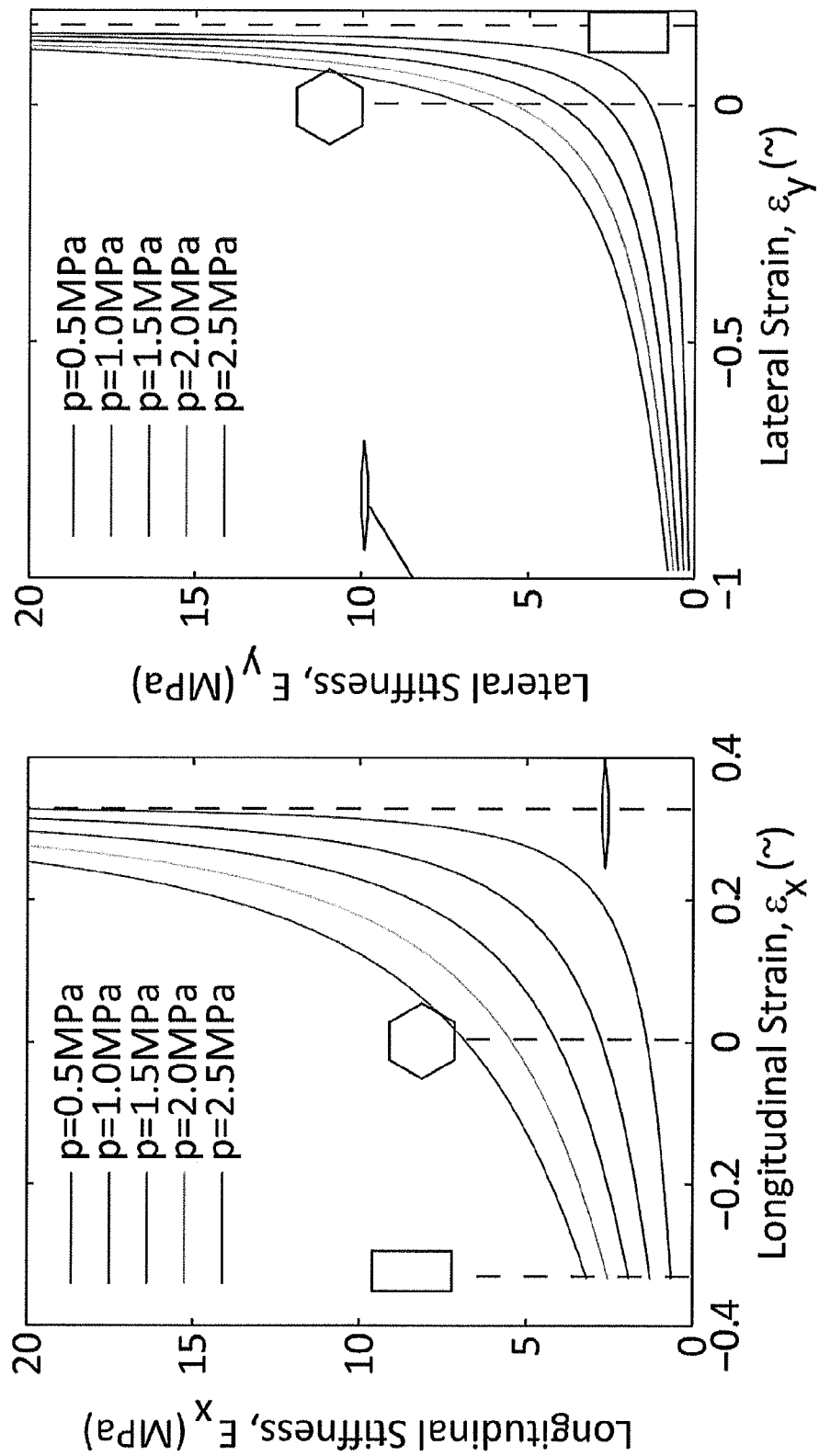
FIGS. 46A-46B Stiffness Variation with Strain at Elevated CDPs ($p_a$=0)

If the derivatives in these relations are solved an expression for the stiffness as a function of the honeycomb angle, $\theta$, is found. Equations 4.44 and 4.45 are graphically shown as a function of strain in FIG. 45 for the cases of constant mass (solid lines) and constant pressure (dashed lines). In addition, FIG. 46 demonstrates the change in pressure stiffness for honeycombs at higher constant CDPs.

From the figures above some statements can be made about the pressure induced stiffness in the honeycomb. First of all, for both cases (constant mass and constant pressure) the stiffness in principal directions is highly nonlinear. Furthermore, when there is no strain, the constant mass and constant-pressure lines have the same value and the same slope. Moreover, at this point the stiffness in longitudinal direction equals the stiffness in lateral direction, yielding isotropic material properties. This is an important feature because once the pressure difference becomes high enough the honeycomb assumes a shape very close to where there are no effective strains. In this state, the honeycomb has isotropic in-plane stiffness properties which are well understood. Substituting $\theta=\theta i=60°$ in Equations 4.44 or 4.45 results in the appropriate value for the isotropic in-plane stiffness of the honeycomb.

Figures 47A, 47B:
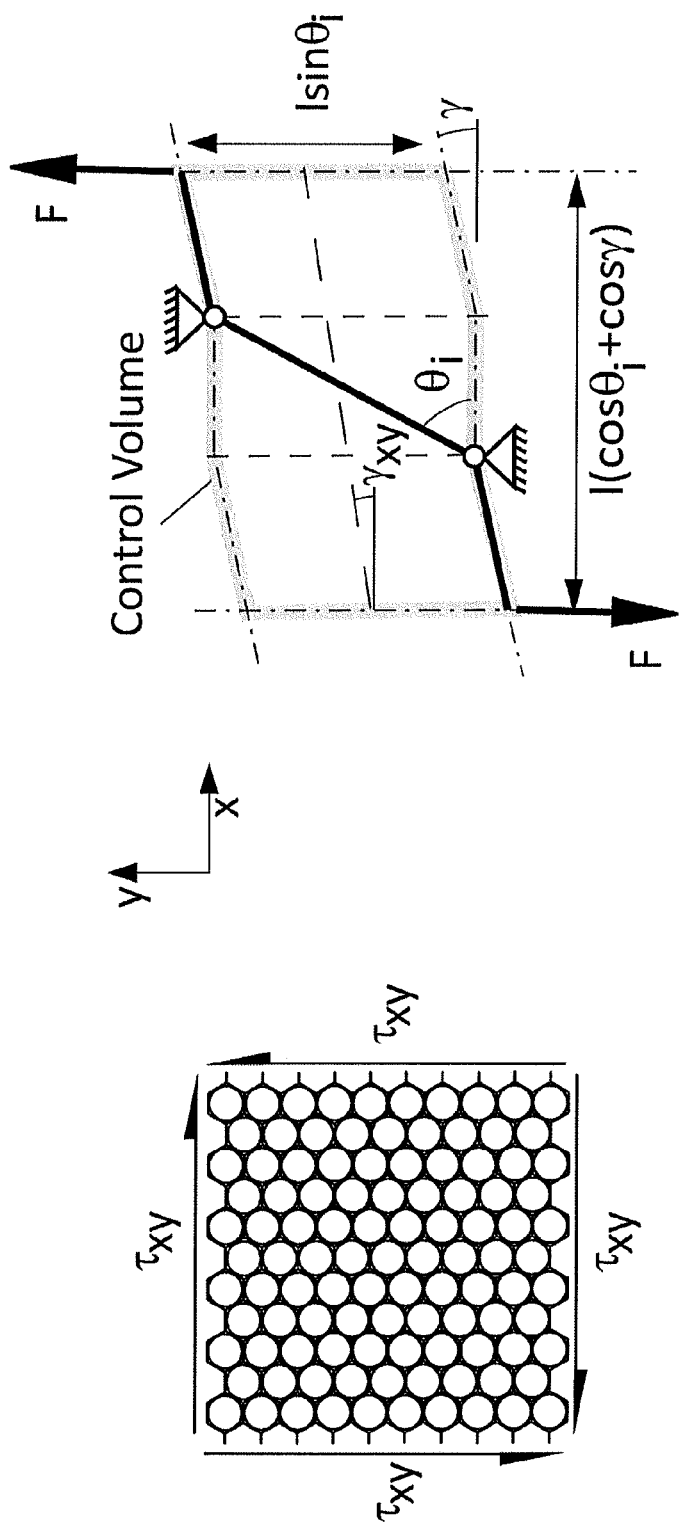
FIGS. 47A-47B Shear Stresses on Honeycomb Grid

The shear deformation cannot be captured if the incremental section of FIGS. 41A and 41B with its constraints is considered. However, the proposed model of rigid members and frictionless hinges is capable of capturing the shear modulus of the pressurized honeycomb. FIG. 47 shows how the incremental section in the honeycomb deforms as a result of forces stemming from shear stresses. Because of symmetry there is no relative motion of the diagonal member. Therefore, in this setup it is fixed between two hinge points. All the shear deformation comes from rotation of the horizontal members. Therefore, the diagonal member in FIG. 47 is shown with two fixed hinge points, preventing it from rotation.

The shear strain, $\gamma_{xy}$, is related to the angular rotation, $\gamma$, of the horizontal member according to:

$$\gamma_{xy} = \tan^{-1}\frac{\sin\gamma}{\cos\theta_i + \cos\gamma} \quad (4.46)$$

The force that stems from the shear stresses can be easily solved for:

$$F=\tau_{xy}l\sin\theta_i \quad (4.47)$$

To relate the shear stress to the shear strain. The control volume is a function of the shear strain according to:

$$V=\zeta l^2 \sin\theta_i(\cos\theta_i+\cos\gamma) \quad (4.48)$$

Equations 4.22 through 4.25 can be employed to find the work done by the pressurized volume or the case of constant mass and the case of constant pressure. The displacements of the top right corner and the bottom left corner in the direction of the force add up to:

$$ds=2l\cos\gamma d\gamma \quad (4.49)$$

Substituting ds in Equation 4.26 and integrating between 0 and $\gamma$ results in external work applied to the structure. Balancing the external work with the work done by the pressurized volume results in an expression for the force, F. In the case of a constant mass the shear stress is:

$$\tau_{xy} = \frac{1}{l^2\sin\theta_i}\frac{mRT\ln(V/V_i) - p_a(V-V_i)}{2\sin\gamma} \quad (4.50)$$

When the pressure is held constant this relation changes to:

$$\tau_{xy} = \frac{1}{l^2\sin\theta_i}\frac{(p-p_a)(V-V_i)}{2\sin\gamma} \quad (4.51)$$

Figure 48A:
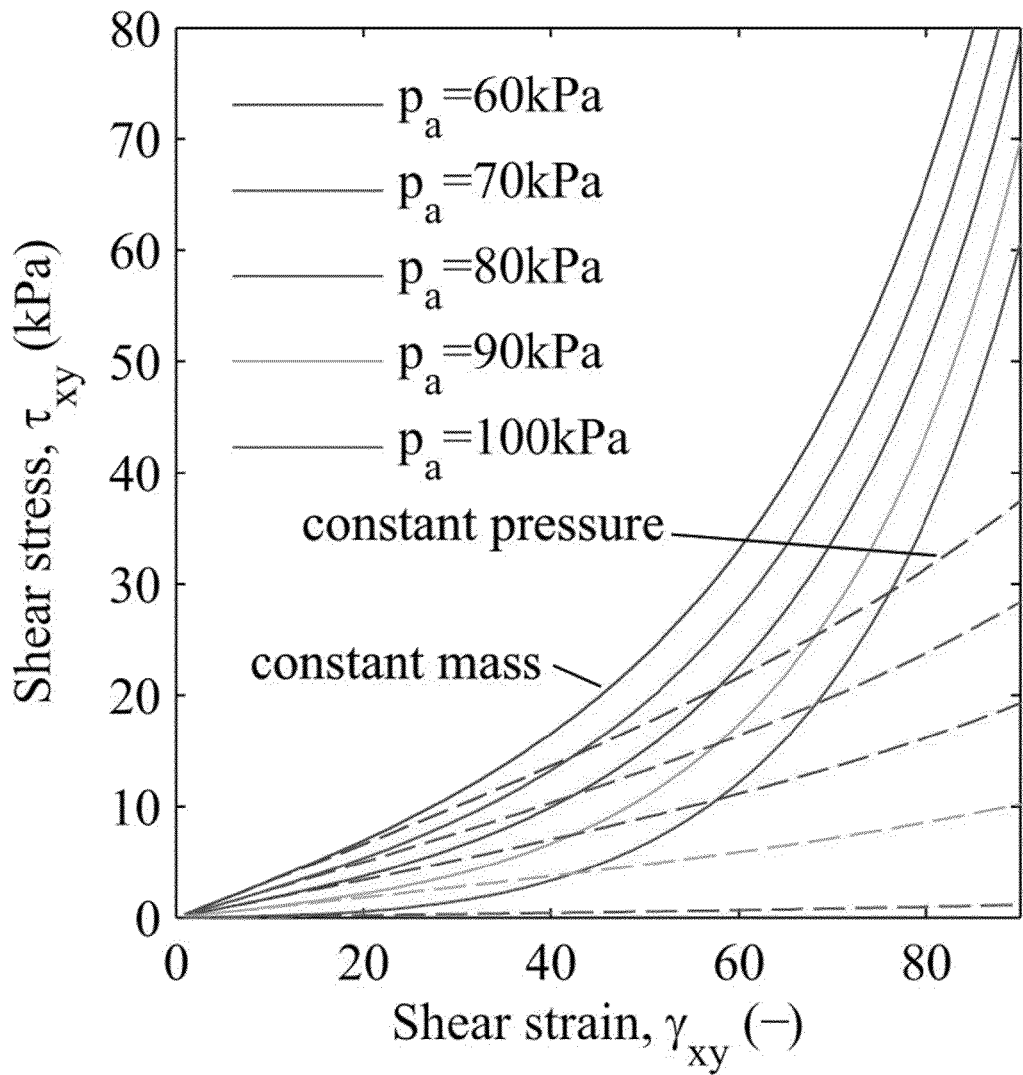
FIGS. 48A and 48B Shear Stress-Strain Relation for $T_j^o$; Comparing Results between Constant Mass and Constant Pressure Models in Shear Stress (left) and Elevated CDP (right)
Figure 48B:
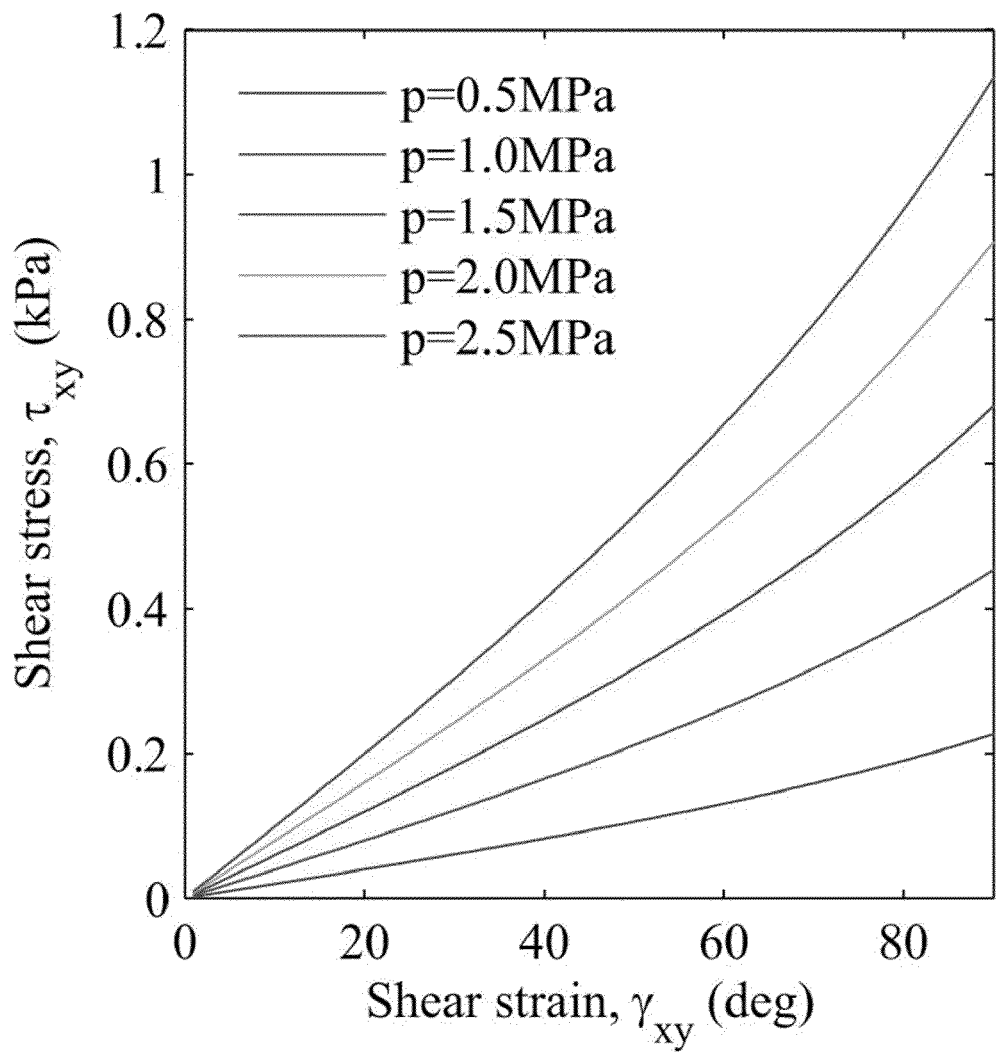

FIGS. 48A and 48B shows how the shear stress and shear strain are related when the honeycomb has perfectly hexagonal cells. In the case of constant mass, the structure shows a higher stiffness than in the case of constant pressure. Note that the graphs in this figure are only for positive shear strain.

The in-plane shear stiffness, $G_{xy}$, can be calculated according to:

$$G_{xy} = \frac{d\tau_{xy}}{d\gamma}\frac{d\gamma}{d\gamma_{xy}} \quad (4.52)$$

Figure 49A:
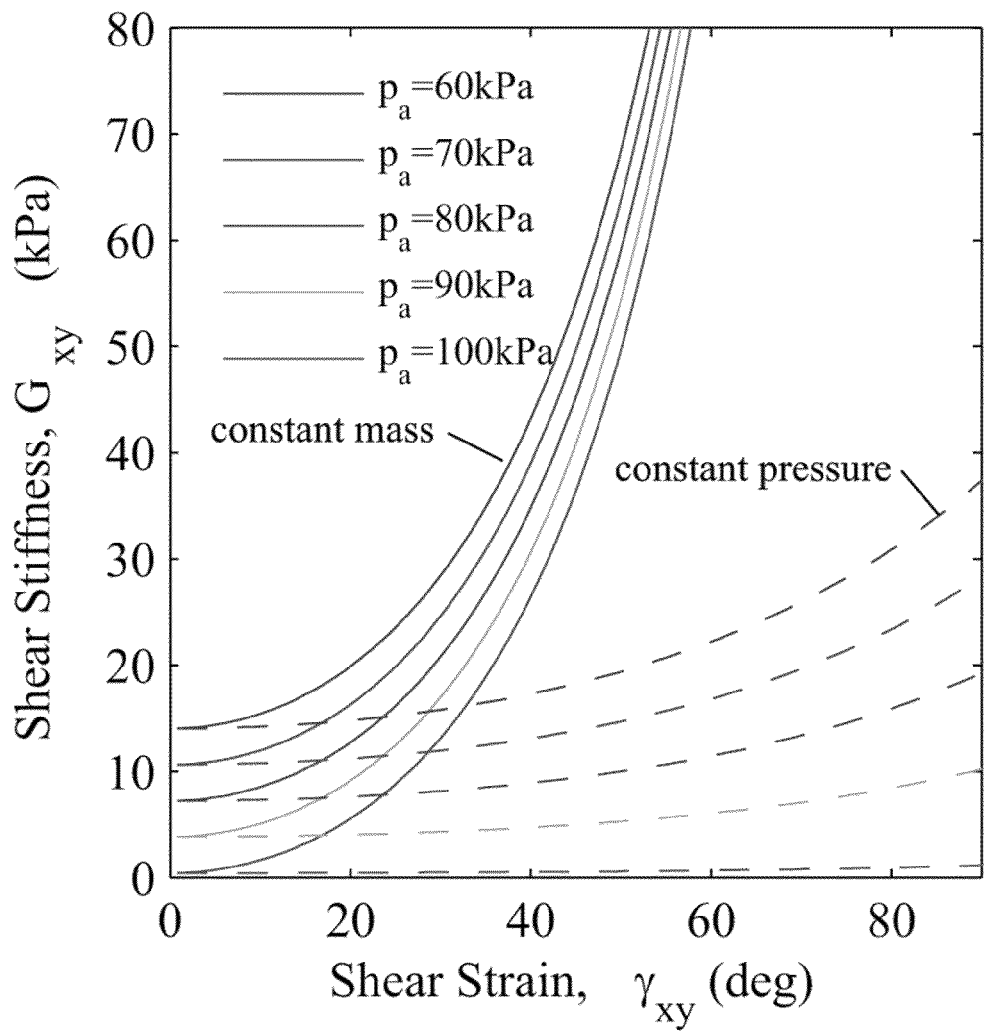
FIGS. 49A and 49B Shear Stiffness Variation with Shear Strain
Figure 49B:
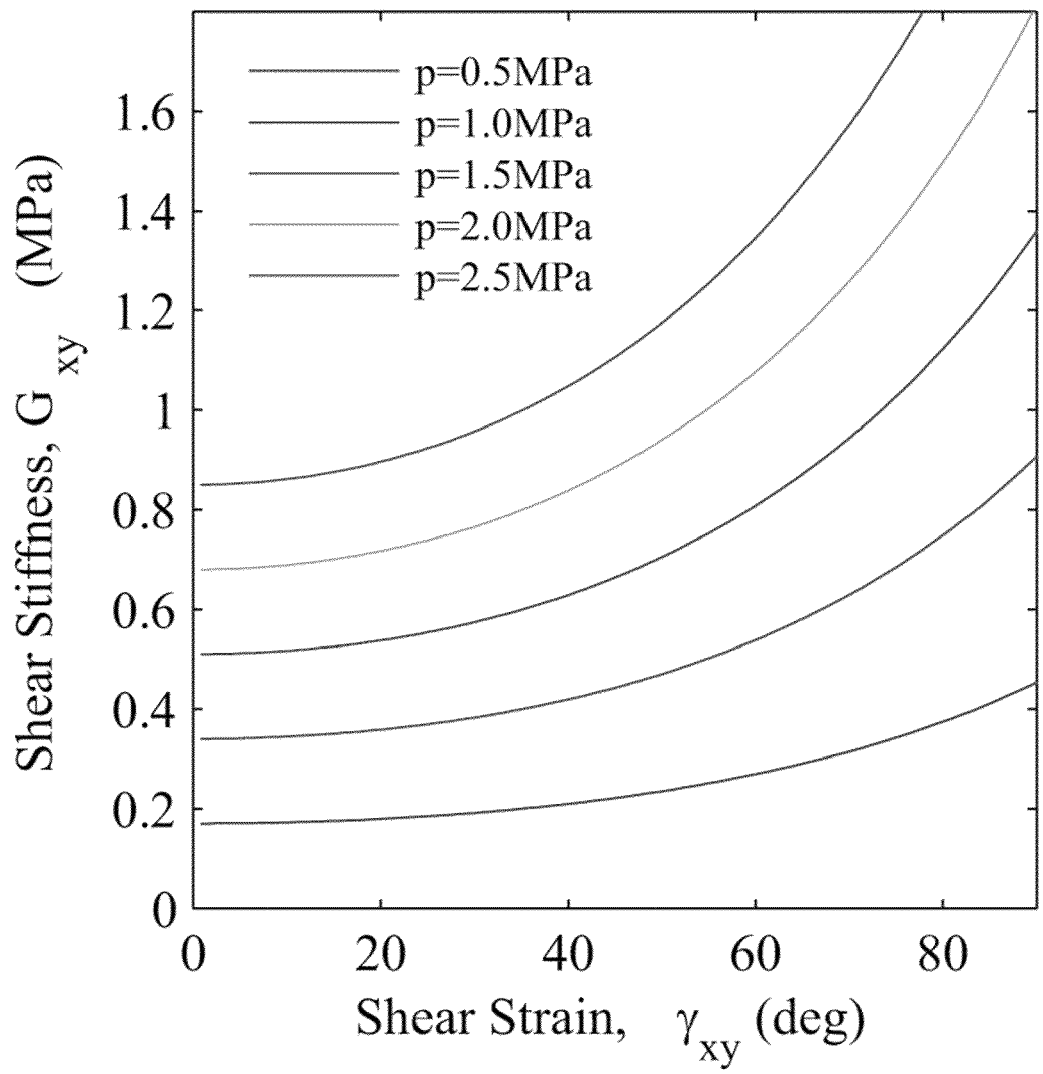

The derivatives in Equation 4.52 are elaborated in Appendix B. The variation in shear stiffness with shear strain is depicted in FIGS. 49A and 49B. It is clear from this figure that the shear stiffness is highly non-linear with shear strain in case of constant mass. This non-linearity is less profound in the case of a constant pressure. Therefore, for relatively small shear strains, this could be very well approximated with a constant value, e.g. the value found when $\gamma=0$.

The stress-strain relations that have been presented in the previous sections are highly non-linear. In an effort to simplify the analysis of pressurized honeycomb, these relations can be linearized around a particular honeycomb angle. In this section the linearization of these relations is done around the honeycomb angle where $\epsilon_x = \epsilon_y = 0$. The slope of the line tangent to the stress-strain curve at zero strain is found by evaluating the stiffness (Equations 4.44, 4.45, and 4.52) at $\theta = \theta_i = 60°$. Since direct substitution does not result in a finite value for the stiffness, the limit for $\theta \to \theta_i$ needs to be evaluated. In the case of constant mass, taking this limit results in the following values for the longitudinal, lateral and shear stiffnesses, respectively:

$$\lim_{\theta \to \theta_i} E_x = 3\zeta\left(\frac{mRT}{V_i} - p_a\right) \quad (4.53)$$

$$\lim_{\theta \to \theta_i} E_y = 3\zeta\left(\frac{mRT}{V_i} - p_a\right) \quad (4.54)$$

$$\lim_{\theta \to \theta_i} G_{xy} = \frac{3\zeta}{8}\left(\frac{mRT}{V_i} - p_a\right) \quad (4.55)$$

For the case of a constant pressure inside honeycomb pouches, these limits can be shown to evaluate to:

$$\lim_{\theta \to \theta_i} E_x = 3\zeta(p - p_a) \quad (4.56)$$

$$\lim_{\theta \to \theta_i} E_y = 3\zeta(p - p_a) \quad (4.57)$$

$$\lim_{\theta \to \theta_i} G_{xy} = \frac{3\zeta}{8}(p - p_a) \quad (4.58)$$

In the previous sections the ratio between pouch and honeycomb volume has been denoted with the constant $\zeta$. It can be shown that the assigned value of $\zeta=\sqrt{3}\pi/6$, is in reality a lower limit of this parameter and that its value increases when the honeycomb angle is altered. In addition, its maximum value is geometrically limited to one. Therefore, there is a possible 10% increase in this value. In this section the influence of a variable volume ratio is investigated by doing a sensitivity analysis on the stress and stiffness expressions.

The stiffness is linearly related to the first derivative of the stress to the honeycomb angle (see Equations 4.40, 4.45, and 4.52). The stress in the honeycomb is a function of the volume and consequently of the volume ratio, $\zeta$. To see how the stress is related to the volume ratio, consider Equations 4.36 through 4.39. Substituting for the constant mass:

$$m = \rho_i V_i \quad (4.59)$$

By substituting Equation 4.29 into the expressions in 4.36 through 4.39 and extracting the volume ratio, the following can be deduced:

$$\bar{\sigma} = \zeta \cdot \bar{f}(\theta, \gamma) \quad (4.60)$$

where $\bar{\sigma}$ is the stress vector and $\bar{f}(\theta,\gamma)$ is a vector containing the functions that relate stress to honeycomb and shear angles. The linear relationship between stress, $\bar{\sigma}$, and $\zeta$ is obvious from the above equation. To find the stiffness vector, the components of the stress vector are differentiated one-by-one with respect to their corresponding components in the strain vector:

$$\bar{E} = \frac{d\bar{\sigma}}{d\bar{\epsilon}} = \zeta \cdot \bar{g}(\theta, \gamma) \quad (4.61)$$

Where $\bar{g}$ is the vector that contains the functions that relate the stiffness to the honeycomb and shear angles. The linear relationship between the stiffness components and the volume ratio is still intact because the strain is independent of the volume ratio. Given the fact that the theoretical variation in $\zeta$ is +10% with respect to the baseline value of $\zeta=\sqrt{3}\pi/6$, the model under-predicts the stiffness by a maximum of 10%.

An alternative approach could include the volume ratio as a variable dependent on the honeycomb angle. This approach was not chosen because it makes the model more complicated without significantly increasing its accuracy.

The previous sections have introduced two models. The first one is a simple analytic model for the principal stiffnesses of honeycomb made from isotropic material. The second one is an analytic model of pressurized honeycomb under the assumption of rigid members that are hinged together. In this section it is proposed to fuse these two models into one single model under the assumption that the stiffness predicted by either model is independent of the other.

Figure 50:
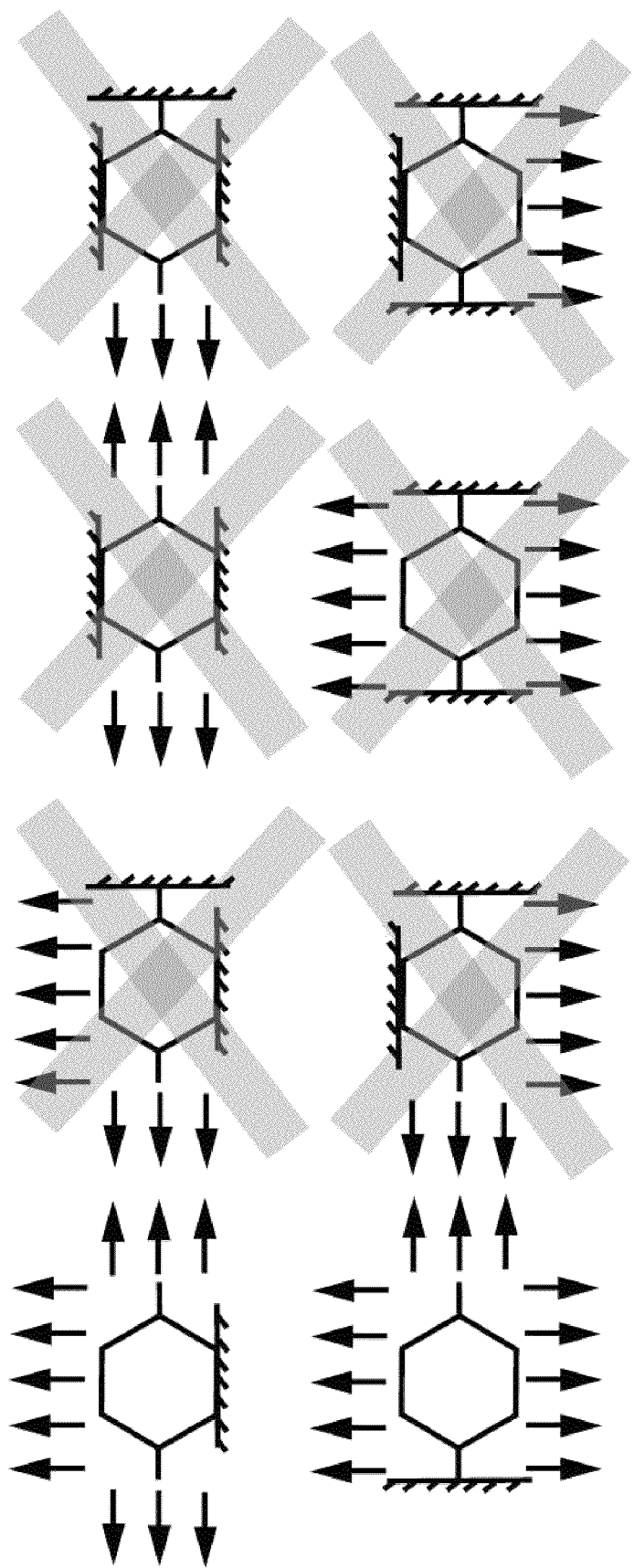
FIG. 50 Schematic Representations of the Boundary Conditions that Can/Cannot be in Place when using the Analytic Model for Pressurized Honeycomb FIG. 51 Schematic Representation of Honeycomb Deformation during Straining FIG. 52 Superimposing Pressure Stiffness to Structural Stiffness FIG. 53 External Spring to Restore Pressurized Honeycomb to Initial Position FIG. 54 Sketch of Honeycomb Deformation with Pressure Assuming Constant Mass FIG. 55 Strain-Altitude Relation for Prescribed Engagement Altitude and Constant External Loading FIG. 56 Maximum Deformations of Pressure-Adaptive Honeycomb FIG. 57 Maximum Stress-Strain for Various Adaptive Actuators (Data from Table 2.1)

Similar to the analytic model for honeycomb this present model is only applicable to honeycombs that are loaded in one principal direction and are free expand/contract in the direction perpendicular to this direction. FIG. 50 demonstrates schematically which boundary conditions can be in place when the honeycomb model is used and which boundary conditions cannot be used. Examination of the sketches in this figure shows that when too many boundary conditions are applied, the honeycomb becomes essentially fixed. In that case, the honeycomb members become loaded in pure tension/compression. The material stiffness (E) is then the dominant property when it comes to deformation, while the stiffness of the honeycomb ($E_x$, $E_y$) becomes negligible. In a real application of pressure-adaptive honeycomb this is not an appropriate way to constrain the honeycomb because it cannot be used as an actuator. In that sense, the proposed model can still be used for realistic applications.

FIG. 51 schematically shows how a honeycomb structure would contract and expand (depending on the loading condition) when two opposite sides of the honeycomb would be cantilevered. It is assumed that pressurized honeycomb shows the same global behavior as ordinary honeycomb, even though deformation stresses are much higher when pressure is applied to the pouches inside the honeycomb cells.

The boundary conditions have a profound effect on the cells neighboring the clamps. However, further away from the bounds their influence diminishes. In this area the structure is more-or-less free to expand or contract perpendicular to the loading direction. If it is assumed that the honeycomb cells far away from the boundaries can be modeled as being unconstrained in the direction opposite to the loading, the model presented in the this section can be used to predict the deformation as a function of the applied stress.

In addition to the unconstrained deformation of the honeycomb cells away from the boundaries, there is another feature of the pressurized honeycomb that is pointed out in FIG. 51. Longitudinal tension and lateral compression result in the same deformation of the cells and the contained pouches away from the boundaries. The same holds for longitudinal compression and lateral tension. In other words, the pressure stiffness introduced in these cells is identical in both cases.

Apart from the boundary conditions, the other assumptions that applied to the two original models also apply to the proposed model for pressure-adaptive honeycomb. This includes a strain range of about approximately +/−15%, the use of isotropic material, and a constant pouch-to-cell volume ratio.

When pressurized honeycomb deforms, the stress field is balanced by the overall strain times the overall stiffness. The stiffness is induced by the honeycomb material and the pressure inside the pouches. The stiffness induced by the honeycomb material has been presented in Eqs. 4.6, 45, and 4.20. The pressure induced stiffness has been presented in Eqs. 4.44, 4.45, and 4.52. To establish the stress-strain relationships, these principal and shear stiffnesses are added resulting in the following analytic model:

$$\sigma_x = [E_x(\epsilon_x, \theta_i) + E_x^*(t/l, E, \theta_i)]\epsilon_x \quad (4.62)$$

$$\sigma_y = [E_y(\epsilon_y, \theta_i) + E_y^*(t/l, E, \theta_i)]\epsilon_y \quad (4.63)$$

$$\tau_{xy} = [G_{xy}(\gamma_{xy}, \theta_i) + G_{xy}^*(t/l, E, \theta_i)]\gamma_{xy} \quad (4.64)$$

The proposed nonlinear Poisson's ratios are the same as for the rigid-wall honeycomb (Eqs. 4.42 and 4.43), where it is added here that $\theta = \theta(\epsilon_x)$ or $\theta = \theta(\epsilon_y)$. This yields:

$$\upsilon_{xy} = \upsilon_{xy}(\epsilon_x, \theta_i) \quad (4.65)$$

$$\upsilon_{yx} = \upsilon_{yx}(\epsilon_y, \theta_i) \quad (4.66)$$

Equations 4.62 through 4.66 together form the analytic model that predicts the stresses and geometry as a function of honeycomb angle, thickness-to-length ratio, material stiffness, and strain.

To simplify the stress-strain relations and Poisson ratios (Eq. 4.62-4.66) the linearization scheme can be applied. This linearization removes the dependency of the pressure stiffness ($E_x$, $E_y$, $G_{xy}$) on the overall strains, $\epsilon_x$, $\epsilon_y$ and $\gamma_{xy}$. A linear relationship between stress and strain consequently results and the stiffness becomes a constant dependent on the CDP and the honeycomb geometry, material, and dimensions. The stress-strain relations, accordingly degenerate to:

$$\sigma_x^{lin} = [E_x^{lin}(\theta_i) + E_x^*(t/l, E, \theta i)]\epsilon_x \quad (4.67)$$

$$\sigma_y^{lin} = [E_y^{lin}(\theta_i) + E_y^*(t/l, E, \theta i)]\epsilon_y \quad (4.68)$$

$$\tau_{xy}^{lin} = [G_{xy}^{lin}(\theta_i) + G_{xy}^*(t/l, E, \theta i)]\gamma_{xy} \quad (4.69)$$

The Poisson ratios are consequently only dependent on the honeycomb angle:

$$\upsilon_{xy} = \upsilon_{xy}(\theta_i) = \frac{\cos\theta_i(\cos\theta_i + 1)}{\sin^2\theta_i} \quad (4.70)$$

$$\upsilon_{yx} = \upsilon_{yx}(\theta_i) = \frac{\sin^2\theta_i}{\cos\theta_i(\cos\theta_i + 1)} \quad (4.71)$$

The values of $E_x^{lin}$, $E_y^{lin}$, and $G_{xy}^{lin}$ can be quite easily obtained by substituting the appropriate honeycomb angle, $\theta_i$, into Equations 4.44, 4.45, and 4.52, respectively. These equations are expanded in Appendix B and the resulting components can be easily assembled at the MATLAB level. An intuitive example of a linearized model of pressure adaptive honeycomb is given here for the case when $\theta = \theta_i = 60°$. In that case the Equations 4.53 through 4.58 can be inserted for $E_x^{lin}$, $E_y^{lin}$, and $G_{xy}^{lin}$. In the case of a constant mass in the cell, this results in the following explicit stress-strain relationship:

$$\sigma_{x,\theta_i=60°}^{lin} = \left[3\zeta\left(\frac{mRT}{V_i} - p_a\right) + \frac{4E}{\sqrt{3}}\left(\frac{t}{l}\right)^3\right]\epsilon_x \quad (4.72)$$

$$\sigma_{y,\theta_i=60°}^{lin} = \left[3\zeta\left(\frac{mRT}{V_i} - p_a\right) + \frac{4E}{\sqrt{3}}\left(\frac{t}{l}\right)^3\right]\epsilon_y \quad (4.73)$$

$$\tau_{xy,\theta_i=60°}^{lin} = \left[\frac{3\zeta}{8}\left(\frac{mRT}{V_i} - p_a\right) + \frac{12E}{5\sqrt{3}}\left(\frac{t}{l}\right)^3\right]\gamma_{xy} \quad (4.74)$$

In the case of a constant pressure in the cell, the linear stress-strain relationship degenerates to:

$$\sigma_{x,\theta_i=60°}^{lin} = \left[3\zeta(p - p_a) + \frac{4E}{\sqrt{3}}\left(\frac{t}{l}\right)^3\right]\epsilon_x \quad (4.75)$$

$$\sigma_{y,\theta_i=60°}^{lin} = \left[3\zeta(p - p_a) + \frac{4E}{\sqrt{3}}\left(\frac{t}{l}\right)^3\right]\epsilon_y \quad (4.76)$$

$$\tau_{xy,\theta_i=60°}^{lin} = \left[\frac{3\zeta}{8}(p - p_a) + \frac{12E}{5\sqrt{3}}\left(\frac{t}{l}\right)^3\right]\gamma_{xy} \quad (4.77)$$

This leads to the concept of equivalent stiffness, where the honeycomb material is artificially stiffened by the fact that there is a pressure acting on the ligaments. If the vector of combined linear stiffnesses is denoted with $\hat{E}$, then the following is implied:

$$\hat{E} = E^{lin}(\theta_i) + E^*(t/l, E, \theta_i) \quad (4.78)$$

This stiffness could be equated to the stiffness of honeycomb structure of identical geometry and dimensions but with no pressurized cells. In that case, the equivalent material stiffness, $E_{eq}$, can be extracted by using CMT. Equations 4.6, 4.11, and 4.20 can be inversed as follows to find the equivalent stiffness:

$$\frac{E_{eq}}{\hat{E}_x} = \left(\frac{l}{t}\right)^3 \frac{\sin^2\theta_i}{\cos\theta_i + 1} \quad (4.79)$$

$$\frac{E_{eq}}{\hat{E}_y} = \left(\frac{l}{t}\right)^3 \frac{(1 + \cos\theta_i)\cos^2\theta_i}{\sin\theta_i} \quad (4.80)$$

$$\frac{E_{eq}}{\hat{G}_{x,y}} = \frac{4}{5}\left(\frac{l}{t}\right)^3 \frac{\sin\theta_i}{1 + \cos\theta_i} \quad (4.81)$$

From these equations it can be observed that only one component of $\hat{E}$ known in order to calculate $E_{eq}$. The equivalent stiffness could potentially be used in a finite element model of a honeycomb grid. This would simplify the analysis considerably because external loading due to a CDP would already be implied in the material stiffness of the honeycomb.

The previous section introduced an analytic model for pressure-adaptive honeycomb. This section shows how this model can be employed if pressure-adaptive honeycomb is to be used as actuator. First the presence of a restoring force is discussed. While it is evident how to actuate pressure-adaptive honeycomb when the pressure can be controlled, it is less obvious how to do this when the pouches are sealed and only a fixed amount of air is present in them.

It is shown how to determine the amount of mass inside the pouches, such that t start actuating once a pre-determined atmospheric pressure is reached. This section do with an example of altitude adaptive honeycomb.

The application of pressurized honeycomb for actuation purposes can be various. Like vortex generators or Gurney flaps, could be deployed, or larger sectional variations in wing or flap geometry could be induced. Independent of the application, though, there are two basic means of providing pressure to the honeycomb pouches. The first option relies on bleed air from the engine compressor in combination with a system of hoses, pipes, and valves. This could yield very high pressures in the pouches, while there would essentially be no mass flow, implying no pressure loss. The second option employs a sealed pouch that holds a fixed amount of air and relies on the change in ambient pressure to create a pressure differential. This last option would be particularly advantageous to high-subsonic aircraft that encounter a 60 kPa pressure difference between take-off and cruise altitude. This system would require no control mechanism, hoses or valves. The stiffness of the structure would adapt to its surroundings and would therefore make this an entirely new type of adaptive structure.

Using either principle, the pressurized honeycomb is not per definition an actuator. One can imagine starting with a honeycomb that, at zero CDP, consists of perfect hexagons. Increasing the CDP leads to a stiffening of the honeycomb, but no deformation takes place. In other words, no mechanical work is performed. This illustrates that if the pressurized honeycomb needs to act as an adaptive actuator, it requires some kind of force that induces a deformation in the honeycomb when no CDP exists. This restoring force can come from elastic forces residing within the honeycomb structure. For any initial honeycomb angle, other than $\theta_i=60$, these elastic forces exist and can be used to restore the structure to an initial shape.

Figure 52:
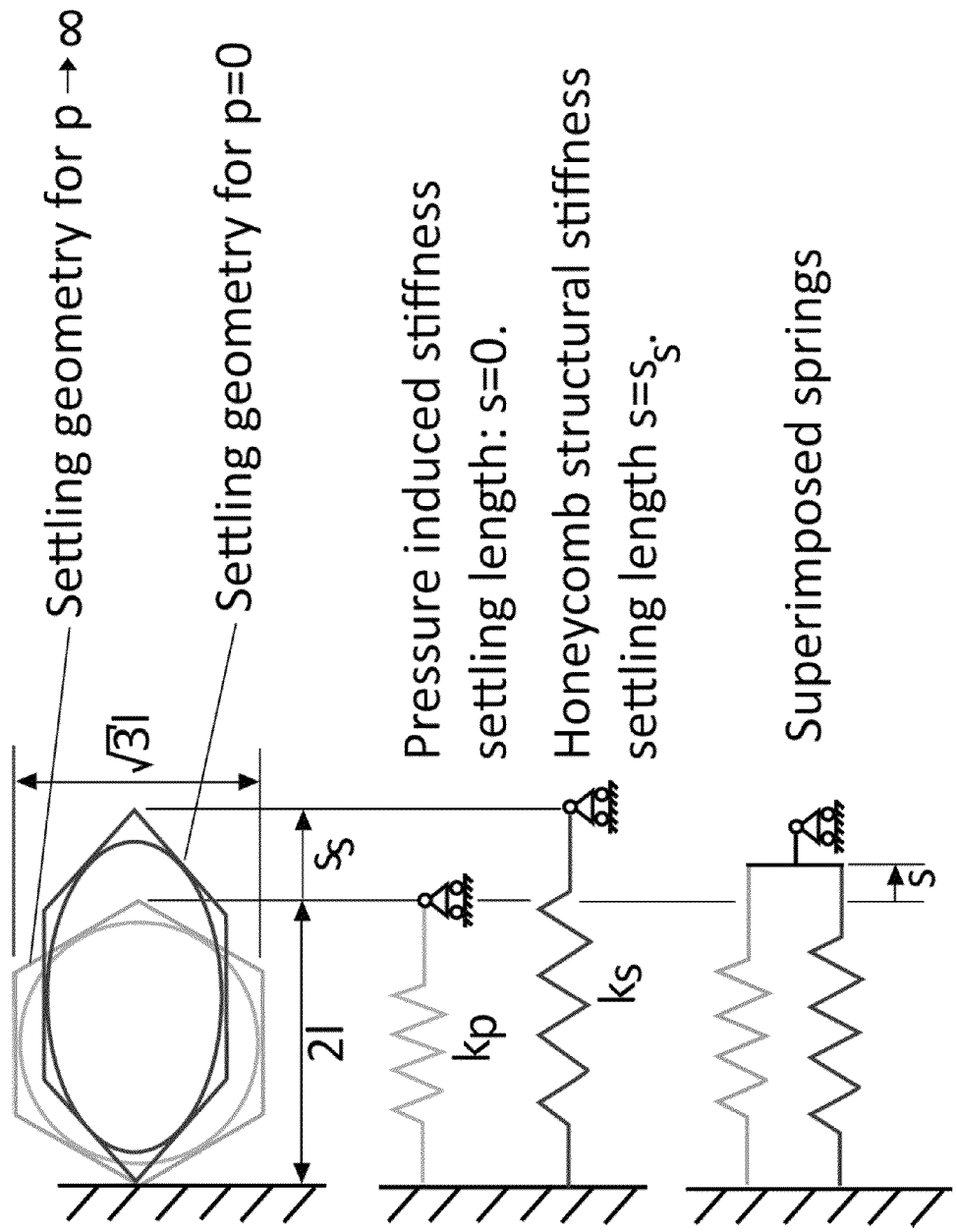

Schematically, the superposition of the pressurized honeycomb and the elastic honeycomb is presented in FIG. 52. The stiffness induced by the CDP is represented as a spring with a settling length of 2l. The stiffness induced by the elasticity of the honeycomb is represented by a spring of stiffness $k_s$ and has a settling length of $2l+s_s$. Since the pouches are physically in the honeycomb structure, the end point of both springs is identical. The settling length of the superimposed springs lies therefore between those of the individual springs: $0<s<s_s$. The elastic stiffness is constant, meaning that the changing pressure stiffness (due do a change in CDP) directly influences the settling length of the superimposed springs. When the CDP approaches infinity the settling length equals 2l, while when the CDP is zero, the settling length equals $2l+s_s$.

In addition to the elastic forces that are present in honeycomb, external (elastic) forces can be applied to assist in bringing back the structure to its original shape. FIG. 53 schematically shows such an external restoring force to the pressurized honeycomb. Physically, such a force could arise from elastic components of the structure that surround the honeycomb. When no CDP existed, the curved sheet assumed its original shape. However, when the CDP was increased and the stiffness of the pressurized honeycomb increased with it, the sheet assumed a much straighter shape.

Note that the settling position of the system of springs and external force does not coincide with the settling position of the spring that represents the honeycomb material stiffness. Moreover, it is beneficial if an external force would pull the honeycomb spring beyond its settling length and into tension. The reason for this lies in the fact that, for a given strain, the maximum absolute curvature that is introduced in the diagonal honeycomb walls decreases when the wall is forced to bend in both directions. Therefore, it is less likely that any plastic deformation is encountered during the bending of these walls. An example of such a structure could consist of a honeycomb cells with a wall angle of $\theta_i=75°$ and an external spring that would force the cells to bend to $\theta=90°$ when no CDP is exists. Now, increasing the CDP would yield a structure for which $\theta \rightarrow 60°$. In other words, a 30° range of honeycomb angles would be achieved while the honeycomb wall would only see a maximum change of 15°.

When an external pressure source is used to regulate the CDP in the pressurized honeycomb, the stiffness can be controlled quite easily. However, when the more adaptive variant is used, where a constant mass is present in the pouches, controlling the stiffness can only be done by ascending or descending of the aircraft. As was briefly shown in FIG. 34, one thing that can be controlled is the altitude at which the stiffening starts. This altitude is referred to as the 'engagement altitude' and can be anywhere between the take-off and cruise altitude. In general, however, it would be wise to set this altitude to where the aircraft can serve for example 95% of all major worldwide airports with the adaptive honeycomb structure fully deployed. In the next paragraphs it is shown that a trade-off needs to be made between the elevation of the engagement altitude and the amount of mass that is available in the pouches. Remembering that the mass in the pouches has a positive correlation with the pressure stiffness it is generally desired to optimize the amount of mass inside the pouches.

When a particular pressure engagement altitude (ea) is desired the mass inside the pouch is:

$$m < \rho_0 V_{ea} \quad (4.82)$$

Figure 54:
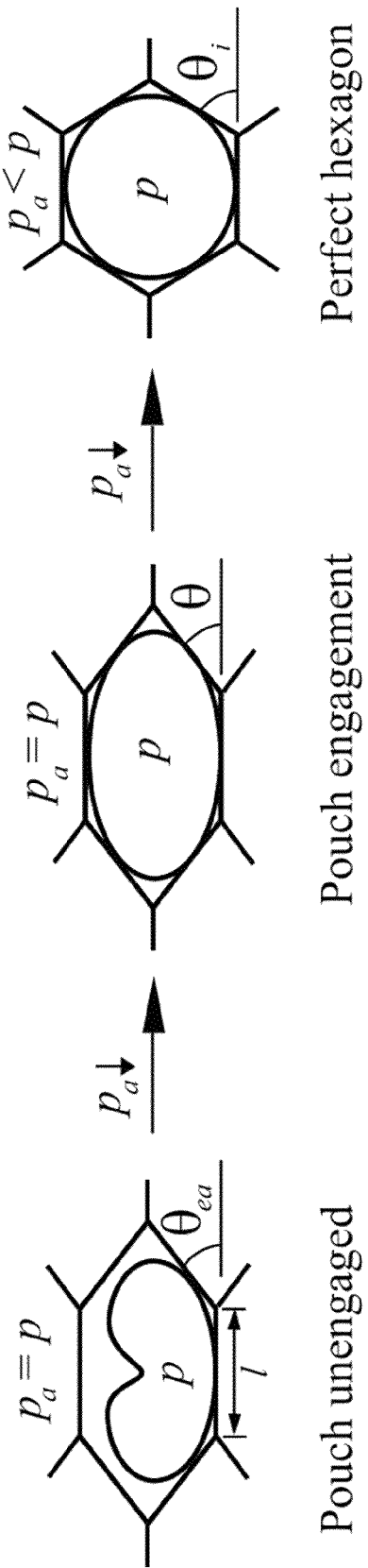

This results in a partly inflated pouch with a fixed amount of air at a pressure, p (see FIG. 54). Decreasing the ambient pressure results in an expansion of the gas inside the pouch (Equation 4.22) until the perimeter pulls taut. When the ambient pressure decreases further, the pouch tries to form a perfect circle, such as to minimize its circumferential strain energy. By doing so it forces the strained honeycomb cell into a perfect hexagon. The ambient at which the pouch pulls taut and starts to do work on the structure is termed the engagement pressure. It corresponds to a unique altitude in the international standard atmosphere.

To find the engagement altitude, a honeycomb cell is considered with a honeycomb angle of $\theta_{ea} \neq 60°$. At this angle, Equation 4.29 can be employed to find the volume, $V_{ea}$, at which engagement occurs. In that case Equation 2.6 can be equated to Equation 4.22 and the altitude at which engagement occurs can be extracted. Conversely, if an altitude of engagement is desired it is possible to determine the mass of trapped air that is required to have this happen. If the pouch is filled at sea level the mass of air that is put in can be correlated to the zero-altitude volume, $V_o$, according to:

$$m = \rho_0 V_0 \quad (4.83)$$

Combining these equations and noting that the temperature and pressure in the pouch with pressure height according to Equation 2.5 and 2.6, respectively, the following deduced:

$$V_0 = V_{ea}\left(1 + c\frac{h}{T_0}\right)^{-\left(\frac{g_0}{cR}+1\right)} \quad (4.84)$$

where $V_{ea}$ is the volume at which engagement occurs and is a function of the geometry of the hexagon only (Equation 4.29).

By using Equation 4.84 the zero-altitude pouch volume can be found as a function of the engagement altitude, h. This is an important parameter because it is required when the sealed pouches are manufactured.

All the tools to analyze the pressure-adaptive honeycomb have been presented in the preceding sections. In this section an example is presented of how all this theory can be applied to make a simple pressure-adaptive actuator that is controlled by aircraft altitude. In this example, no physical boundary conditions are enforced and all the assumptions mentioned in the preceding sections apply.

Consider an aluminum honeycomb grid with a characteristic cell wall length of l=5 mm, a wall thickness of t=25 μm, and an initial honeycomb angle of $\theta_s=75°$. Assume the engagement altitude needs to be h=3 km and that the honeycomb angle beneath this position needs to be $\theta_{ea}=90°$. This way, a maximum strain of $\epsilon_x=33\%$ can be achieved in longitudinal direction when the CDP approaches infinity. The longitudinal stiffness, $E_x^*$, introduced by the material properties of the honeycomb structure can be calculated using Equation 4.6. When no CDP exists, an external stress in the longitudinal direction forces the honeycomb to assume a shape where $\theta_{ea}=90°$. This stress can be calculated according to:

$$\sigma_x = -E_x^* \frac{\cos\theta_s - \cos\theta_{ea}}{1+\cos\theta_s}$$

If the linearized stress-strain relations are used, the pressure-induced stiffness can be easily calculated over the entire range of ambient pressures by employing Equations 4.53 and 2.6. If this stiffness is denoted with $E_x^m$, and the reference honeycomb angle $\theta_i=60°$, the honeycomb angle at which all stressed are balanced can now be calculated according to:

$$\theta = \cos^{-1}\left[\frac{(1+\cos\theta_s)(1+\cos\theta_i)}{E_x^*(1+\cos\theta_i)+E_x^m(1+\cos\theta_s)}\left(-\sigma_x + E_x^* \frac{\cos\theta_s}{1+\cos\theta_s} + E_x^m \frac{\cos\theta_i}{1+\cos\theta_i}\right)\right]$$

The strain with respect to the perfect hexagonal shape of the honeycomb can be found subsequently:

$$\epsilon_x = \frac{\cos\theta - \cos\theta_i}{\cos\theta_i}$$

The result is a closed-form relationship between altitude, h, and longitudinal strain $\epsilon_x$. This relationship is shown in FIG. 55.

Figure 55:
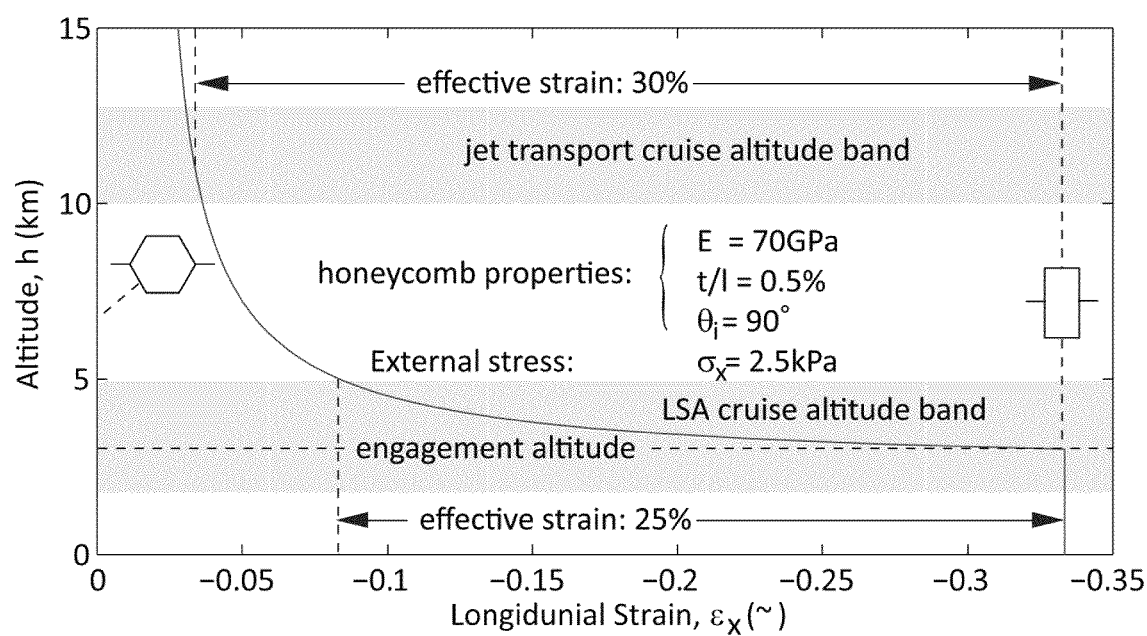

From FIG. 55 it can be seen that a highly non-linear relationship exists between strain and altitude. As long as the aircraft stays beneath the 3 km engagement altitude, the honeycomb stays in its deployed state $\theta_{ea}=90°$. Above this altitude the element starts to deform towards the perfect hexagon state. A 30% strain difference exists between the honeycomb at engagement altitude and the cruise altitude of jet transports. If measured in the frame of reference of the initial shape, the strain even amounts to 45%.

For light sport aircraft that cruise close to 5 km, the ambient-induced strain amounts to 25%, which is less than for the transport aircraft but still significant. Given the fact that this example uses an engagement altitude of 3 km, the cruise altitude and engagement altitude are quite close. However, it might be more convenient to lower the engagement altitude for LSA aircraft to for example 2 km. This would imply that the aircraft would encounter a larger pressure gradient upon engagement which would induce a larger strain.

The state-of-the-art adaptive materials were compared based on their mechanical properties. In this section it is explored how pressure-adaptive honeycomb compares to those materials in terms of energy density, specific energy density, and coupling efficiency. The distinction is made between atmospherically-triggered pressure-adaptive honeycomb and high-pressure-adaptive honeycomb. For both cases a typical honeycomb structure is assumed that is detailed in the subsequent paragraphs. The mechanical properties of the honeycomb are based on the honeycomb model that was presented. The dimensional and material characteristics are based on the envisioned feasible manufacturing procedures and the experience of the author in producing honeycomb test articles.

The exemplary honeycomb that is considered for this experiment has the following characteristics:
Material: Aluminum, density: $\rho=2700$ kg/m3
Characteristic face length: l=10 mm
Characteristic face thickness: t=75 μm Using these characteristics, the density of the material is calculated according to Eq. 4.1, assuming a 20% addition of mass due to adhesives and pouches and a reference honeycomb angle of 60°. This results in a structural density of approximately 25 kg/m3.

Figure 56:
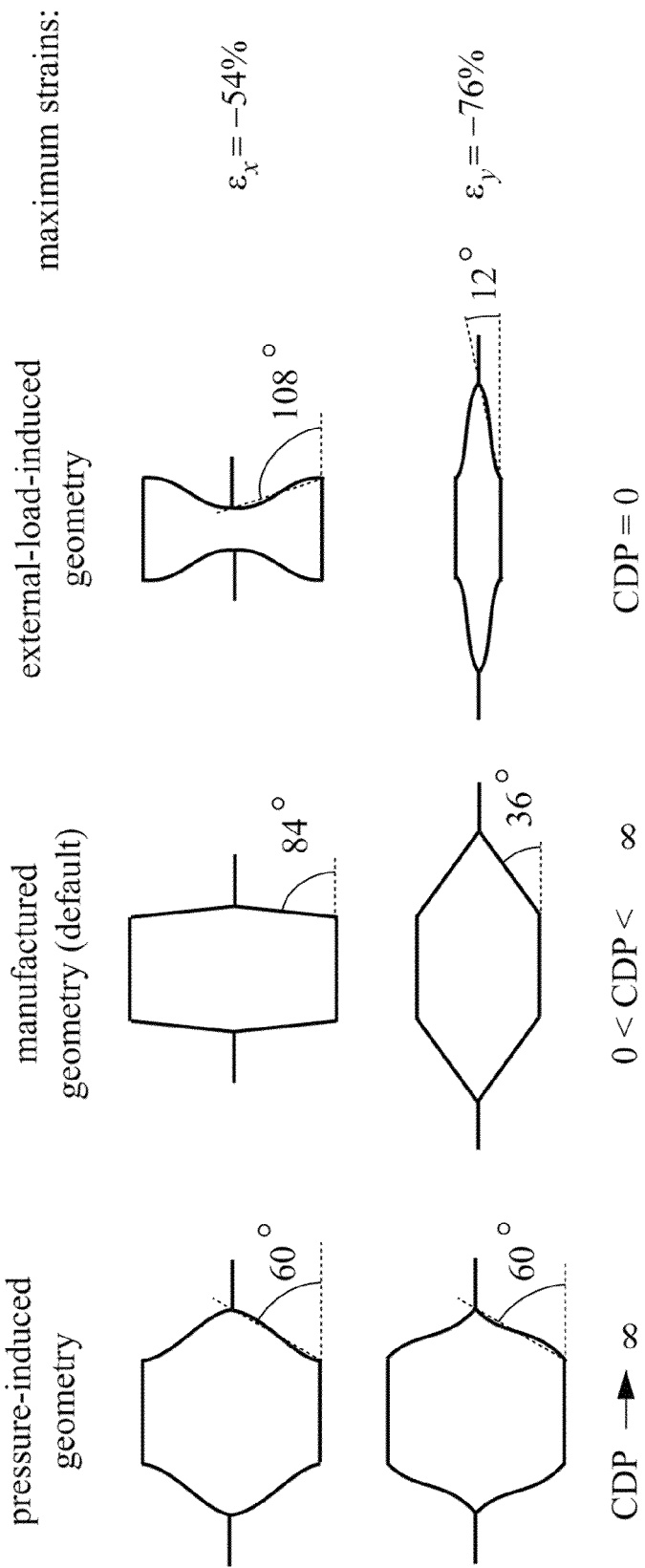

The maximum strain that the honeycomb can utilize is another parameter that needs to be set before the specific work can be calculated. In this paragraph these maxima are derived. Cellular material theory holds for strains up to ±20% in any direction. Given a hexagonal honeycomb cell, 20% strain induces the largest change in average honeycomb angle when it is directed outwards (tension) in the ڀ-direction. The resulting change in honeycomb angle amounts to 24°. This implies that a change in average honeycomb angle of 24° does not induce any plastic deformation in the faces of the honeycomb cells. This allows the designer to choose a minimum honeycomb angle that is two times 24° away from the default angle of 60°, with the unstrained geometry exactly in between those two angles. This yields two possibilities. The first possibility relies on a honeycomb that has a default honeycomb angle of 60−24=46° and an external load that induces elastic equilibrium at 60−2·24=12°. This results in a maximum horizontal strain of $\epsilon_x=32\%$ and $\epsilon_y=-76\%$. The other option uses a honeycomb grid that exhibits a default honeycomb angle of 60+24=84° and an external load that induces elastic equilibrium at 60+2·24=108°. This option results in a maximum horizontal strain of $\epsilon_x=-54\%$ and maximum vertical strain of $\epsilon_y=15\%$. The extreme geometry changes are schematically shown in FIG. 56.

With these maximum values of strains it is possible to make an estimate of the amount of mechanical work that can be performed by each of them. To that extent, first the distinction is made between the atmospherically-triggered and the high-pressure-adaptive honeycomb. For the first one an atmospheric induced pressure differential of 40 KPa, is assumed to be a realistic upper bound. Knowing that mechanical work per unit volume can be calculated according to $$\int_0^{\epsilon_{max}} \sigma\, d\epsilon,$$

the maximum work density is x-direction amounts to $E_v=16$ mJ/cm$^3$, while the maximum work in y-direction totals $E_v=27$ mJ/cm³. Dividing those numbers by the structural density of the pressure-adaptive honeycomb results in a specific energy density of $E_m$=0.64 J/g in x-direction and approximately $E_m$=1.1 J/g in y-direction.

For the high-pressure-adaptive honeycomb, an upper bound for the cell differential pressure is provided by the maximum pressure that can be generated on the aircraft. It was shown that turbomachinery on contemporary gas turbines can generate cell differential pressures on the order of 0.9 MPa. Combining this with the previously quoted maximum strains in x- and y-direction, this results in a specific energy density ($E_m$) of 8.8 J/g and 12 J/g in the respective directions.

Figure 57:
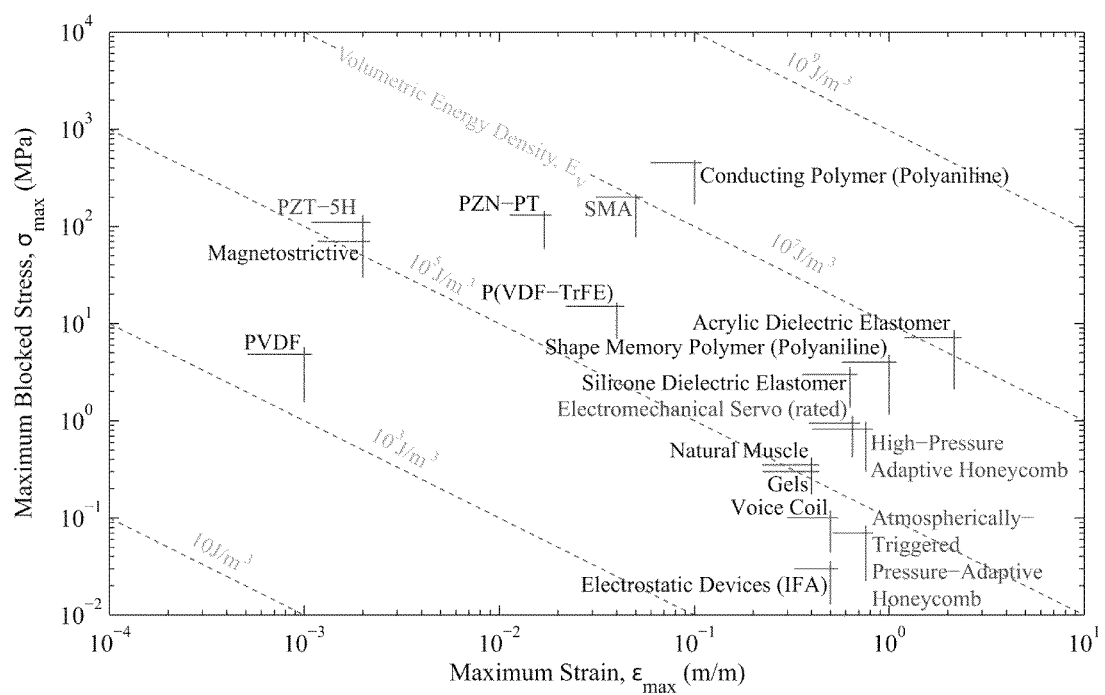

FIG. 57 demonstrates how the atmospherically-triggered and high-pressure-adaptive honeycombs compare to other adaptive actuators in terms of maximum stress and strain. On the diagonals the energy density of each of the actuator is measured. In addition to the adaptive materials, a high-performance electromechanical servo is also charted. This servo is FAA-approved and designed for aerospace applications. It has a low bandwidth (0.04 Hz) and could be used in similar applications as the pressure-adaptive honeycomb (e.g. actuating high-lift devices). It can be seen that the high-pressure-adaptive honeycomb has virtually the same energy density as the electromechanical servo. Furthermore, it can be seen that the pressure-adaptive honeycomb exhibits a relatively large maximum strain being third behind the acrylic artificial muscle and the shape memory polymer.

Figure 58:
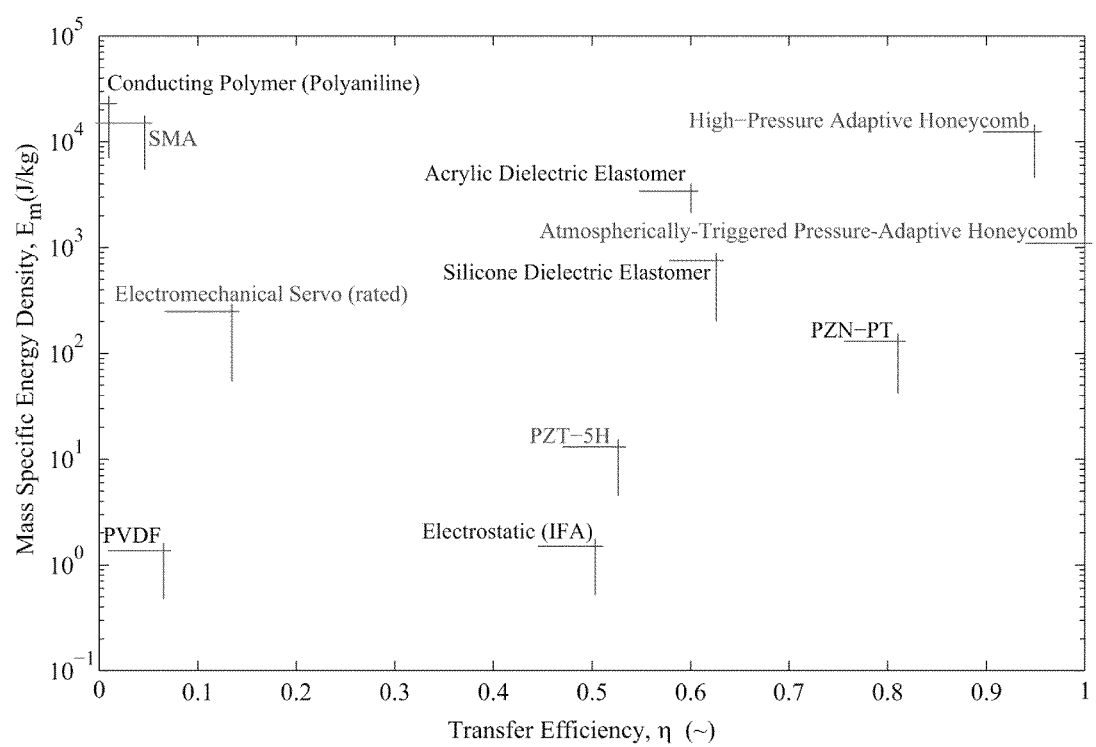
FIG. 58 Transfer Efficiency versus Specific Energy Density for Various Adaptive Actuators (Data from Table 2.1)

The final characteristic of interest when comparing the present adaptive honeycomb to other aerospace structures is the coupling efficiency, $K^2$, which relates the mechanical work output to the energy put into the actuator. For the atmospherically-triggered pressure-adaptive honeycomb this parameter must equal 1 because there is no net energy extracted from the aircraft. For the high-pressure-adaptive honeycomb the coupling efficiency can only be determined once the system is integrated into a deforming wing structure. However, it is expected that losses in energy are low. A possible cause for energy dissipation could lie in pressure losses in the tubing to the pouches. Because those losses are expected to be minor, the coupling efficiency is estimated to be larger than 95%. FIG. 58 charts the coupling efficiency and the specific energy density of various adaptive actuators.

From FIG. 58 it can be seen that pressure-adaptive honeycomb has quite good characteristics compared to the alternative adaptive materials. Its coupling efficiency is the highest of all actuators and the high-pressure-adaptive honeycomb rivals SMA in specific energy density. Notice also, that both the atmospherically-triggered and the high-pressure-adaptive honeycomb have a higher specific energy density than the electromechanical servo. The relatively low density of pressure-adaptive honeycomb compared to the adaptive materials result in relatively high energy value per unit mass, while the energy value per unit volume (as shown in FIG. 57) is comparatively low. For aircraft applications this translates to having a high volume requirement to store the actuator, but a very low weight penalty.

The present comparison between adaptive materials and the pressure-adaptive honeycomb is purely based on exemplary values from the literature and the model presented. Even though it is limited, it gives a good indication of the abilities of pressure-adaptive honeycomb. The present analysis has shown that this can be a viable alternative to other adaptive materials. In conclusion, TABLE 4.1 sums up the properties of pressureadaptive honeycomb, similar to how other adaptive materials were compared in TABLE 2.1. Also see TABLE 4.2.

To model the pressurized honeycomb, a model was used that relied on a finite element (FE) approach. The following sections describe the two separate FE models and explain the physics and mathematics behind them. The software that was used to carry out both of the FE tasks is called FINNESSE. FINNESSE has been developed by Dr. Karan Surana at the Mechanical Engineering Department of The University of Kansas. The proceeding sections present the solid mechanics theory utilized in FINNESSE.

In the current problem a homogeneous material is modeled and the elastostatic behavior is simulated. It is assumed that the material is linearly elastic and isotropic.

Figure 59:
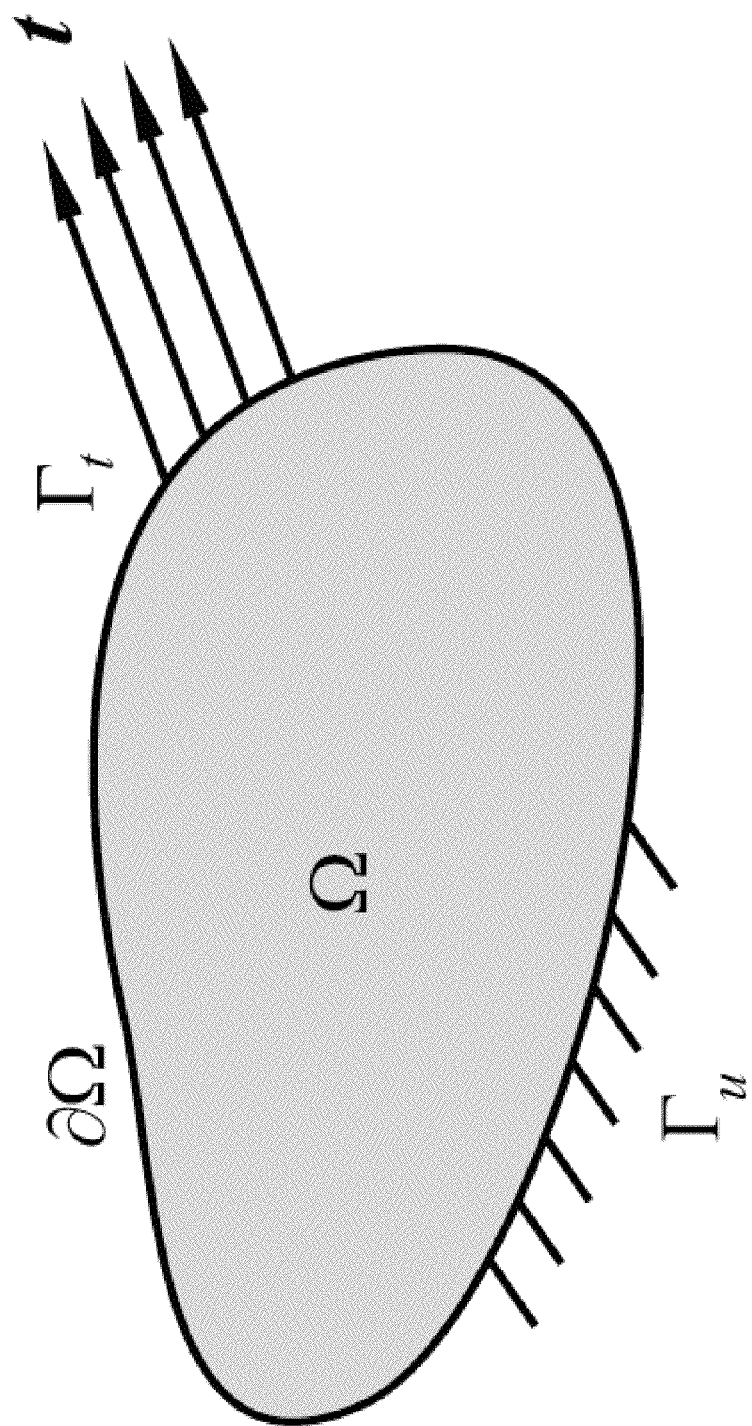
FIG. 59 The Model Problem and Variational Formulation

Consider the domain $\Omega$ in FIG. 59 which contains a linearly elastic solid material. It has boundary $\partial\Omega$ that contains the portions of the boundary, $\Gamma_u$ and $\Gamma_t$, on which displacements and tractions are specified, respectively. The body is subjected to a distributed body force, f, and surface tractions, t.

The displacement vector field within this body are denoted u and it spatial gradient is conveniently denoted $\nabla u$. The divergence of a vector or tensor, x, is denoted $\nabla \cdot x$. The Cauchy stress tensor, $\sigma$, can then be written as a function of the fourth order elasticity tensor, $E=E(x)$, and the strain tensor, $\epsilon$:

$$\sigma = E\epsilon \quad (4.85)$$

The coefficients in the elasticity tensor satisfy the following symmetry conditions:

$$E_{ijkl}(x)=E_{jikl}(x)=E_{ijlk}(x)=E_{klij}(x) \quad (4.86)$$

It is assumed that the displacements are small and therefore the strain-displacement relationships are linear:

$$\varepsilon = \frac{1}{2}(\nabla u + (\nabla u)^T) \quad (4.87)$$

This results in the linear elastostatics problem that can be formulated as a boundary value problem as follows (see Ref. 134):

Find u such that $$-\nabla \cdot (E\nabla u) = f, \text{ in } \Omega$$

$$E\nabla u \cdot n = t, \text{ on } \Gamma_t \quad (4.88)$$

$$u=0, \text{ on } \Gamma_u$$

Equation 4.88 can generally not be solved analytically. Therefore, a finite element analysis (FEA) is used where Eq. 4.88 is solved numerically. Because the differential operator in Eq. 4.88, is self-adjoint and variationally consistent, formulation is possible using the Galerkin method with Weak Form. The space of test functions is defined as:

$$V = \left\{ v : \int_\Omega E\nabla u : \nabla v \, dx < \infty, v_{\Gamma_u} = 0 \right\} \quad (4.89)$$

Multiplying both sides of Eq. 4.88 with a test function v and integrating using Green's identity results in the variational form:

Find u such that $$B(u,v)=F(v) \forall v \in V \quad (4.90)$$

where, $$B(u, v) = \int_\Omega E\nabla u : \nabla v \, dx \quad (4.91)$$

$$F(v) = \int_\Omega f \cdot v \, dx + \int_{\Gamma_t} t \cdot v \, ds \quad (4.92)$$

In the finite element representation an approximate solution $u^h$ and an assumed test function $v^h$ are considered. This results in the following approximation: I $$B(u^h, v^h) = F(v^h) \forall v^h \in V \quad (4.93)$$

The approximated solution and test function are expressed in a series as follows:

$$u^h(x) = \sum_{j=1}^{N} u_j^h \psi_j(x) \quad (4.94)$$

$$v^h(x) = \sum_{i=1}^{N} v_j^h \psi_i(x) \quad (4.95)$$

where $\psi_i$ is a basis function. Substitution in Eq. 4.93 results in the following:

$$\overline{B}\left(\sum_{j=1}^{N} u_j^h \psi_j, \sum_{i=1}^{N} v_i^h \psi_i\right) = F\left(\sum_{i=1}^{N} v_i^h \psi_i\right) \forall v_i^h \in V \quad (4.96)$$

Rewriting this yields:

$$\sum_{j=1}^{N} \sum_{i=1}^{N} B(u_j^h \psi_j, v_i^h \psi_i) = \sum_{i=1}^{N} F(v_i^h \psi_i) \forall v_i^h \in V \quad (4.97)$$

This can be rewritten as:

$$\sum_{i=1}^{N} v_i^h \left\{ \sum_{j=1}^{N} B(\psi_j, \psi_i) u_j^h - F(\psi_i) \right\} = 0 \ \forall v_i^h \in V \quad (4.98)$$

If it is considered that $v_i^h \neq 0 \forall v_i^h \in V$ the following relation is obtained:

$$\sum_{j=1}^{N} B(\psi_j, \psi_i) u_j^h = F(\psi_i) \text{ for } i = 1, \ldots, N \quad (4.99)$$

In matrix form this results in the following matrix equation:

$$\overline{B} u^h = \overline{F} \quad (4.100)$$

This can be expanded according to:

$$\begin{bmatrix} B_{11} & \cdots & B_{1N} \\ \vdots & \ddots & \vdots \\ B_{N1} & \cdots & B_{NN} \end{bmatrix} \begin{Bmatrix} u_1^h \\ \vdots \\ u_N^h \end{Bmatrix} = \begin{Bmatrix} F_1 \\ \vdots \\ F_N \end{Bmatrix} \quad (4.101)$$

Accordingly, each element in matrix $\overline{B}$ and vector F can be represented as follows:

$$B_{ij} = B(\psi_i, \psi_j) \quad (4.102)$$

$$F_i = F(\psi_i) \quad (4.103)$$

This system of linear equations is solved using FINNESSE.

Figure 60:
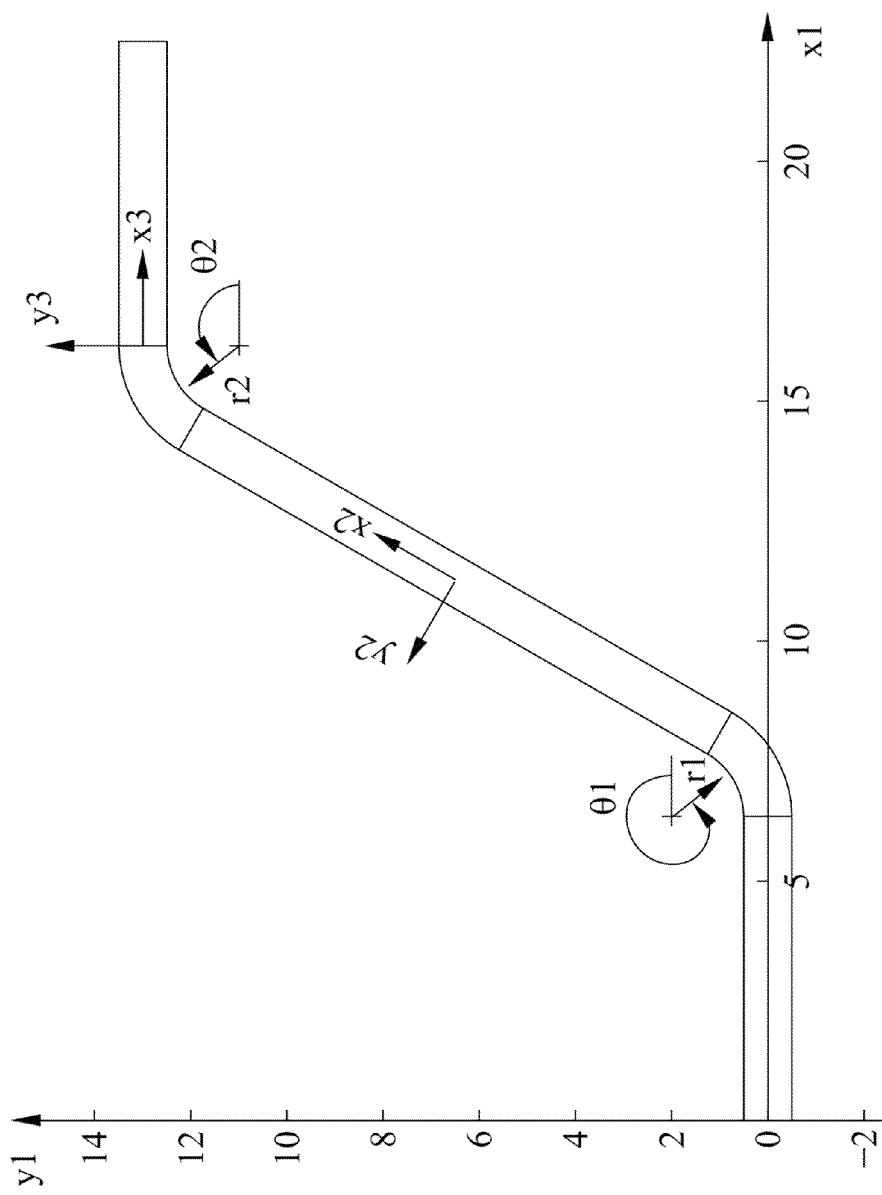
FIG. 60 Definition of individual element sets and their local coordinate systems FIG. 61 Birds-Eye View of Mesh for Rectangular honeycomb for Nx=14, Ny=21
Figure 61:
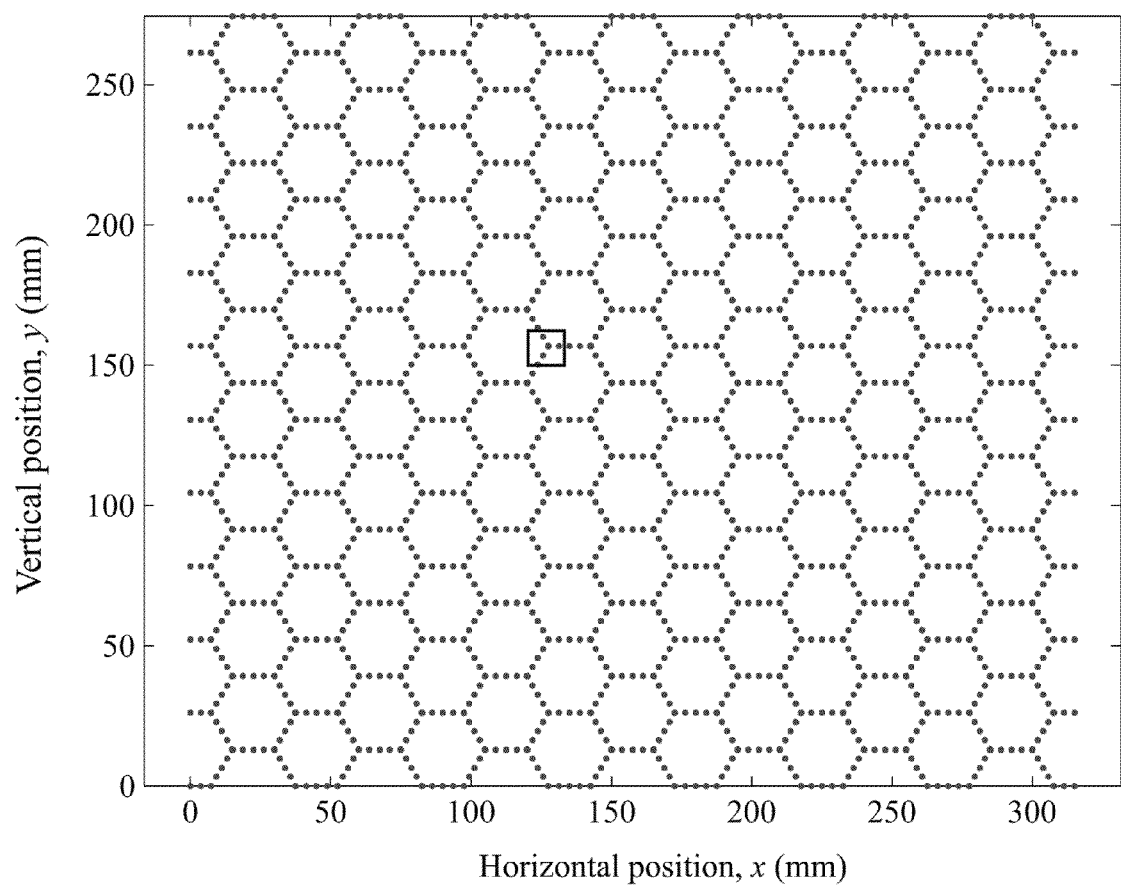

The repeating element in the honeycomb was previously identified as a z-element (see FIGS. 41A and 41B). This z-element forms the basis of the FE model discussed in this section. Previously the z-element was defined with sharp corners. In the finite-element model this would result in discontinuities in the solution. In accordance with a realistic metal fold, the corners were therefore modeled as an arc section between the individual faces of the honeycomb. As is shown in FIG. 60, the z-element could be divided in 5 individual element sets. To define a mesh over the z-element each element set had its own coordinate system as shown in FIG. 60. The arc sections that connected the individual faces of the honeycomb were conveniently defined in a circular coordinate system while the other elements were defined in Cartesian coordinates.

A Matlab code was developed that could write an input file for FINESSE with appropriate node distribution, boundary conditions and pressure loading. It used the following input parameters from the user:

$N_x$, the number of z-sections in x-direction
$N_y$, the number of z-sections in y-direction
$\theta_i$, the honeycomb angle
N, half the number of elements in a ligament
M, the number of through-the-thickness elements
L, the number of elements in the corner Based on these parameters the code generated the element numbering, node numbering and nodal coordinates. The elements that were used were quadrics and each element consisted of 9 nodes, 8 at the boundaries and one in the center. Furthermore, the polynomials that were used to describe the displacement within each element were of the sixth degree and a first order continuity was prescribed between the polynomials at the interfaces of the elements, such that strains varied linearly over the element boundaries.

In accordance with the experiments that were carried out, three sets of numerical simulations were conducted: lateral compression (up to 15% compressive strain in y-direction), longitudinal tension (up to 4% strain in x-direction), and longitudinal compression (up to 12% compressive strain in x-direction). In agreement with the test setup, the simulated test article was free to expand and contract in the direction perpendicular to the principal loading direction. This meant that two boundaries were prescribed (either top and bottom or left and right, depending on the test).

Figure 62:
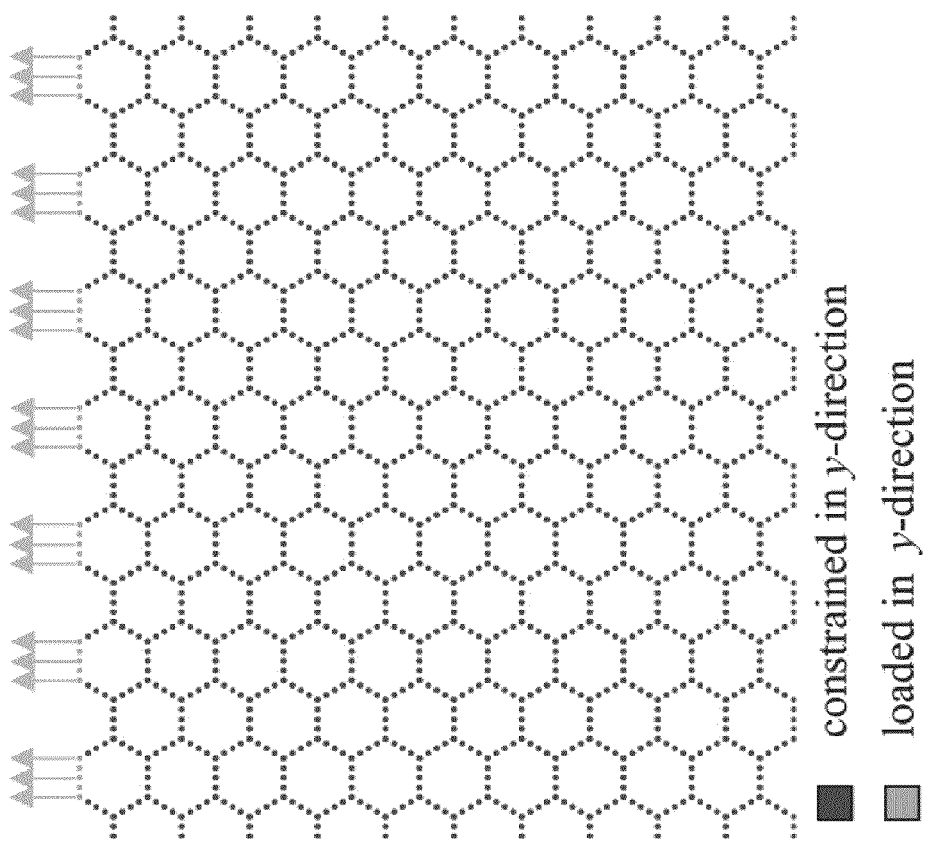
FIG. 62 Constrains for Lateral Loading

In FIG. 62 the constraints for loading in the y-direction are schematically presented. The nodes that bordered the boundary were constrained in the y-direction: v=0. To restrict rigid-body motion (and hence introduce a singularity) one single node was constrained in the both x and y-direction. In addition, the distributed loads on the top horizontal faces of the honeycomb are also shown in FIG. 62. The value of the distributed load was calculated by dividing the load that was introduced during the experiment by the total area of the top honeycomb faces.

Figure 63:
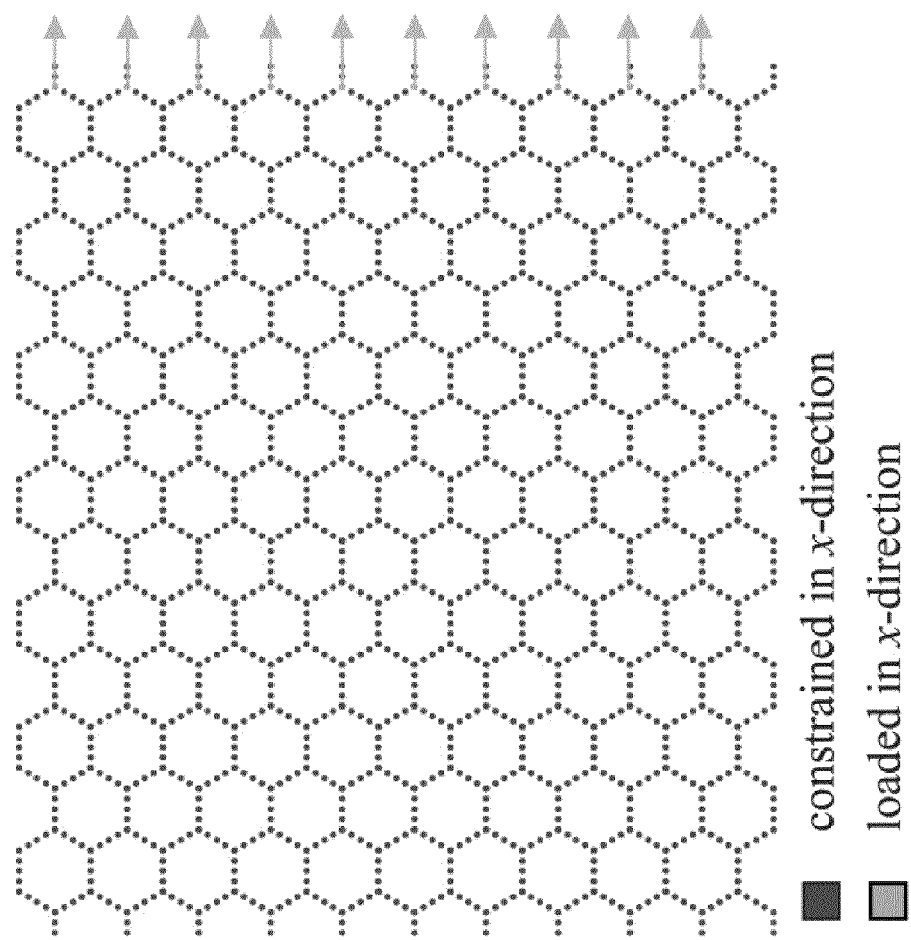
FIG. 63 Constraints for Longitudinal Loading

FIG. 63 schematically demonstrates the constrained nodes in the case of longitudinal loading (in the x-direction). In order to prevent buckling of the left extreme ligaments under compressive loading, it is shown that the faces of the members were stiffened by using 3 mm thick aluminum angle. It is assumed here that the compressive force on the aluminum angle was transferred to the honeycomb by means of pure shear loading. The nodes of the elements that bordered the angle on the left-hand side were therefore all contained in the x-direction. This prevented buckling of these ligaments when compressive loading was applied. For the same reason, the external loading was applied at the intersection of diagonal ligaments at the right hand side. As can be seen from FIG. 63, the force is not applied at the outer most element faces but rather at the left face of the last horizontal ligament.

During the experiments, pressure was applied to pouches that resided in each of the honeycomb cells. The pouches were not attached to the honeycomb in any way but stayed in place due to friction between the cell face and the pouch wall. However, a separate pouch in each of the cells was not included in the FE model due to the higher level of complexity this would imply. Instead, the pressure was applied directly to the cell walls, as if there were no pouches. Early FE runs demonstrated that applying pressure to the interior cell walls did not change the overall stiffness of the honeycomb structure as it had done during experiments. Therefore, the model was adjusted such that the material stiffness was artificially altered as a function of the pressure. The equivalent stiffness based on the analytic model could be used to specify the new material stiffness of the honeycomb. Alternatively, the equivalent stiffness could be determined from baseline experiments. Either method ultimately resulted in a homogenized model of pressure adaptive honeycomb.

A simple investigation was carried out to see the result of having more elements within the ligaments and in the corners on the deformation geometry of a simple z-section. The input parameters to create the mesh for a single z-element were:

$\theta_l$, the honeycomb angle
N, half the number of elements in a ligament
M, the number of through-the-thickness elements
L, the number of elements in the corner The thickness-to-length ratio of the honeycomb ligaments was assumed to be very small for the envisioned applications. For a minimum number of elements in a single z-section, this resulted in elements which had a large aspect ratio (close to l/2t).

Figure 64:
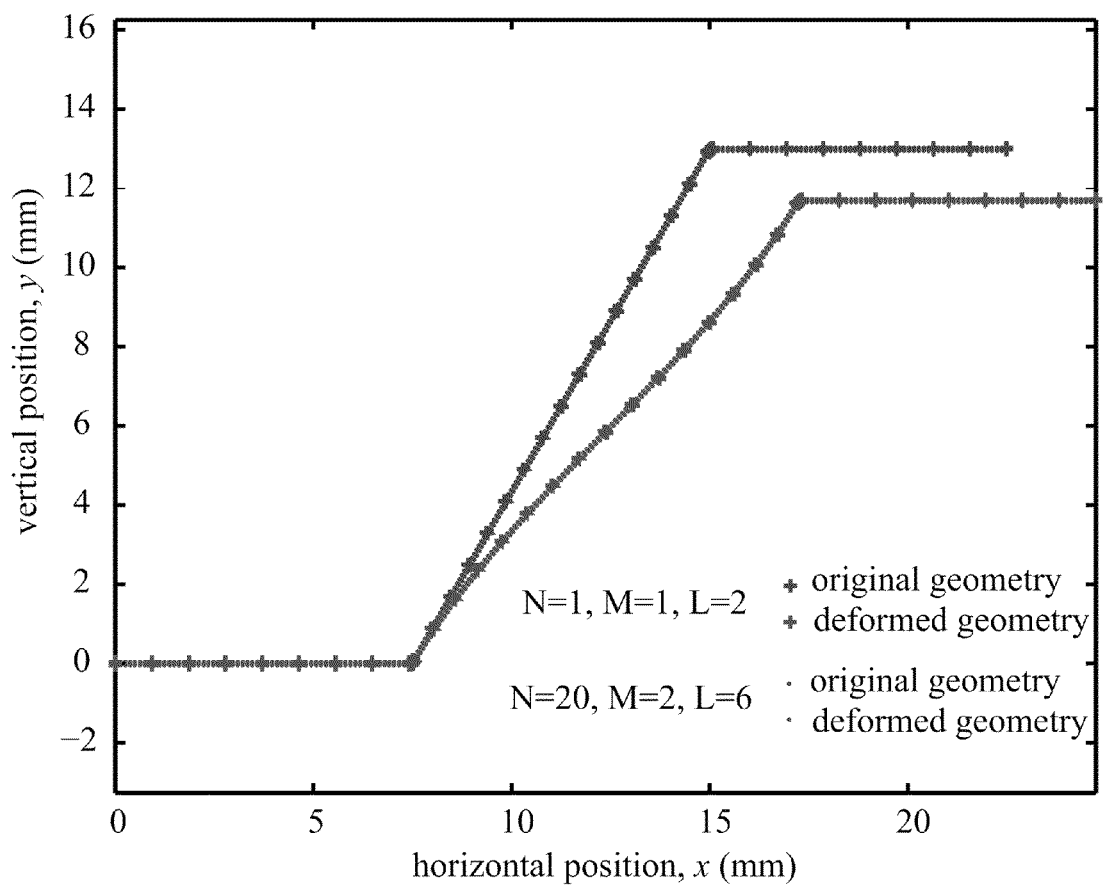
FIG. 64 Comparison of Course and Fine Grid for a p-level of 4

The single z-element was subjected to a vertical displacement of the upper horizontal member. As a result of this displacement, the diagonal member deformed while the lower horizontal member was constrained from moving. This behavior was thought to be very close to what a typical z-section inside a honeycomb specimen would experience. Two sets of meshes were prescribed. The first one had the minimum number of elements (8), while the latter one had 184 elements. Both were subjected to the same displacement field and their deformed shape can be seen in FIG. 64. The shapes here are plotted with intermediate points in between the nodes such that the reader could observe a more continuous shape deformation. The intermediate points were prescribed by the polynomial approximation of the displacement field within each element. As can be readily observed, the course mesh gives as good a prediction for deformation as the fine mesh. It was therefore decided to use the course mesh to discretize the honeycomb geometry.

The last assumption is strictly speaking not applicable to the Euler equations, but is often added because it simplifies the set of equations even further. The most important body force that acts on a fluid particle is gravity. Its effect can generally be neglected for a low-density fluid like air.

Figure 65:
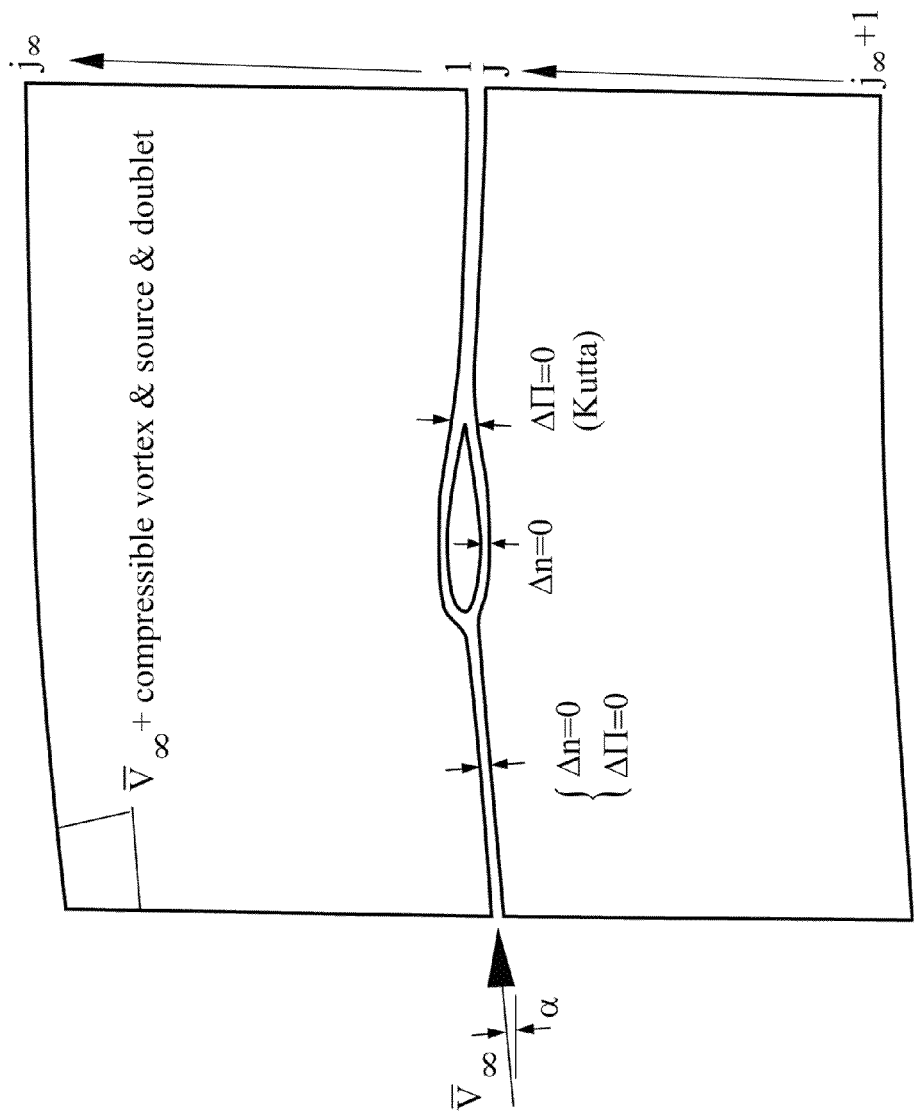
FIG. 65 Isolated Airfoil Boundary Conditions

The boundary conditions for the Euler flow are schematically displayed in FIG. 65. The flow domain in which the Euler equations are solved is divided into two regions. Streamlines 1 through $j_\infty$ make out the top region, while streamlines $j_\infty+1$ through J form the bottom region. Upstream of the body, the stagnation streamlines 1 and J coincide. At the solid boundary the position of the adjacent streamline needs to be specified. Because of the viscous boundary layer, this streamline is displaced normal to the wall by a distance equal to the local displacement thickness, $\delta^*$. The body that is drawn in FIG. 65 should therefore be interpreted as the physical body plus the displacement thickness.

Figure 66:
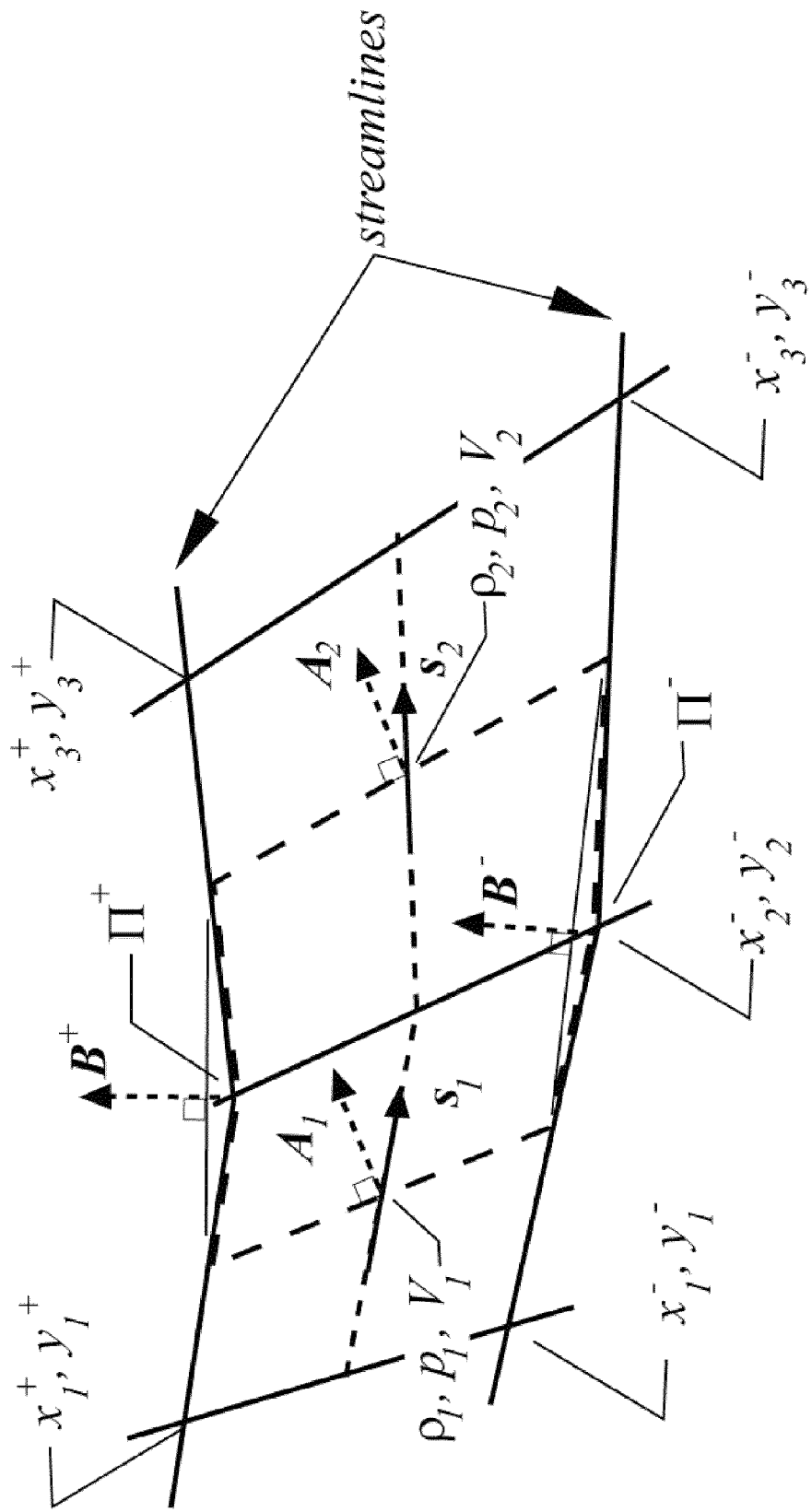
FIG. 66 State Variables, Grid Coordinates, and Unit Velocity ( ) Vectors

The steady Euler equations are solved over a finite volume. The total two-dimensional volume is subdivided into an intrinsic grid where one family of gridlines corresponds to streamlines. A typical conservation cell is depicted in FIG. 66.

The boundary layer equations can be rewritten in terms of three independent variables, namely $\theta$, $\delta^*$, and $C_\tau$ where $C_\tau$ is the shear stress coefficient defined as:

$$C_\tau = \tau_{max}\tau_e/u_e^2 \qquad (4.130)$$

Figure 67:
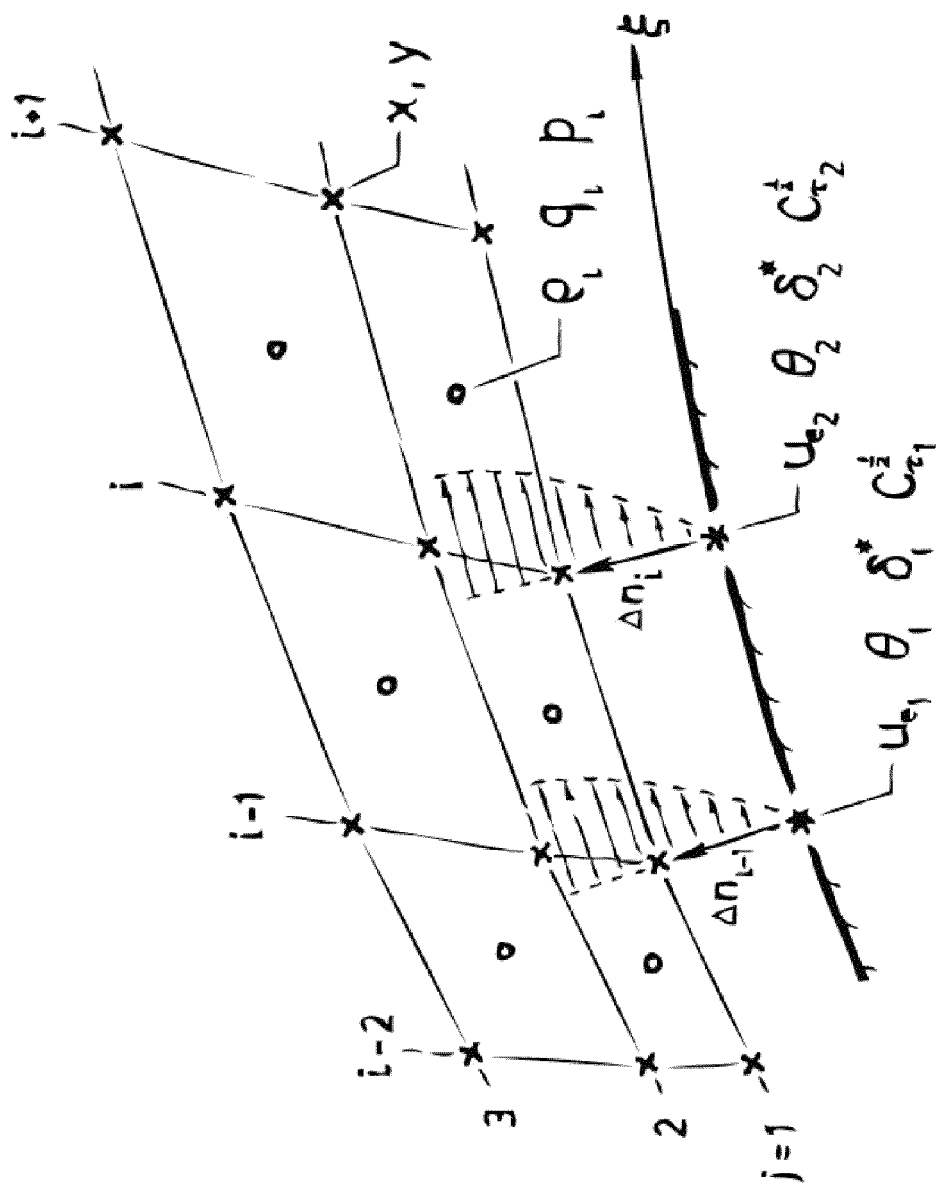
FIG. 67 Boundary-Layer Variable Locations

In the laminar portion of the boundary layer, the flow is described by two ODEs (Eqs. 4.128 and 4.129) with a set of analytic closure equations. In addition, the amplification factor is determined from a separate ODE (not listed in the present dissertation). Therefore, there is a total of three ODEs that needs to be discretized. In the turbulent portion of the flow, the original two boundary layer ODEs (Eqs. 4.128 and 4.129) are closed by means of an additional ODE, such that there are also three ODEs to be discretized. These are discretized on a structured grid which is shown in FIG. 67. Here, '1' denotes the stream wise location i−1 and '2' denotes the location 'i.' To solve these ODEs on the present grid, a central difference scheme (trapezoidal scheme) is employed where the solution at i depends on the solution at i−1 and i+1.

The following items sum up the main conclusions of the present research:

Longitudinal strains up to 54% can be achieved without plastic deformation.

Lateral strains up to 76% can be achieved without plastic deformation.

In the case of constant mass and a 40 kPa decline in atmospheric pressure, the maximum blocked force amounts to 70 kPa with a resulting mass-specific energy density of 1.1 J/g, assuming maximum lateral strain.

In the case the honeycomb is pressurized from the compressor stage of a gas turbine, the maximum blocked pressure that can be produced amounts to 0.82 MPa, resulting in a mass-specific energy density of 12.4 J/g, assuming maximum lateral strain.

Pressure-induced hysteresis declines with increasing cell differential pressure to 2% at 40 kPa when loaded in longitudinal direction and 4% when loaded in lateral direction.

The mechanics of pressure-adaptive honeycomb can be modeled by using cellular material theory for the honeycomb material in combination with an energy model which relates the change in pressurized volume to the overall strain and blocked stress.

A constant value may be assumed for the pouch-to-cell volume ratio. This value should be fixed at 0.94.

Finite element modeling based on homogenized, empirically-determined equivalent material stiffness shows good correlation to experimental results.

Wind tunnel test demonstrated that on a NACA 2412 wing with a 25% c pressureadaptive flap the maximum lift coefficient increased from 1.27 to 1.52 (after wall corrections) due to pressure-induced morphing of the flap.

When it comes to applications of pressure adaptive honeycombs the applicant believes various a variety of aircraft could benefit. Light sport aircraft, for example, could use a solid state flap system based on pressure adaptive honeycomb. For minimum cost, complexity and power requirements, the flap system could be made such as to satisfy the stall requirements. A simple powered version of a pressure-adaptive flap could be made by using the engine's exhaust manifold pressure in combination with a simple pilot-controlled valve to regulate the pressure and hence the deployment of the flap. A similar system could be used in larger general aviation aircraft.

However, pressure-adaptive honeycomb is not limited to propeller aircraft but could also be used in business jets and commercial transport aircraft. It is acknowledged that the simple adaptive flap that was tested in the present research will likely not be enough to create the lift coefficient that is required in these types of aircraft. However, pressure-adaptive honeycomb inside of an aft-translating flap could induce some additional camber in the flap, which in turn increases the lift coefficient. For every percent of lift coefficient that is gained, the wing surface area can be made one percent smaller and hence the drag coefficient in cruise also decreases with a percent. Alternatively, pressure adaptive honeycomb could be used in small tabs such as the pressure-adaptive Gurney flap that was presented in this document. It is up to future researchers and designers to fully explore the benefits of pressure-adaptive honeycomb for aircraft performance.

The various adaptive morphing structure examples shown above illustrate a novel apparatus and method for a pressure adaptive aero-structure adapted for structural morphing deformation. A user of the present invention may choose any of the above embodiments, or an equivalent thereof, depending upon the desired application. In this regard, it is recognized that various forms of the subject pressure adaptive morphing structure could be utilized without departing from the spirit and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

Other aspects, objects and advantages of the present invention can be obtained from a study of the drawings, the disclosure and the appended claims.

TABLE 2.1

Comparison of Actuator Technologies (copied from Ref. 31)

| Actuator Type (specific example) | Maximum Strain, $\epsilon$ (%) | Maximum Pressure, $\sigma$ (MPa) | Specific Elastic Energy Density, $E_m$ (J/g) | Elastic Energy Density, $E_v$ (J/cm$^3$) | Transfer Efficiency, $\eta$ (%) | Maximum Efficiency (%) | Specific Density, $\rho$ (g/cm$^3$) | Relative Speed (full cycle) |
|---|---|---|---|---|---|---|---|---|
| Electroactive Polymer Artificial Muscle | | | | | | | | |
| Acrylic | 215 | 7.2 | 3.4 | 3.4 | −60 | 60-80 | 1 | Medium |
| Silicone (CF19-2186) | 63 | 3.0 | 0.75 | 0.75 | 63 | 90 | 1 | Fast |
| Electrostrictor Polymer P(VDF-TrFE) | 4 | 15 | 0.17 | 0.3 | 5.5 | — | 1.8 | Fast |
| Electrostatic Devices (Integrated Force Array) | 50 | 0.03 | 0.0015 | 0.0015 | ~50 | >90 | 1 | Fast |
| Electromagnetic (Voice Coil) | 50 | 0.10 | 0.003 | 0.025 | n/a | >90 | 8 | Fast |
| Piezoelectric | | | | | | | | |
| Ceramic (PZT) | 0.2 | 110 | 0.013 | 0.10 | 52 | >90 | 7.7 | Fast |
| Single Crystal (PZN-PT) | 1.7 | 131 | .13 | 1.0 | 81 | 90 | 7.7 | Fast |
| Polymer(PVDF) | 0.1 | 4.8 | 0.0013 | 0.0024 | 7 | n/a | 1.8 | Fast |
| Shape Memory Alloy (TiNi) | >5 | >200 | >15 | >100 | 5 | <10 | 6.5 | Slow |
| Shape Memory Polymer | 100 | 4 | 2 | 2 | — | <10 | 1 | Slow |
| Thermal (Expansion) | 1 | 78 | 0.15 | 0.4 | — | <10 | 2.7 | Slow |
| Electrochemo-mechanical Conducting Polymer | 10 | 450 | 23 | 23 | 1 | <1% | −1 | Slow |
| Mechano-chemical Polymer/Gels (polyelectrolyte) | >40 | 0.3 | 0.06 | 0.06 | — | 30 | −1 | Slow |
| Magnetostrictive (Terfeuol-D. Etrema Products) | 0.2 | 70 | 0.0027 | 0.025 | — | 60 | 9 | Fast |
| Natural Muscle (Human Skeletal) | >40 | 0.35 | 0.07 | 0.07 | n/a | >35 | 1 | Medium |

TABLE 2.2

Details for a Selection of Modern Transonic Transport Aircraft [43, 46]

| Item | Symbol | Units | Fokker 70 | B737-700 | TU214 | B767-400 | B787-8 (est.) | A330-200 |
|---|---|---|---|---|---|---|---|---|
| Passengers | PAX | (—) | 79 | 162 | 210 | 245 | 223 | 253 |
| Wing span | b | (m$^2$) | 28.0 | 35.7 | 40.9 | 51.9 | 60.0 | 60.3 |
| Aspect ratio | A | (—) | 8.39 | 9.45 | 9.07 | 9.27 | 11.07 | 10.06 |
| Wing Area | S | (—) | 93.5 | 134.9 | 184.2 | 290.7 | 325.3 | 361.6 |
| Sweep | Λ | deg | 17.0 | 25.0 | 28.0 | 31.5 | 32.2 | 30.0 |
| flaps | | (—) | d.s | d.s. | d.s | d.s./s.s | s.s | s.s |
| l.e. device | | (—) | — | Kr./sl. | sl. | sl. | sl. | sl. |
| MTOW | $W_{MTO}$ | (10$^5$ kg) | 0.38 | 0.71 | 1.10 | 2.04 | 2.19 | 2.30 |

TABLE 2.2-continued

Details for a Selection of Modern Transonic Transport Aircraft [43, 46]

| MLW | $W_{ML}$ | ($10^5$ kg) | 0.34 | 0.59 | 0.93 | 1.59 | 1.64 | 1.82 |
|---|---|---|---|---|---|---|---|---|
| Cruise Mach | $M_{cr}$ | (—) | 0.77 | 0.79 | 0.80 | 0.80 | 0.85 | 0.82 |
| Approach Speed | $V_{apr}$ | (m/s) | 64.8 | 65.3 | 82.3 | 76.1 | 76.1 | 69.4 |
| Cruise Altitude | $h_{cr}$ | (m) | 10670 | 11430 | 12100 | 10668 | 13106 | 10668 |

| Item | B777-200ER | MD11 | B777-300ER | A340-600 | B747-400 | A380-800 |
|---|---|---|---|---|---|---|
| Passengers | 301 | 293 | 365 | 378 | 420 | 555 |
| Wing span | 60.9 | 51.6 | 65.0 | 63.5 | 64.4 | 79.8 |
| Aspect ratio | 8.67 | 7.85 | 9.88 | 9.16 | 7.98 | 7.54 |
| Wing Area | 427.8 | 339.0 | 427.8 | 439.4 | 520.3 | 845.0 |
| Sweep | 31.6 | 35.0 | 31.6 | 31.1 | 37.5 | 33.5 |
| flaps | d.s/s.s | d.s. | d.s/s.s | s.s | t.s. | s.s |
| l.e. device | Kr./sl. | sl. | Kr./sl. | sl. | Kr./sl. | sl. |
| MTOW | 2.60 | 2.73 | 3.40 | 3.52 | 3.63 | 5.60 |
| MLW | 2.05 | 1.95 | 2.51 | 2.65 | 2.60 | 3.86 |
| Cruise Mach | 0.84 | 0.82 | 0.84 | 0.83 | 0.85 | 0.85 |
| Approach Speed | 71.0 | 80.8 | 78.7 | 74.1 | 75.1 | 71.0 |
| Cruise Altitude | 11156 | 10668 | 10607 | 10668 | 12500 | 10668 |

Note:
s.s. = single slotted, d.s. = double slotted, t.s = triple slotted, Kr. = Kruger flap, sl. = slat

TABLE 3.1

Geometric Properties of Pressure-adaptive Honeycomb

| CDP = 0 | CDP → ∞ | $(\epsilon_x)_{max}$ | $(\epsilon_y)_{max}$ | $\Delta\theta$ (rad) |
|---|---|---|---|---|
| (bowtie shape) | (hexagon with $\theta$) | −67% | ±15% | $\pi/3$ |
| (rectangle $x_1, y_1$) | (hexagon $x_0, y_0$) | −33% | +15% | $\pi/6$ |
| — | (hexagon with side $l$) | +33% | −100% | $\pi/3$ |

TABLE 4.1

Intrinsic Properties of Pressure-Adaptive Honeycomb

| Actuator Type (specific example) | Maximum Strain, $\epsilon$ (%) | Maximum Pressure, $\sigma$ (MPa) | Specific Elastic Energy Density, $E_m$ (J/g) | Elastic Energy Density, $E_v$ (J/cm$^3$) | Transfer Efficiency, $\eta$ (%) | Maximum Efficiency (%) | Specific Density, $\rho$ (g/cm$^3$) | Relative Speed (full cycle) |
|---|---|---|---|---|---|---|---|---|
| Pressure Adaptive Honeycomb | | | | | | | | |
| Atmospherically-Triggered | 76 | 0.07 | 1.1 | 0.027 | 100 | n/a | 0.025 | slow |
| High-Pressure (0.9 MPa) | 76 | 0.82 | 12.4 | 0.31 | ~95 | n/a | 0.025 | slow |

TABLE 4.2

Critical Amplification Factors for Various situations [141]

| Situation | $n_{crit}$ |
|---|---|
| sailplane | 12-14 |
| Motor glider | 11-13 |
| Clean wind tunnel | 10-12 |
| Average wind tunnel | 9 |
| Dirty wind tunnel | 4-8 |

What is claimed is:

1. An adaptive morphing airfoil-structure comprising:
an airfoil-structure having spaced apart first and second outer skins having disposed there between a stacked grid of elongated tubular cells each having cell walls with a substantially hexagonal cross-section thereby forming a honeycomb structure and where each of said elongated tubular cells extend perpendicular to a cross-sectional plane of the cells from a first end to a distal end, and where the first end and the distal end are sealed off forming a pressurized cell;
where said cell walls having a material structure that radially deforms along the cross-sectional plane of the substantially hexagonal cross-section responsive to changes in ambient pressure; and
where said first and second outer skins having a material structure to morph responsive to deformation of said cell walls.

2. The adaptive morphing airfoil-structure as recited in claim 1, where the airfoil-structure is a propeller blade.

3. The adaptive morphing airfoil-structure as recited in claim 1, where the airfoil-structure is an aero control structure of an aircraft and where said cell walls deform responsive to an ambient pressure-altitude cycle that the aircraft control structure encounters during flight.

4. The adaptive morphing airfoil-structure as recited in claim 3, where the aero control structure is one of the structures selected from a group of structures consisting of a wing section structure, a flap structure, a nose structure, a tail structure, an elevator structure, an engine inlet structure, an engine outlet nozzle structure and a stabilizer structure.

5. The adaptive morphing airfoil-structure as recited in claim 1, further comprising:
   a plurality of bladders where each is disposed inside the interior of the cell walls of one of the cells and communicably linked to a controlled compressed air source adapted to change relative pressure of the bladder to thereby change cell differential pressure for effecting cell deformation.

6. The adaptive morphing airfoil-structure as recited in claim 5, where the plurality of bladders are integrally interconnected and controlled.

7. The adaptive morphing airfoil-structure as recited in claim 5, where the airfoil-structure is an aero control structure of an aircraft and where said cell walls deform responsive to an ambient pressure-altitude cycle that the aircraft control structure encounters during flight.

8. The adaptive morphing airfoil-structure as recited in claim 7, where the aero control structure is one of the structures selected from a group structures consisting of a wing section structure, a flap structure, a nose structure, a tail structure, and a stabilizer structure.

9. An adaptive morphing airfoil-structure comprising:
   a stacked grid of elongated tubular cells each having cell walls with a substantially hexagonal cross-section thereby forming a honeycomb structure and where each extend perpendicular to a cross-sectional plane of the cells from a first end to a distal end, and where the first end and the distal end are sealed off forming a pressurized cell;
   said honeycomb structure bounded on one side by fixed outer boundary skin and on an opposing side by a free boundary area;
   where said cell walls having a material structure that radially deforms along the cross-sectional plane from the substantially hexagonal cross-section responsive to changes in ambient pressure; and
   where said fixed outer boundary skin having a material structure to morph responsive to deformation of said cell walls.

10. The adaptive morphing airfoil-structure as recited in claim 9, where the airfoil-structure is an aero control structure of an aircraft and where said cell walls deform responsive to an ambient pressure-altitude cycle that the aircraft control structure encounters during flight.

11. The adaptive morphing airfoil-structure as recited in claim 10, where the aero control structure is one of the structures selected from a group of structures consisting of a wing section structure, a flap structure, a nose structure, a tail structure, and a stabilizer structure.

12. The adaptive morphing airfoil-structure as recited in claim 10, where the cells that border the free boundary have an immediately adjacent sidewall pair and an opposing immediately adjacent sidewall pair where each of the immediately adjacent sidewall pairs form substantially flat opposing sidewalls in the immediately adjacent sidewall pairs' default state when the cell differential pressure is substantially zero such that the fixed outer boundary skin has a curvature.

13. A method for adaptively morphing an airfoil-structure comprising the steps of:
   providing an airfoil-structure having proximately spaced apart first and second outer skins having disposed there between a stacked grid of elongated tubular cells each having cell walls with a substantially hexagonal cross-section thereby forming a honeycomb structure and where each extend perpendicular to a cross-sectional plane of the cells from a first end to a distal end;
   sealing and pressurizing each cell; and
   where said cell walls having a material structure that radially deforms along the cross-sectional plane from the substantially hexagonal cross-section responsive to changes in ambient pressure, where said first and second outer skins having a material structure to morph responsive to deformation of said cell walls.

14. The method for adaptively morphing an airfoil-structure as recited in claim 13, further comprising the steps of:
   controlling the relative pressure within a plurality of bladders where each bladder is disposed inside the interior of the walls of one of the cells by communicably linking the bladders to a controlled compressed air source adapted to change relative pressure of the bladder to thereby change cell differential pressure for effecting cell deformation.

15. The method for adaptively morphing an airfoil-structure as recited in claim 14, further comprising the steps of:
   communicably interlinking the plurality bladders and integrally controlling the relative pressures of the bladders.

16. The method for adaptively morphing an airfoil-structure as recited in claim 15, further comprising the steps of:
   providing a line of cells that have an immediately adjacent sidewall pair and an opposing immediately adjacent sidewall pair where each of the immediately adjacent sidewall pairs form substantially flat opposing sidewalls in there default state when the cell differential pressure is substantially zero such that the first and second skins have a curvature.

17. The method for adaptively morphing an airfoil-structure as recited in claim 16, further comprising the steps of:
   transitioning the cell differential pressure to a value substantially above zero thereby reducing the curvature.

18. The method for adaptively morphing an airfoil-structure as recited in claim 17, where the airfoil-structure is a propeller blade.

19. The method for adaptively morphing an airfoil-structure as recited in claim 18, where the airfoil-structure is an aero control structure which is one of the structures selected from a group of structures consisting of a wing section structure, a flap structure, a nose structure, a tail structure, an elevator structure, an engine inlet structure, an engine outlet nozzle structure and a stabilizer structure.

20. The method for adaptively morphing an airfoil-structure as recited in claim 19, where controlling the relative pressure within a plurality of bladders is manually controlled.

* * * * *